US008401339B1

United States Patent
Anderson

(10) Patent No.: US 8,401,339 B1
(45) Date of Patent: Mar. 19, 2013

(54) APPARATUS FOR PARTITIONING AND PROCESSING A DIGITAL IMAGE USING TWO OR MORE DEFINED REGIONS

(75) Inventor: Brian J. Anderson, San Jose, CA (US)

(73) Assignee: Marseille Networks, Inc.

( * ) Notice: Subject to any disclaimer, the term of this patent is extended or adjusted under 35 U.S.C. 154(b) by 472 days.

(21) Appl. No.: 12/800,266

(22) Filed: May 12, 2010

Related U.S. Application Data

(63) Continuation-in-part of application No. 12/655,769, filed on Jan. 6, 2010.

(51) Int. Cl.
*G06K 9/36* (2006.01)
(52) U.S. Cl. ........................................................ 382/298
(58) Field of Classification Search ........................ None
See application file for complete search history.

(56) References Cited

U.S. PATENT DOCUMENTS

| | | | | |
|---|---|---|---|---|
| 2008/0199091 | A1* | 8/2008 | Srinivasan et al. | 382/239 |
| 2009/0016620 | A1* | 1/2009 | Todoroki | 382/233 |
| 2010/0066762 | A1* | 3/2010 | Yeh et al. | 345/629 |

* cited by examiner

*Primary Examiner* — Bhavesh Mehta
*Assistant Examiner* — Nirav G Patel

(57) ABSTRACT

Apparatus for partitioning a digital image into multiple regions where each of the multiple regions is defined using a portion of the digital image and is specified using a width and a height. In addition, neighboring pixels for each of the multiple regions are defined as margins and may contain pixels that are part of the digital image and/or newly generated pixels by using various techniques such as on the fly generation or using a predetermined process for data generation, e.g. replication. Each of the multiple regions is combined with its margin pixels to create a new quadrilateral digital image that is completely processed and/or scaled. The appropriate portion of the processed quadrilateral digital image is displayed using a display region of an electronic display panel, or monitor, having multiple display regions. The concatenation of the images displayed using each display region faithfully reproduce the original digital image.

25 Claims, 28 Drawing Sheets

Memory Access Request 1000

| Control 1010 | Base Index 1020 | Ystart 1030 | Xstart 1040 | Ycount 1050 | Xcount 1060 |

Fig. 10A

Memory Access Request 1000

| Control 1010 | Base Index 1020 | Offset Address 1070 | #Words 1080 |

Fig. 10B

APPARATUS FOR PARTITIONING AND PROCESSING A DIGITAL IMAGE USING TWO OR MORE DEFINED REGIONS

CROSS REFERENCE TO RELATED APPLICATION

This application is a continuation-in-part of U.S. patent application Ser. No. 12/655,769, filed Jan. 6, 2010, entitled "Method For Partitioning A Digital Image Using Two Or More Defined Regions" which application is incorporated by reference herein in its entirety.

TECHNICAL FIELD

The subject of this application generally relates to the field of digital image processing and more particularly to digital image scaling from an original image size to a target image size.

BACKGROUND

Traditional cameras are used to take photographs by capturing light onto photographic films. Digital cameras use electronic devices such as Charge Coupled Devices (CCD) to capture light, of an original image, and produce a digital representation of an image. The digital representation can be further manipulated using different compression or transmission techniques or standards such as Moving Picture Experts Group (MPEG). Furthermore, the digital representation of the image can be stored in various digital formats in accordance with the intended memory storage mediums e.g. Hard disk, DVD, CD-Rom, etc. . . . such that the reproduction of the original image may be achieved using a variety of means or mediums using the stored digital representation of the original image. For examples, electronic display devices can display the image on their screen.

The digital representation of the image can greatly vary in quality depending on the sampling of the original image. Each sample of the original image represents a small portion of the overall image. Therefore, more samples are required in order to have a better or more accurate representation of the original image. A pixel represents one sample of the original image. Normally, an image is sampled using a two-dimensional grid having a width, X, and a height, Y, that are specified in unit of pixel, where the digital image resolution corresponds to X time Y, and each pixel corresponds to the smallest single component of the original image. For example, a first camera with a resolution of 640×480 would have 640 pixels in the horizontal direction and 480 pixels in the vertical direction. The digital image resolution, total number of pixels, is 307,200 pixels. Higher resolution requires more pixels to be generated when capturing an image, and the closer the digital image produced is to the original image. Hence, a second digital camera with a resolution of 1280×960 would have a total number of pixels of 1,228,800 pixels or four times the resolution of the first camera.

Each pixel of a digital image corresponds to data information that is expressed as a number of bits that is used to describe each pixel (or sample) of the original image. This data information is normally expressed as number of bits per pixel (bpp). A broader range of distinct colors can be represented with a higher number of bits per pixel. Nowadays, There are many different formats that are in use to capture and/or display color information, e.g. the RGB. For example, a 24-bit color model uses 8 bits to represent red, 8 bits to represent blue and 8 bits to represent green. Under this model, each of these three colors possesses a $2^8$ or 256 levels. Therefore, they can be combined (256×256×256) to give a possible 16,777,216 colors.

A video camera captures a scene for a specific duration of time, and produces many sequential digital images. Normally, each digital image is referred to as a frame, having a frame size defined as number of horizontal pixels×number of vertical pixels. A frame rate is also specified that represents the number of frames being captured per second. In addition, a scanning system is identified as progressive or interlaced to indicate how the video frames are generated and thus how they should be processed and displayed so that the original scene is faithfully reproduced when these digital images are played back in sequence, e.g. using an electronic display panel or a digital television set.

In order to reproduce the original scene timing, each digital image, or frame within the scene, must be reproduced and displayed in a given amount of time. Hence, the time required to process and display one pixel is limited and finite. Electronic display devices resolution is specified, in a similar way as explained above for a digital camera, as having X by Y pixels. Again, the higher the resolution of the electronic display device is, the better the image that is being reproduced. As the electronic display panel technology advances to an ever-higher resolution, a bigger challenge to the device electronics is to be able to process data information for each pixel within an ever-smaller amount of time.

The processing demands on electronic circuits for High-Definition television (HD TV), e.g. 1,920 pixels wide and 1,080 pixels high, is much greater than a Standard-Definition television (SD TV), e.g. 720 pixels wide and 480 pixels high. The next generation of digital TVs and projectors, recently developed, will be able to display four times the high definition resolution of current HD TV sets. This Quad-HD set is capable of displaying 3,840 pixels wide and 2,160 pixels high. This presents a big challenge to the processing circuitry, where each pixel must be processed and faithfully reproduced regardless of the input image resolution having a Quad-HD content from standardized interfaces such as HDMI 1.4 or DisplayPort 1.2a and/or other lower resolution such as 1,920× 1,080 or lower.

The need arises to provide an electronic system capable of faithfully processing digital images with various resolutions and display them using a Quad-HD resolution display or higher resolution type of electronic display panels. Marseille Networks' 4×HD™ video technology delivers the ability to process digital images to be displayed in 3840×2160 resolution, while selectively removing artifacts and preserving stunning image details. Furthermore, Marseille Networks is the first to introduce Quad-HD solution to home theater systems. Marseille Networks' 4×HD™ video technology provide an efficient system with ample flexibility and processing power for blending and or scaling various types of video image streams, including High-Definition streams, to be displayed over Quad-HD display panel.

BRIEF DESCRIPTION OF THE DRAWINGS

FIG. 10A shows an exemplary command structure for an exemplary memory access request to write or read video data information to or from a memory device, in accordance with one embodiment.

FIG. 10B shows an alternate exemplary command structure for an exemplary memory access request to write or read video data information to or from a memory device, in accordance with one embodiment.

DETAILED DESCRIPTION

Figure 1:
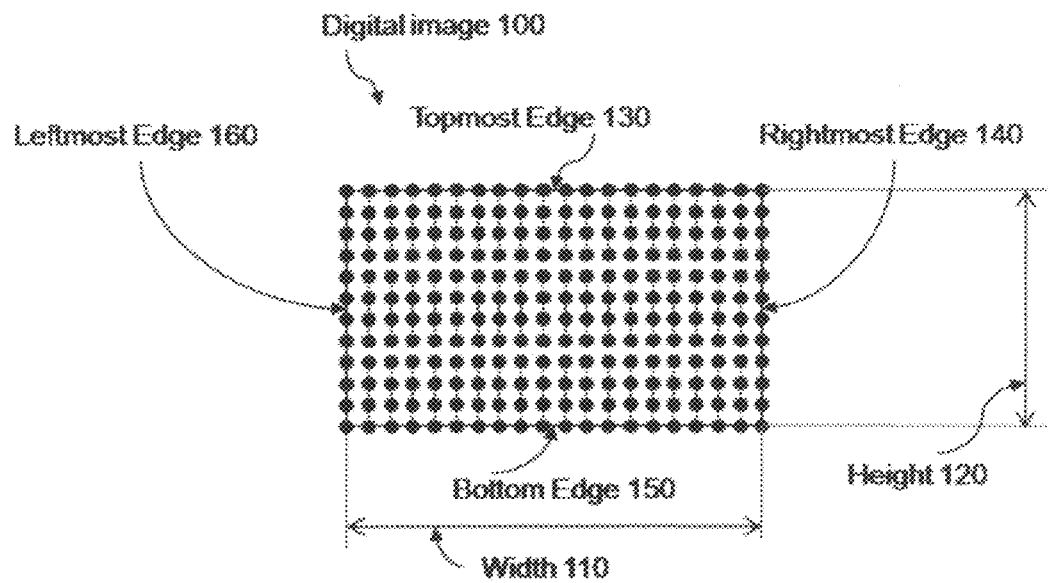
FIG. 1 shows an exemplary model of a digital image using pixels arranged as a two-dimensional grid format.

The present disclosure provides, amongst other things, techniques to minimize or substantially eliminate artifacts when scaling low resolution video or digital images to higher resolution digital images in order to be displayed using electronic display panels with two or more defined regions. In one respect, a digital video comprises many sequential digital images that capture a certain scene for a certain period of time. A digital image is split into multiple regions and each region is then selectively processed and/or scaled so that it can be displayed using a correspondent region of the display.

Each of the multiple regions is defined using a portion of the digital image and is specified using a width and a height, in unit of pixel. In addition, neighboring pixels for each of the multiple regions are defined as margins, e.g. Top margin, Right margin, Bottom margin, and Left margin that will be described in details in this disclosure, and are specified to comprise pixels that are part of the digital image and/or newly generated pixels using various techniques such as on the fly or a predetermined data information. The combination of each of the multiple regions and all of its margins are then processed or scaled to produce a processed portion of the digital image. Furthermore, the concatenation of all of the processed portions of the digital image are then displayed, using electronic display panels with multiple defined regions, and thus faithfully reproduce the original digital image.

The disclosure and the various features and advantageous details are explained more fully with reference to the nonlimiting embodiments that are illustrated in the accompanying drawings and detailed in the following description. Descriptions of well-known processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those of ordinary skill in the art from this disclosure. Other features and associated advantages will become apparent with reference to the following detailed description of specific embodiments in connection with the accompanying drawings.

The term "coupled" is defined as connected, although not necessarily directly, and not necessarily mechanically. The terms "a" and "an" are defined as one or more unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

In general, various processing techniques can be used to process or scale digital images from one specified resolution to another specified resolution. For example, newly available Quad-HD electronic display panels, or can be simply referred to as monitors, can display images using a resolution of 3840×2160 pixels, or 3840 pixels in width and 2160 pixels in height, for a total of 8,294,400 pixels. A high definition digital image may be specified using 1920 pixels in width and 1080 pixels in height, or in other words a resolution of 1,920×1,080 for a total of 2,073,600 pixels. As you can see The Quad-HD monitor is capable of displaying four times the number of pixels that define the digital image using four regions each of which is capable of displaying a full 1,920×1,080 pixels. Normally a low resolution digital image is first scaled to 3840×2160 resolution and then split into four regions, each of which is then displayed using a corresponding region of the monitor. The higher the resolution of an available Quad-monitor is, the higher the processing requirement is to display a given digital image at the full monitor resolution. This disclosure describes a suitable solution to solve the ever-increasing challenge of scaling a given digital image in order to be faithfully reproduced and fully displayed using monitors with multiple defined regions, e.g. Quad-HD monitor.

An exemplary model depicting a digital image 100 using pixels arranged as a two-dimensional grid is shown in FIG. 1. The digital image 100 is defined as having a Width 110 and a Height 120, in unit of pixel. The resolution of Digital image 100 is therefore Width 110×Height 120 pixels. Furthermore, the Digital image 100 is defined to have four edges, namely, a Topmost edge 130, a Rightmost edge 140, a Bottommost edge 150, and a Leftmost edge 160. The Topmost edge 130 comprises every pixel on a straight line bounded by two end pixels, namely, the Top-leftmost pixel 135 and the Top-rightmost pixel 145. The Rightmost edge 140 comprises every pixel on a straight line bounded by two end pixels, namely, the Top-rightmost pixel 145 and the Bottom-rightmost pixel 155. The Bottommost edge 150 comprises every pixel on a straight line bounded by two end pixels, namely, the Bottom-rightmost pixel 155 and the Bottom-leftmost pixel 165. The Leftmost edge 160 comprises every pixel on a straight line bounded by two end pixels, namely, the Bottom-leftmost pixel 165 and the Top-leftmost pixel 135. The exemplary model of Digital image 100 will be used throughout the as a mean to describe the underlying inventive concepts and should not be construed as a limitation of the disclosure. For example, the inventive concepts can be applied to a digital image using pixels arranged in various ways including, for example, a three-dimensional grid.

Figure 2A:
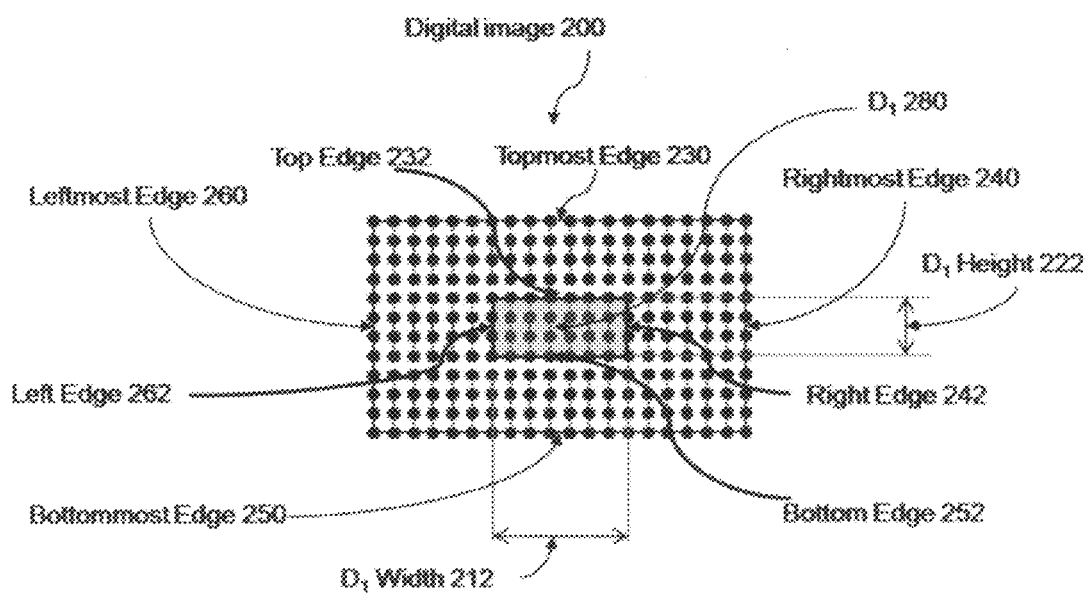
FIG. 2A shows another exemplary model of a digital image, where a first region that corresponds to a quadrangle digital image is defined within the digital image.

Now referring to FIG. 2A, a region, $D_1$ 280, of the Digital image 200 is defined as a quadrangle digital image that is surrounded by a Top edge 232, a Right edge 242, a Bottom edge 252 and a Left edge 262. $D_1$ 280 comprises all the pixels within the region including the pixels of the Top edge 232, the Right edge 242, the Bottom edge 252 and the Left edge 262. Furthermore, $D_1$ 280 is specified to have a $D_1$ Width 212 and a $D_1$ Height 222, in unit of pixel. An exemplary location of the region $D_1$ 280 is shown in FIG. 2A to be within the Digital image 200, near its center. Various locations of the region $D_1$ 280 are possible within, and including, the boundary edges of the Digital image 200 as defined by a Topmost edge 230, a Rightmost edge 240, a Bottommost edge 250, and a Leftmost edge 260. For example, a possible location of D1 280 can be at the top-leftmost corner of the Digital image 200 such that the Left edge 262, of $D_1$ 280, is collinear with the Leftmost edge 260 of the Digital image 200. Furthermore, the Top edge 232, of $D_1$ 280, is collinear with the Topmost edge 230 of the Digital image 200.

Figure 2B:
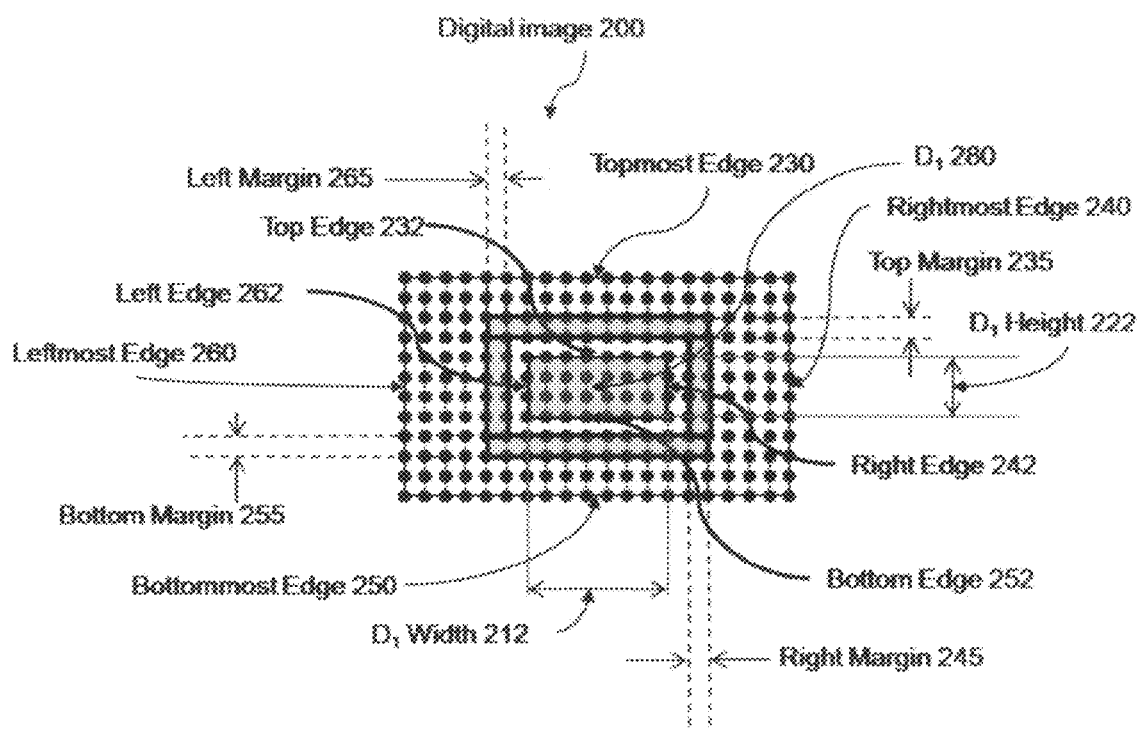
FIG. 2B shows another exemplary model of a digital image, where a second region, which comprises the first region, is defined within the digital image and corresponds to a quadrilateral digital image, in accordance with one embodiment.

Referring to FIG. 2B, a Top margin 235 is defined as a certain number of pixels in the vertical direction and above the Top edge 232, regardless of whether the Top edge 232 is at the boundary of the Digital image 200, i.e. the Top edge 232 is collinear with the Topmost edge 230. Similarly, a Bottom margin 255 is defined as a certain number of pixels in the vertical direction and below the Bottom edge 252, regardless of whether the Bottom edge 252 is at the boundary of the Digital image 200, i.e. the Bottom edge 252 is collinear with the Bottommost edge 250. In addition, a Right margin 245 is defined as a certain number of pixels in the horizontal direction and to the right of the Right edge 242, regardless of whether the Right edge 242 is at the boundary of the Digital image 200, i.e. the Right edge 242 is collinear with the Rightmost edge 240. Similarly, a Left margin 265 is defined as a certain number of pixels in the horizontal direction and to the left of the Left edge 262, regardless of whether the Left edge 262 is at the boundary of the Digital image 200, i.e. the Left edge 262 is collinear with the Leftmost edge 260. Subsequently, a new region of the Digital image 200 can now be defined to comprise the region $D_1$ 280 and all of the surrounding pixels as defined by the Top, Bottom, Right and Left margins around $D_1$ 280 regardless of whether any pixel of any one of the Top, Bottom, Right and Left margins exist within the Digital image 200. This will be described in further details in the following paragraphs.

Figure 3A:
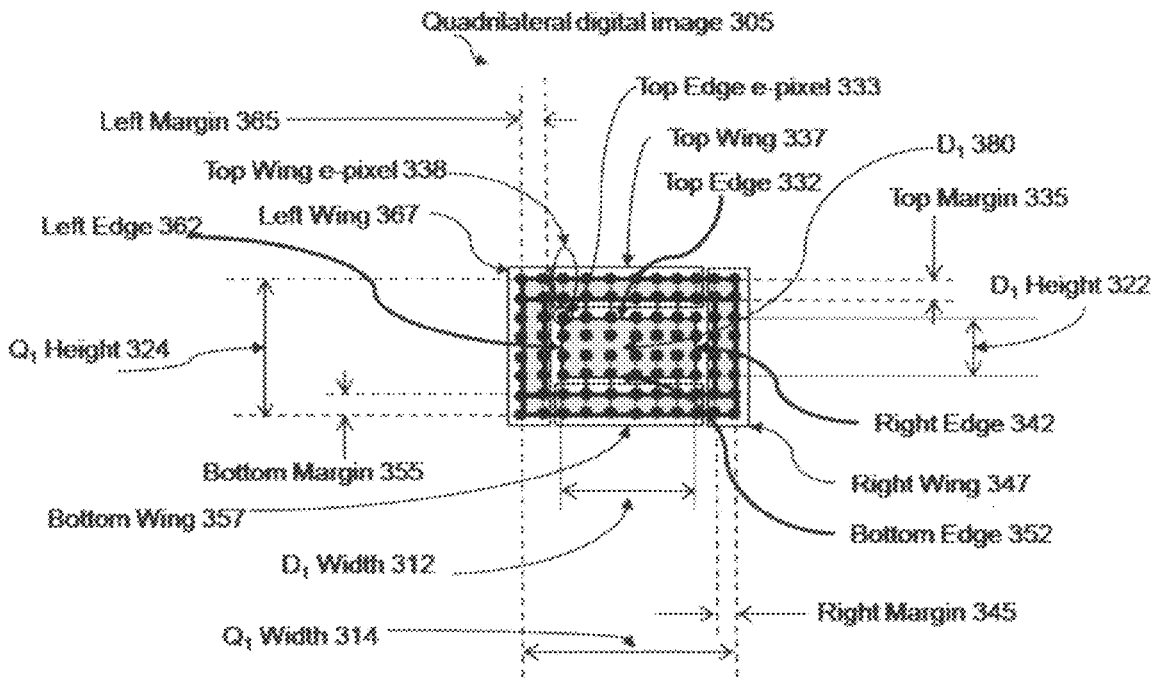
FIG. 3A shows an exemplary model of a quadrilateral digital image that comprises a quadrangle digital image surrounded by margin pixels, in accordance with another embodiment.

Referring to FIG. 3A, a newly defined quadrilateral digital image 305 is shown comprising a first region determined as quadrangle digital image $D_1$ 380. The actual number of pixels, as drawn in FIG. 3A, will be used as an additional illustrative mean in order to describe the relationship between the quadrilateral digital image 305 and the quadrangle digital image $D_1$ 380. For example, $D_1$ 380 is determined using a $D_1$ Width 312, which corresponds to seven pixels as shown, and a $D_1$ Height 322, which corresponds to four pixels as shown. Thus, the resolution of the region defined by $D_1$ 380 is determined to be 7×4, or a total of 28 pixels. Furthermore, the four edges of the quadrangle digital image $D_1$ 380 are defined as follows: a Top edge 332 comprising the seven topmost pixels of $D_1$ 380, a Right edge 342 comprising the four rightmost pixels of $D_1$ 380, a Bottom edge 352 comprising the seven bottommost pixels of $D_1$ 380, and a Left edge 362 comprising the four leftmost pixels of $D_1$ 380. It is thus clear that the region $D_1$ 380 comprises all the pixels that are determined to be within its four edges including the pixels located at the Top edge 332, the Right edge 342, the Bottom edge 352 and the Left edge 362. We will now describe a second region of the quadrilateral digital image 305.

In one embodiment, the second region of the quadrilateral digital image 305 is determined using a Top margin 335, a Right margin 345, a Bottom margin 355, and a Left margin 365 using the same number of pixels. For example, each of the Top margin 335, the Right margin 345, the Bottom margin 355, and the Left margin 365 comprises at least one pixel. An exemplary margin of two pixels is used for all Top, Right, Bottom, and Left margins, as shown in FIG. 3A. The quadrilateral digital image 305 is then determined and is specified using a $Q_1$ Width 314 and a $Q_1$ Height 324, in accordance with the following relationships:

$$Q_1 \text{ Width } 314 = (\text{Left Margin } 365 + D_1 \text{ Width } 312 + \text{Right Margin } 345) \quad \text{Eq. 1}$$

$$Q_1 \text{ Height } 324 = (\text{Top Margin } 335 + D_1 \text{ Height } 322 + \text{Bottom Margin } 355) \quad \text{Eq. 2}$$

Accordingly, for the exemplary drawing shown in FIG. 3A, the $Q_1$ Width 314 is computed to be eleven pixels, (2+7+2), and the $Q_1$ Height 324 is computed to be eight pixels, (2+4+2). Therefore, the total resolution of the quadrilateral digital image 305 is 11×8 or a total of 88 pixels as compared with a 7×4 or a total of 28 pixels for $D_1$ 380. Furthermore, the quadrangle digital image $D_1$ 380 is centered within the quadrilateral digital image 305 using the Top margin 335, the Right margin 345, the Bottom margin 355, and the Left margin 365. In another embodiment, each of the Top margin 335, the Right margin 345, the Bottom margin 355, and the Left margin 365 may be defined using a different number of pixels, and therefore the quadrangle digital image $D_1$ 380 may somewhat be off-centered within the quadrilateral digital image 305 as would be determined by the number of margin pixels.

In accordance with one embodiment, the data information for each pixel located in any of the Top margin 335, the Right margin 345, the Bottom margin 355, and the Left margin 365 is generated using existing data information from any one pixel of the quadrangle digital image $D_1$ 380, or using predetermined color data information, or any combination thereof. The predetermined color data information may corresponds to any color including black color. In accordance with another embodiment, a Top Wing 337 is defined to comprise at least one row of pixels that are located directly above the Top Edge 332. For example, the Top Wing 337 comprises two pixels, identified as Top Wing e-pixel 338, that are immediately above the correspondent pixel, Top Edge e-pixel 333, in the vertical direction, as shown in FIG. 3A. In accordance with yet another embodiment, the Top Wing 337 is defined to comprise at least one pixel, Top Wing e-pixel 338, that is directly above a correspondent pixel, Top Edge e-pixel 333, in the vertical direction. It is important to note that the Top Wing e-pixel 338 data information may be generated using various direct or indirect manipulation, duplication, or management of the data information of the pixel, Top Edge e-pixel 333, as is generally known to those of ordinary skill in the art. In accordance with another embodiment, the Top Wing e-pixel 338 data information is generated using the data information of the pixel, Top Edge e-pixel 333, or any other pixel that is located on the Top edge 332. In accordance with yet another embodiment, the Top Wing e-pixel 338 data information is generated using direct or indirect manipulation, duplication, or management of the data information of the pixel, Top Edge e-pixel 333, in combination with a predetermined data information that may corresponds to specific color, for example black, gray or any other color. In accordance with a preferred embodiment, the Top Wing e-pixel 338 data information is generated, on the fly during the processing of the quadrangle digital image $D_1$ 380, using data information of the pixel, Top Edge e-pixel 333, or any other pixel that is located on the Top edge 332. In accordance with yet another preferred embodiment, the Top Wing e-pixel 338 data information is generated, on the fly during the processing of the quadrangle digital image $D_1$ 380, using any one, or a combination, of the embodiments described above. In addition, a Bottom Wing 357 comprises at least one row of pixels that are located directly below the Bottom Edge 352. The data information for the Bottom Wing 357 pixels is generated, using corresponding pixels that are located on the Bottom Edge 352 and in a similar fashion and means as described above for the Top Wing 337.

In accordance with a preferred embodiment, a Left Wing 367 comprises at least one column of pixels that is located immediately to the left of the Left Edge 362 of the quadrangle digital image $D_1$ 380. The data information for the Left Wing 367 pixels is generated using data information of the corresponding pixels that are identified as the leftmost pixels of the Top Wing 337, Top Wing e-pixel 338 as shown the in FIG. 3A, the pixels of the Left Edge 362 of the quadrangle digital image $D_1$ 380, and the leftmost pixels of the Bottom Wing 357, and in a similar fashion and means as described above for the Top Wing 337. For example, the data information for the Left Wing 367 pixels can be generated using a direct or indirect manipulation, duplication, and/or management processes of the data information of the pixels that are located on any one of the edges of the quadrangle digital image $D_1$ 380. Furthermore, the data information can be created using predetermined color information, including data information that corresponds to black color, or any other color. Any combination of the above methods may be employed singularly or in combination to generate the data information for the Left Wing 367 pixels thereof. In addition, various methods based on mathematical or algorithmic means to generate, possibly on the fly, the data information needed for each of the margin pixels may also be used and may be implemented in combination of any of the other methods described above. Similarly, a Right Wing 347 comprises at least one column of pixels that is located immediately to the right of the Right Edge 342 of the quadrangle digital image $D_1$ 380. The data information for the Right Wing 347 pixels is generated using data information of the corresponding pixels that are identified as the rightmost pixels of the Top Wing 337, the pixels of the Right Edge 342 of the quadrangle digital image $D_1$ 380, and the rightmost pixels of the Bottom Wing 357, and in a similar fashion and means as described above for the Top Wing 337, including various methods as described above.

In another embodiment, changing the order of the data information that is generated first, i.e. Right Wing 347 & the Left Wing 367, and then data information for the Top Wing 337 & the Bottom Wing 357 would result in a change of the number of pixels being processed in each of the steps identified above for each one of the Right Wing 347, the Left Wing 367, the Top Wing 337, and the Bottom Wing 357 but does not change the underlying inventive concepts as described above and this flexibility would be appreciated by those skilled in the art. As will be described and shown in the following paragraphs, the definition of the quadrilateral digital image 305 will be used in the processing of an arbitrary digital image, which is split into multiple quadrangle regions, $D_1$, $D_2, D_3, \ldots, D_z$. The margin pixels are then either determined or created, as described above, for each of the multiple quadrangle regions, $D_z$. Sometimes these margin pixels are part of the arbitrary digital image and sometimes the margin pixels are generated based on any one, or any combination, of methods as described above. A new quadrilateral digital image, $Q_z$, is then created from the concatenation of each of the multiple quadrangle regions, $D_z$, and its own margin pixels.

Figure 3B:
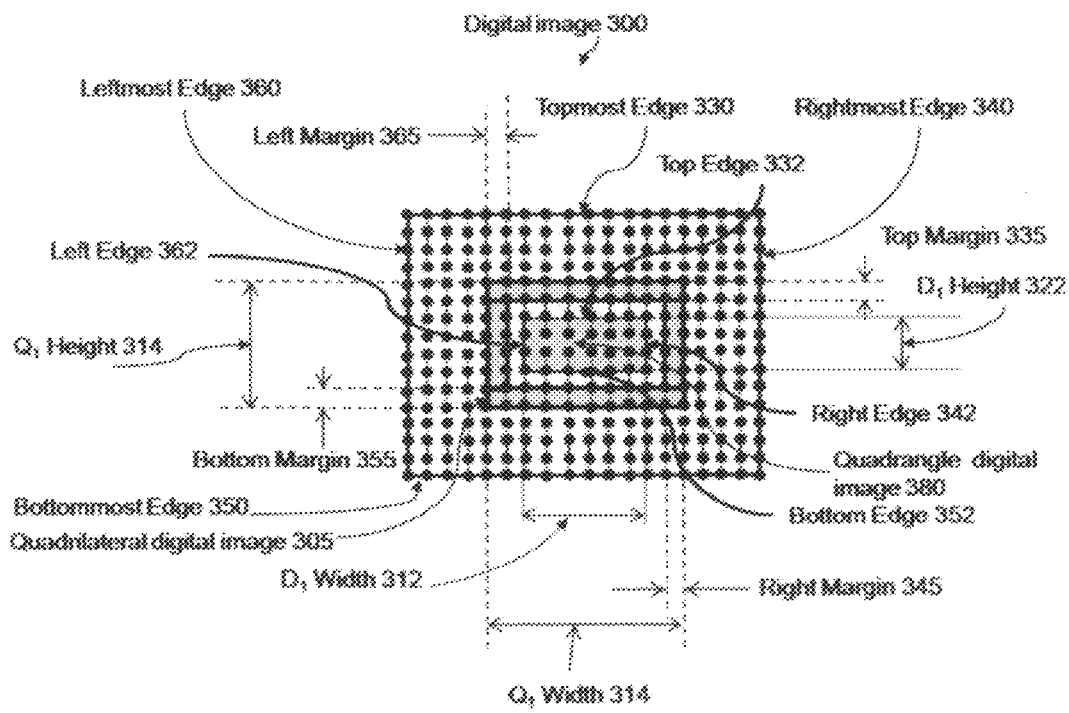
FIG. 3B shows an exemplary model of a quadrilateral digital image of FIG. 3A that is centered within the edges of a digital image, in accordance with another embodiment.
Figure 3C:
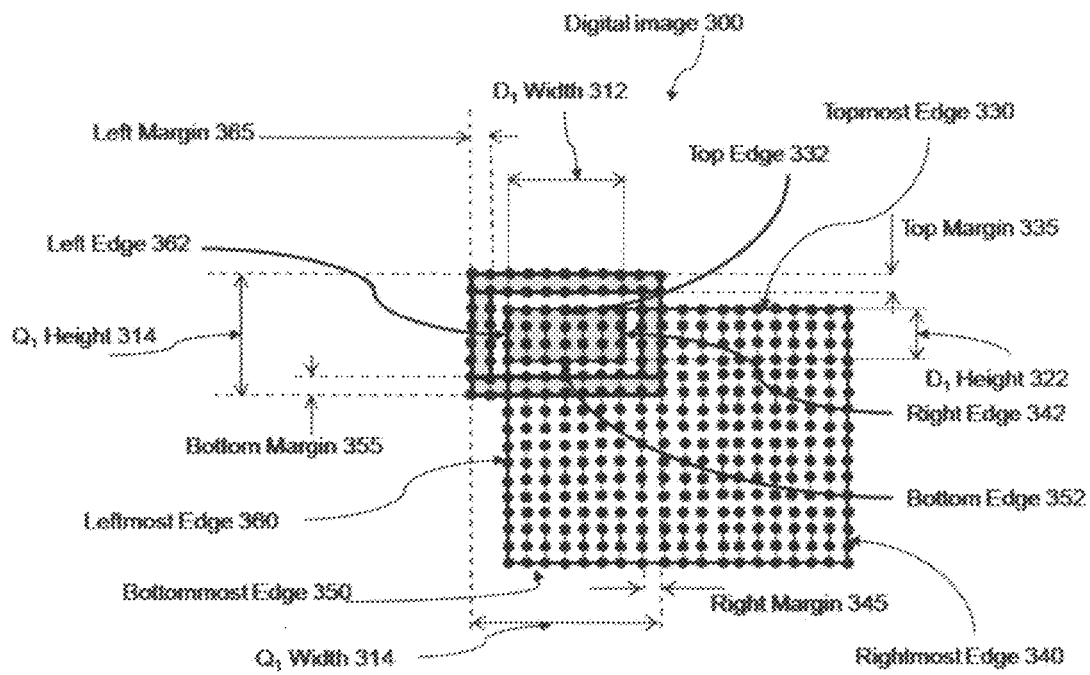
FIG. 3C shows an exemplary model of a quadrilateral digital image of FIG. 3A that is located at the top-left corner of a digital image, in accordance with another embodiment.
Figure 3D:
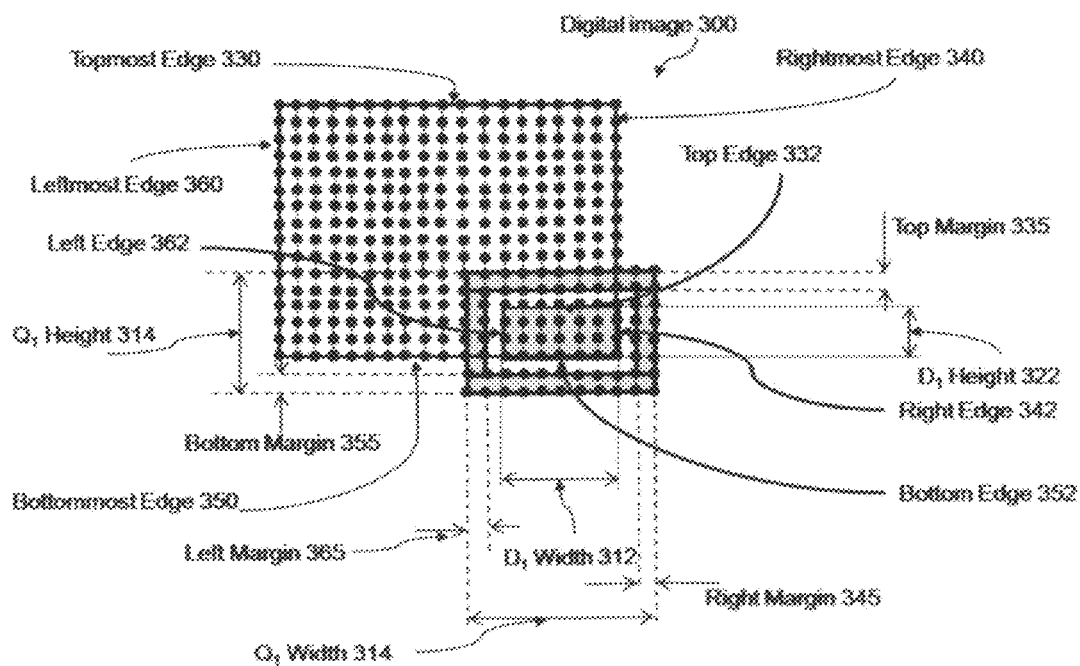
FIG. 3D shows an exemplary model of a quadrilateral digital image of FIG. 3A that is located at the bottom-right corner of a digital image, in accordance with another embodiment.

Now referring to FIG. 3B, an exemplary digital image 300 comprising a quadrilateral digital image 305 and a quadrangle digital image 380, as described in the above. A $D_1$ Width 312 and $D_1$ Height 322 define the quadrangle digital image 380. Accordingly, $Q_1$ Width 314 and $Q_1$ Height 324 define the quadrilateral digital image 305 and are determined in accordance with Eq. 1 and Eq. 2 listed above. In accordance with one embodiment, the quadrilateral digital image 305 is within any one of a Topmost edge 330, a Rightmost edge 340, a Bottommost edge 350, and a Leftmost edge 360 of the digital image 300, as shown in FIG. 3B. In accordance with another embodiment, the quadrilateral digital image 305 is located at the top-left corner of the digital image 300, as shown in FIG. 3C. In accordance with yet another embodiment, the quadrilateral digital image 305 is located at the bottom-right corner of the digital image 300, as shown in FIG. 3D. Therefore, the location of the quadrangle digital image 380 within the digital image and the depth of each of the Top margin 335, the Right margin 345, the Bottom margin 355, and the Left margin 365 will determine the location of the margin pixels and thus the pixels' data information is determined using various methods as described above. In accordance with one embodiment, if the margin pixels are located within anyone of the Topmost edge 330, the Rightmost edge 340, the Bottommost edge 350, and the Leftmost edge 360 of the digital image 300 then the data information is duplicated from the correspondent pixels of digital image 300. In accordance with another embodiment, if the margin pixels are located beyond anyone of the Topmost edge 330, the Rightmost edge 340, the Bottommost edge 350, and the Leftmost edge 360 of the digital image 300 then the data information is generated or created using various methods as described above. Please note that an effort is made to keep the nomenclature of FIG. 3A through FIG. 3D consistent, with the exception of the location of the quadrilateral digital image 305 within the digital image 300, see FIG. 3B through FIG. 3D. Some objects names were left off some of FIGS. 3A-D for increasing the drawing clarity, it is clear that FIG. 3A through FIG. 3D are used to show exemplary locations of quadrilateral digital image 305 for illustrative purposes.

Therefore, data information is generated for certain margin pixels that are determined to be beyond the Topmost edge 330 and the Leftmost edge 360, see FIG. 3C. The remaining margin pixels that are determined to be within the Rightmost edge 340 and the Bottommost edge 350, would comprise data information from the correspondent pixels of the digital image 300. In accordance with one embodiment, data information is generated for at least one pixel of the quadrilateral digital image 305 that is above the Topmost edge 330 of the digital image 300 if the Top edge 332 of the quadrangle digital image 380 is collinear with the Topmost edge 330 of the digital image 300. Similarly, data information is generated for at least one pixel of the quadrilateral digital image 305 that is to the left of the Leftmost edge 360 of the digital image 300 if the Left edge 362 of the quadrangle digital image 380 is collinear with the Leftmost edge 360 of the digital image 300. Various methods and steps may be used, as described above. However, the data information for each margin pixel may be generated based on at least one of the following: (i) using data information of at least one pixel that is located on the Top edge 332 of the quadrangle digital image 380, (ii) using data information of at least one pixel that is located to the left of the Top edge 332 of the quadrangle digital image 380 (see FIG. 3B), (iii) using data information of at least one pixel that is located to the right of the Top edge 332 of the quadrangle digital image 380, (iv) using data information of at least one pixel that is located anywhere on the Topmost edge 330 of the digital image 300, and (v) using data information that corresponds to any color, including black.

Now referring to FIG. 3D, data information is generated for certain margin pixels that are determined to be beyond the Bottommost edge 350 and the Rightmost edge 340. The remaining margin pixels that are determined to be within the Leftmost edge 360 and the Topmost edge 330, would comprise data information from the correspondent pixels of the digital image 300. In accordance with one embodiment, data information is generated for at least one pixel of the quadrilateral digital image 305 that is below the Bottommost edge 350 of the digital image 300 if the Bottom edge 352 of the quadrangle digital image 380 is collinear with the Bottommost edge 350 of the digital image 300. Similarly, data information is generated for at least one pixel of the quadrilateral digital image 305 that is to the right of the Rightmost edge 340 of the digital image 300 if the Right edge 342 of the quadrangle digital image 380 is collinear with the Rightmost edge 340 of the digital image 300. Various methods and steps may be used, as has been described above. However, the data information for each margin pixel may be generated based on at least one of the following: (i) using data information of at least one pixel that is located on the Bottom edge 352 of the quadrangle digital image 380, (ii) using data information of at least one pixel that is located to the left of the Bottom edge 352 of the quadrangle digital image 380, (iii) using data information of at least one pixel that is located to the right of the Bottom edge 352 of the quadrangle digital image 380 (see FIG. 3B), (iv) using data information of at least one pixel that is located anywhere on the Bottommost edge 350 of the digital image 300, and (v) using data information that corresponds to any color, including black.

Figure 4A:
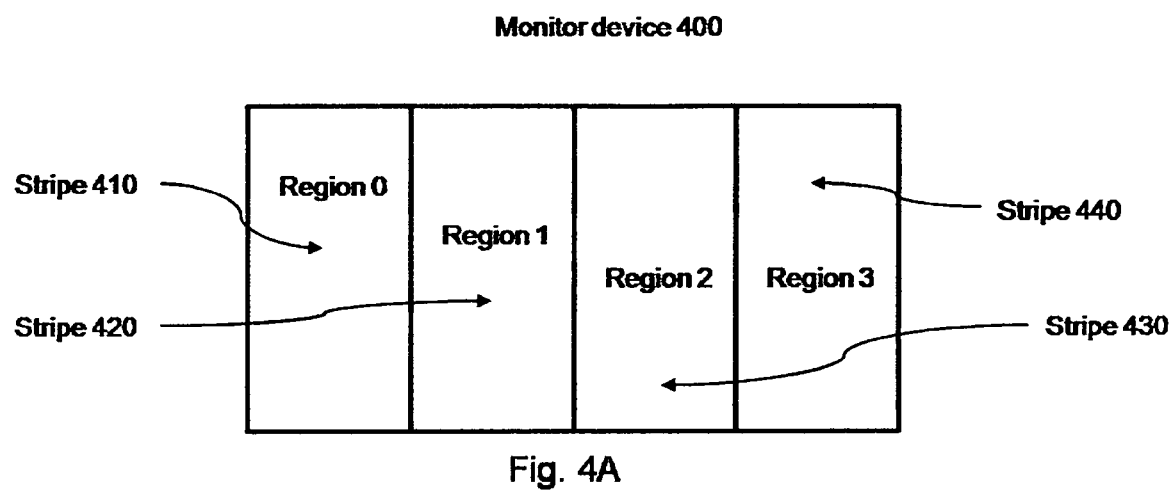
FIG. 4A shows an exemplary electronic display panel system that is split using four regions or stripes.
Figure 4B:
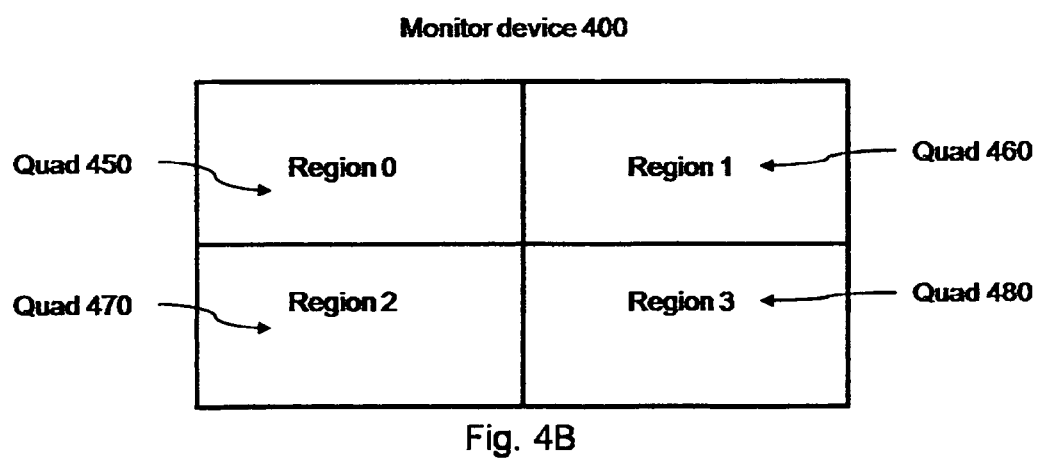
FIG. 4B shows an exemplary electronic display panel system split using with four regions or quadrants.

An electronic display panel, may be referred to as monitor, are used in an ever increasing number of applications that generates very high resolution digital images or demands the ability to display multiple high resolution images. One such exemplary monitor is shown in FIG. 4A, where the monitor device 400 screen (or panel) is split into four Stripes, namely Stripe 410, Stripe 420, Stripe 430, and Stripe 440 that corresponds to the actual screen region define by the panel Region 0, Region 1, Region 2, and Region 3 respectively. Every one of Region 0, Region 1, Region 2, and Region 3 corresponds to a high definition, HD, picture resolution, namely 1920×1080. The splitting of the monitor device 400 screen into four HD regions would overcome many of the challenges associated with the production of a monitor with a single region having a resolution of 3840×2160, and would be at a lower cost and more power efficient. Such monitors are currently available and may be referred to as Quad-HD monitor. The splitting of the screen into multiple regions does present several challenges. For example, when using an HD resolution digital image, it can be displayed well within any one of the four regions of the monitor device 400, namely Region 0, Region 1, Region 2, and Region 3. However, the resultant displayed image will suffer from artifacts at the boundaries of the four regions where the resultant pixels of each region may not be properly or timely placed or aligned with the pixels of the adjacent region.

Figure 5:
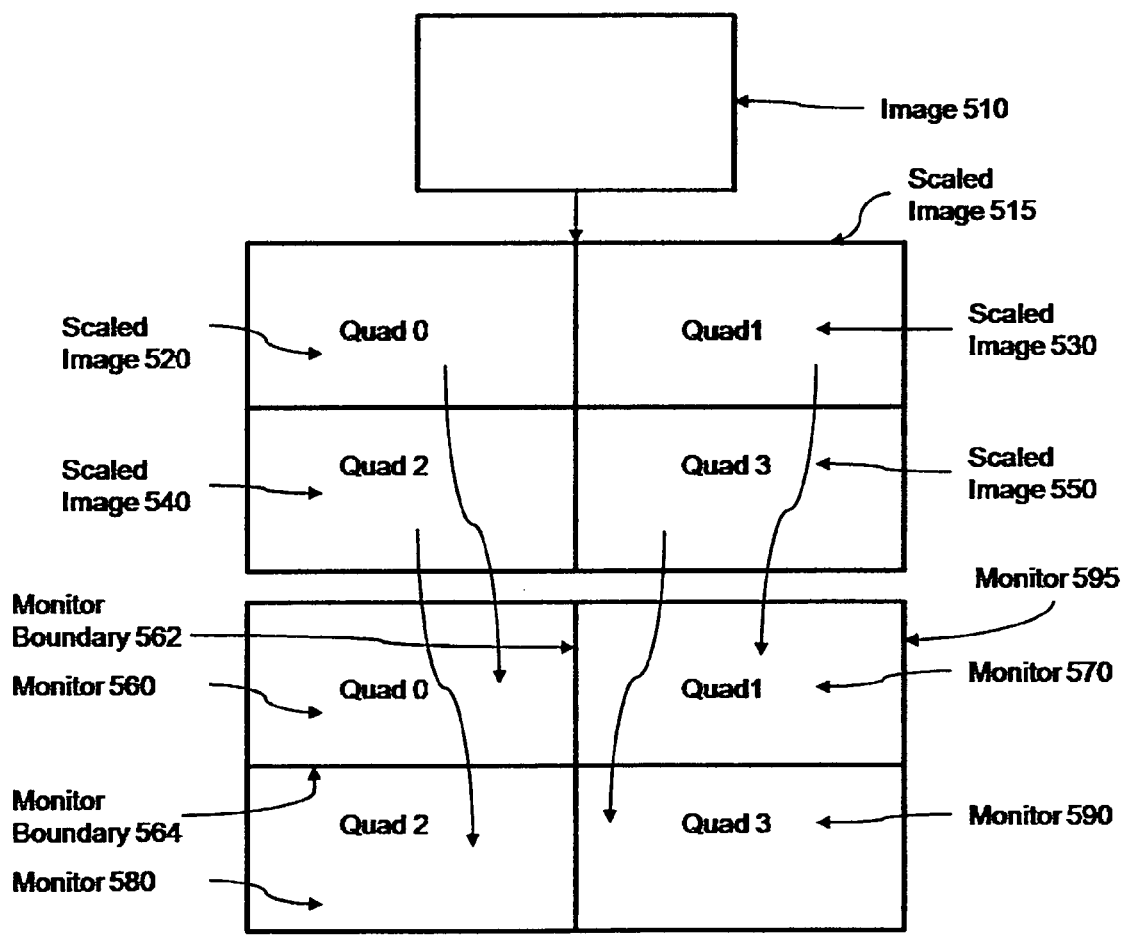
FIG. 5 shows an exemplary way of scaling a digital image that is to be displayed using an electronic display panel that is split into four regions.

An exemplary process of displaying an Image 510 using a Scaled image 515 and a quad display Monitor 595 will be described as shown FIG. 5. First, the Image 510 is scaled up to a resolution that correspond to the resolution of the Monitor 595. The Scaled image 515 is split into four quadrangle scaled images, namely Scaled image 520, Scaled image 530, Scaled image 540, and Scaled image 550. Each of the four quadrangle scaled images having a resolution that correspond to the resolution of a correspondent region of Monitor 595, namely Monitor 560, Monitor 570, Monitor 580, Monitor 590, such that Quad 0 of the Scaled image 520 is displayed using the display region defined by Quad 0 of Monitor 560. Other quadrants of the Scaled image 515 are then respectively displayed using the appropriate quadrant of the display Monitor 595. Accordingly the consequential display of the individual four quadrant of Monitor 595 should reproduce the original Image 510 using the full resolution of Monitor 595. However, annoying visual artifacts resulting from the improper alignment of the displayed pixels located at a common vertical Monitor boundary 562 and/or a horizontal Monitor boundary 564 can be easily viewed especially during video playback of fast moving objects across the four quadrants of the display Monitor 595. The inventive concepts developed by Marseille Networks and described above will be used and described in the following paragraph to faithfully reproduce the Image 510 using Monitor 595 with multiple defined regions.

Figure 6A:
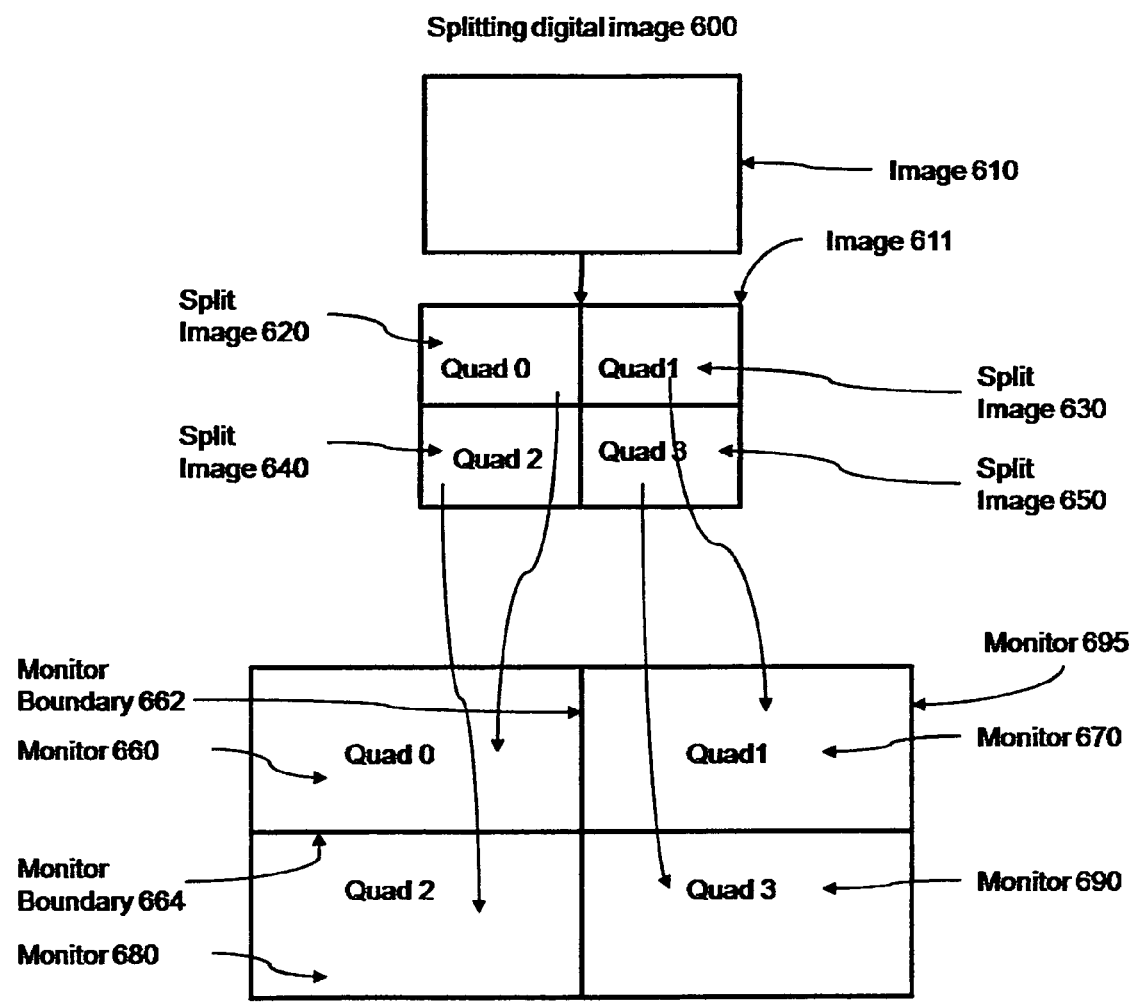
FIG. 6A shows an exemplary digital image that is split into four regions where each region is to be scaled individually and then displayed using an electronic display panel that is split into four regions, in accordance with another embodiment.

Referring to FIG. 6A, the process of displaying an Image 610 using Monitor 695 having four quadrant, namely Monitor 660, Monitor 670, Monitor 680, Monitor 690 is described in accordance with one embodiment. An Image 611 is a processed version of Image 610. The Image 611 is split into four regions, namely Split image 620, Split image 630, Split image 640, and Split image 650, that corresponds to and in proportion to the number of regions of the Monitor 695, namely Monitor 660, Monitor 670, Monitor 680, Monitor 690 respectively. Each one of the Split image 620, Split image 630, Split image 640, and Split image 650 is individually processed and scaled up to the resolution required by the correspondent region of the Monitor 695. In another embodiment, if the Image 610 is already at the full resolution of Monitor 695, then there may not be a need for any processing to produce Image 611, and the Image 611 may be same as Image 610. The processing of each of the Split image 620, Split image 630, Split image 640, and Split image 650 may not include scaling since each of the individual regions of the Image 611 is already at the full resolution of the correspondent region of the Monitor 695.

Figure 6B:
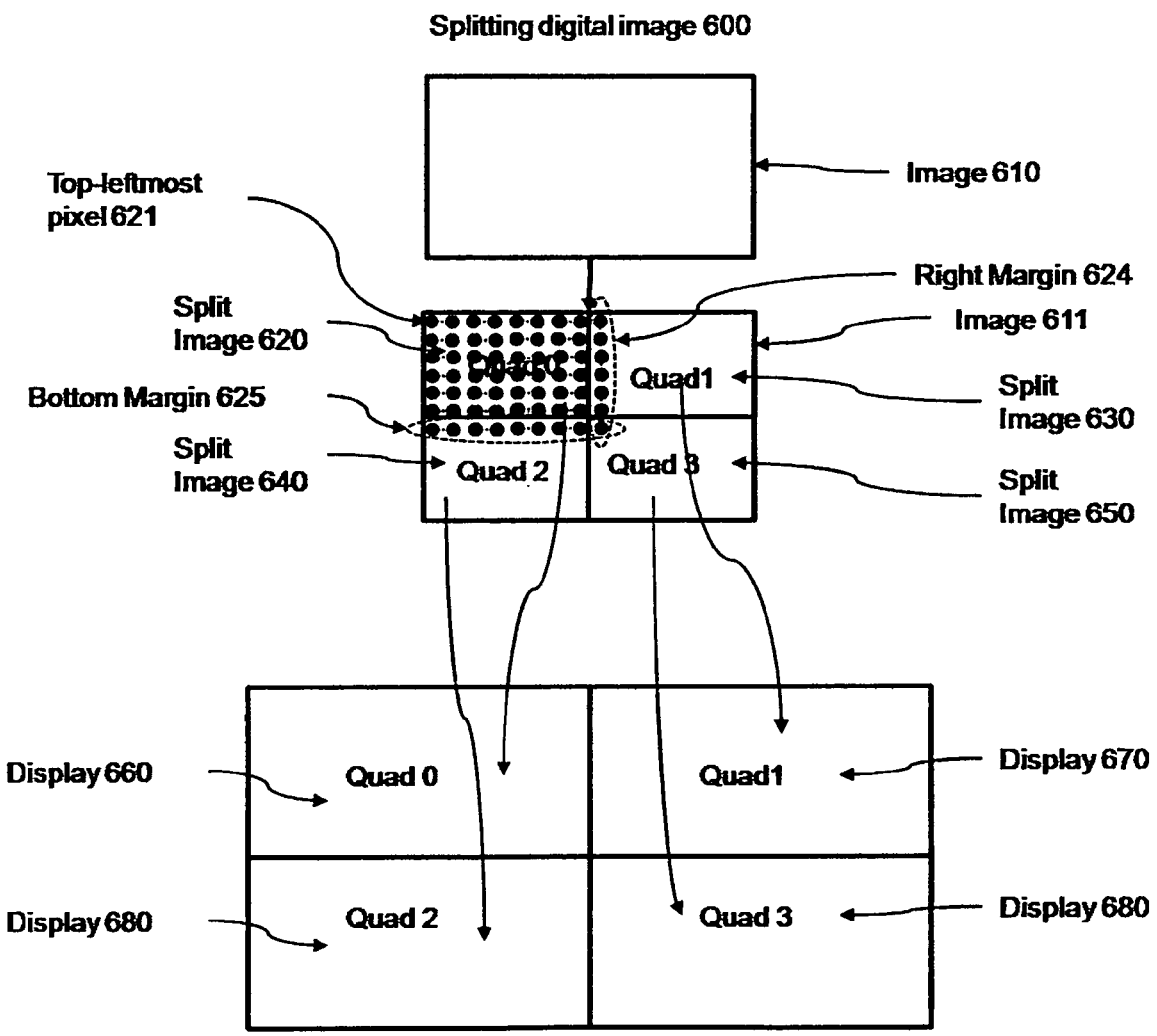
FIG. 6B shows exemplary right margin and bottom margin pixels that are used for scaling the top-left region of the digital image of FIG. 6A, in accordance with another embodiment.
Figure 6C:
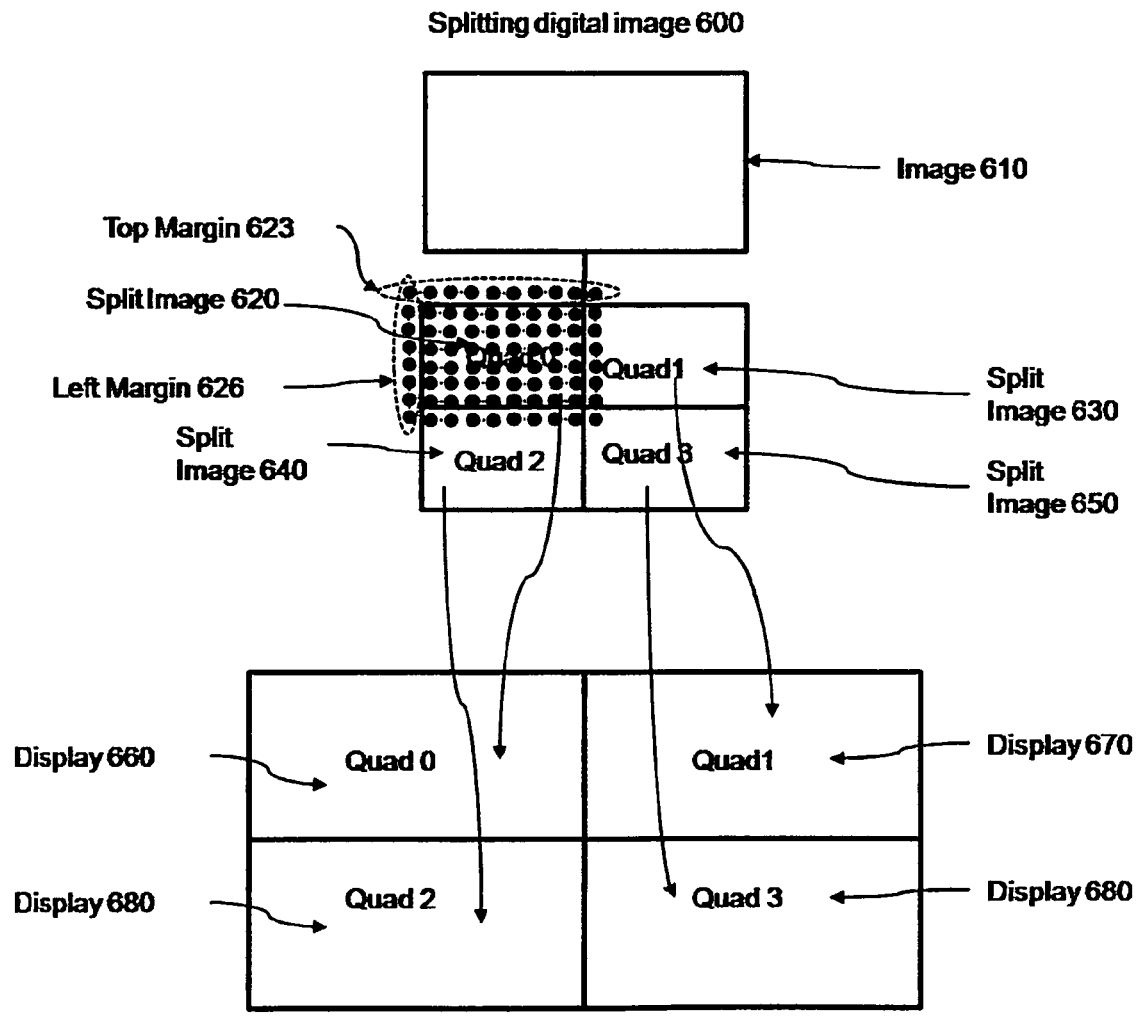
FIG. 6C shows exemplary top margin and left margin pixels that are used for scaling the bottom-right region of the digital image of FIG. 6A, in accordance with another embodiment.

Now referring to FIG. 6B, and using a Split Image 620, corresponding to Quad 0, as an exemplary region of the Image 611 for processing. Exemplary pixels, for illustrative purposes, are arranged in two-dimensional grid format over the entire region, Quad 0, and a Top-leftmost pixel 621 is shown at the top left corner of the Split image 620. The inventive concepts described above are applied to the Split image 620, which corresponds to a quadrangle digital image to be processed. Since the region, Quad 0, is at the top-left quadrant of the Image 611, then a Right margin 624 and a Bottom margin 625 are generated from existing pixels that are part of Split image 630, Split image 640, and Split image 650, as shown in FIG. 6B. Furthermore, since the region, Quad 0, is at the top-left quadrant of the Image 611, then top edge of Split image 620 is collinear with the topmost edge of the Image 611. Similarly, the left edge of Split image 620 is collinear with the leftmost edge of the Image 611. Therefore, a Top margin 623 and a Left margin 626 are created using any one, or a combination of various methods as described above. In order to keep the clarity of the drawings as shown in FIGS. 6A through 6C some objects have not been named but the intended meaning should be very clear from FIGS. 6A-6C and while referencing back to the detailed drawings of FIG. 3A through FIG. 3D.

Figure 7A:
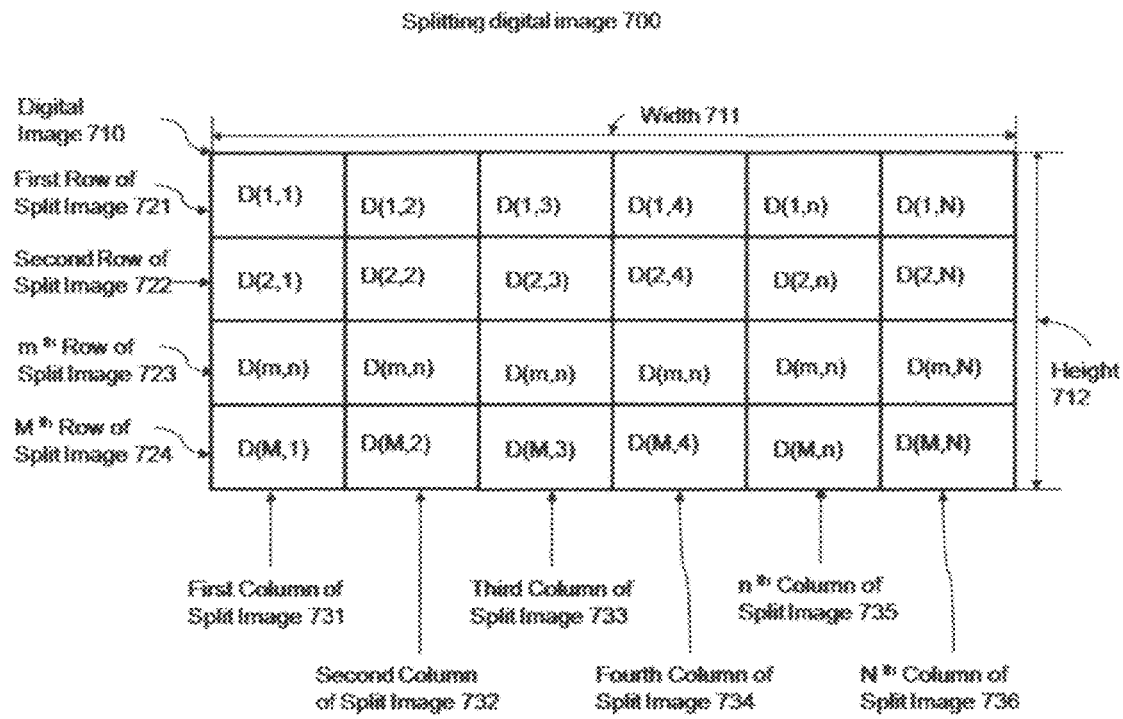
FIG. 7A shows an exemplary partitioning of a digital image into multiple portions using M rows and N columns, in accordance with another embodiment.

A Digital image 710 having a topmost edge, a bottommost edge, a leftmost edge, and a rightmost edge is split into M rows and N columns, and thus defining an M×N array of quadrangle digital images, each of which is identified as $D_{(m,n)}$, as shown in FIG. 7A. The index m represent any one integer of a first range of consecutive integers, wherein the first range corresponds to the number of rows M, and a column index, n, that is any one integer of a second range of consecutive integers, wherein the second range corresponds to the number of columns N. In accordance with one embodiment, every element of the M×N array correspond to a region comprising a quadrangle digital image, and the inventive concepts as described above are applied to each region individually. In accordance with another embodiment, multiple of the elements of the M×N array may be combined to form a single quadrangle digital image and thus can be processed accordingly.

Figure 7B:
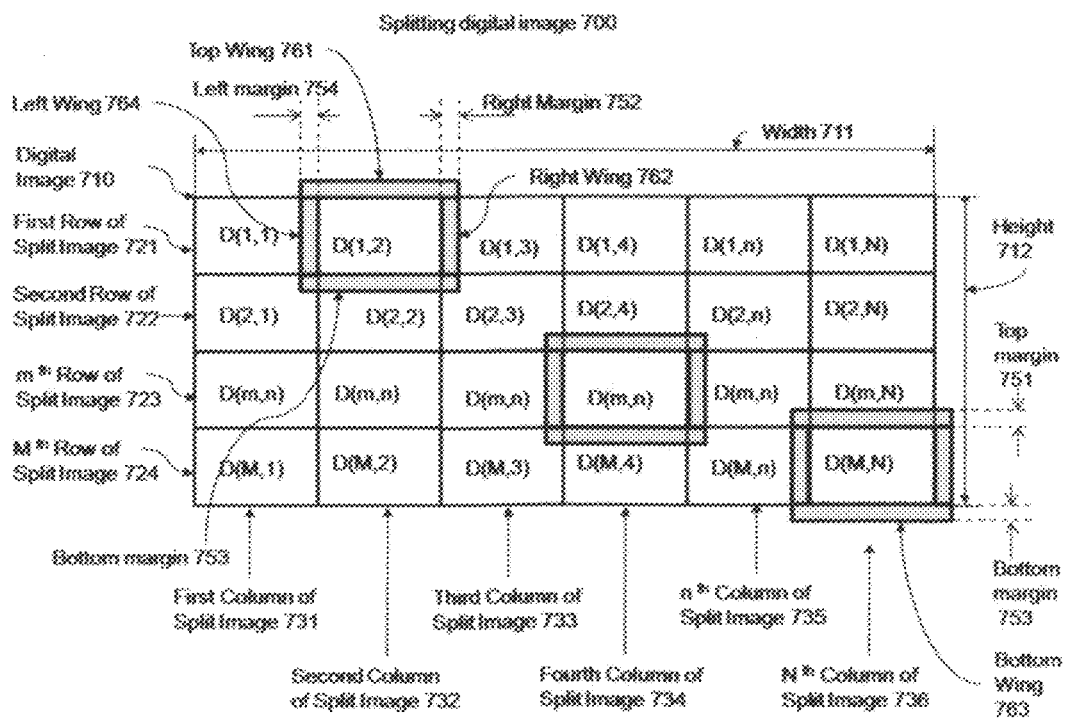
FIG. 7B shows exemplary Top, Right, Bottom, and Left margin of three exemplary portions, namely D(1,2), D(m,n) and D(M,N), of the digital image of FIG. 7A, in accordance with another embodiment.

Margin pixels are determined for an exemplary $D_{(1,2)}$, $D_{(m,n)}$ and $D_{(M,N)}$ as shown in FIG. 7B, for illustrative purposes. A Top margin 751, a Bottom margin 753, a Left margin 754, and a Right margin 752. A new quadrilateral digital images, $Q_{(m,n)}$, is generated comprising the $D_{(m,n)}$ portion of the digital image, as defined by the array element that corresponds to the quadrangle digital image $D_{(m,n)}$, and a second portion of the digital image, defined by the Top margin 751, the Bottom margin 753, the Left margin 754, and the Right margin 752. Each new quadrilateral digital images is larger than the corresponding $D_{(m,n)}$ and in accordance with the following relationships:

$$Q_{(m,n)} \text{ width} = \text{Left margin} + D_{(m,n)} \text{ width} + \text{Right margin}, \quad \text{Eq. 3}$$

$$Q_{(m,n)} \text{ height} = \text{Top margin} + D_{(m,n)} \text{ height} + \text{Bottom margin}, \quad \text{Eq. 4}$$

Each of the quadrangle digital images $D_{(m,n)}$ is centered within the quadrilateral digital image $Q_{(m,n)}$ using the Top margin 751, the Bottom margin 753, the Left margin 754, and the Right margin 752. In addition, at least a first pixel of the quadrilateral digital image $Q_{(m,n)}$ is determined to be located beyond any one of the topmost edge, the bottommost edge, the leftmost edge, and the rightmost edge of the Digital image 700 if any one of a $D_{(m,n)}$ top edge, a $D_{(m,n)}$ bottom edge, a $D_{(m,n)}$ left edge, and a $D_{(m,n)}$ right edge of a quadrangle digital image $D_{(m,n)}$, is collinear with any one of the topmost edge, the bottommost edge, the leftmost edge, and the rightmost edge of the Digital image 700. Appropriate data information is generated for the first pixel based on at least one of the following steps: (i) using data information of at least one pixel that is located on any one of the $D_{(m,n)}$ top edge, the $D_{(m,n)}$ bottom edge, the $D_{(m,n)}$ left edge, and the $D_{(m,n)}$ right edge of the correspondent quadrangle digital image $D_{(m,n)}$, (ii) using data information of at least one pixel that is located on any one of the topmost edge, the bottommost edge, the leftmost edge, and the rightmost edge of the Digital image 700, and (iii) using data information that corresponds to any color, including black.

In a similar fashion, data information for all margin pixels is determined first by checking if the margin pixels are within the Digital image 700 or are beyond any one of the topmost edge, the bottommost edge, the leftmost edge, and the rightmost edge of the Digital image 700. Various method of generating and/or creating data information for margin pixels have been described in details in this disclosure and used here for every quadrilateral digital image $Q_{(m,n)}$. In accordance with another embodiment, it should be noted that the general solution described above for splitting any Digital image 700 into an array of M×N array of quadrangle digital images is not limited to two-dimensional arrangement of all elements of the array. For example, multi-dimensional arrangement of (M×N×Z) array of quadrangle digital images would benefit greatly and the inventive concepts here are easily applied to each element of the multi-dimensional arrangement of array that corresponds to a quadrangle digital image.

Figure 8A:
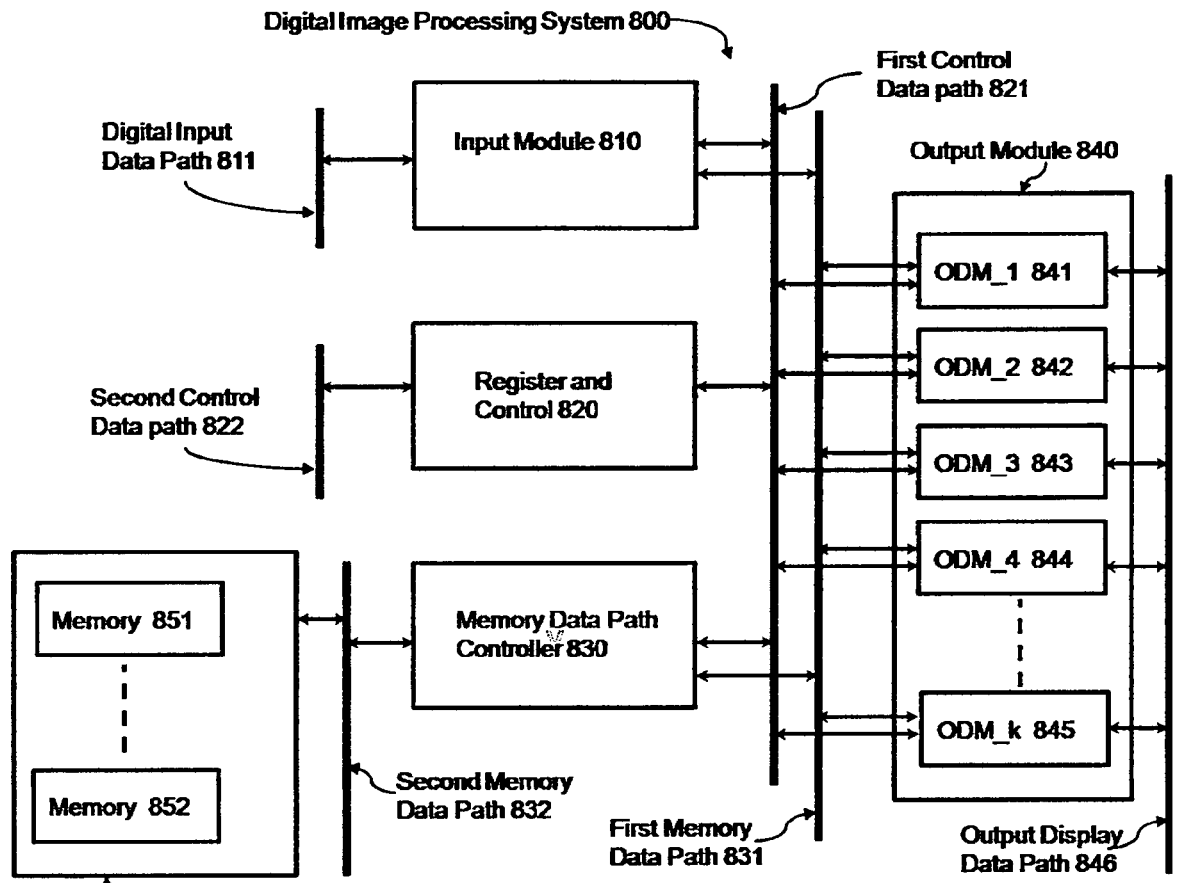
FIG. 8A is a block diagram illustrating an exemplary system for processing a digital image in accordance with one embodiment.

A block diagram of a Digital Image Processing System 800 is shown in FIG. 8A and is briefly described. Digital images can be formed, transmitted, stored, or displayed using a video format standard that specifies how video data information for each pixel is generated. Currently, many video format standards are used around the world. Various types of image capturing systems can capture video data information of digital images in accordance with at least one video format standard, and is able to transfer the video data information of the digital images by using corresponding signals over a wired or wireless connection. The Digital Input Data Path 811 comprises multiple conductors to transfer video data information signals of a digital image to an Input Module 810. An example of a digital image comprising two hundred forty pixels organized in twelve lines and each line comprising twenty pixels is shown in FIG. 1 as Digital Image 100. The Input Module 810 captures and processes the video data information of the digital image, and initiates memory write transaction to store the processed video data information of the digital image into a Memory 850 using a Memory Data Path Controller 830 via a First Memory Data Path 831 and a Second Memory Data Path 832. A Register and Control Module 820 comprises programmable registers to store operational data information for the processing of the captured video data information of the digital image throughout the Digital Image Processing System 800. The Register and Control Module 820 further comprises logic circuitry needed to respond to and communicate with various modules and components of the Digital Image Processing System 800 via a First Control Data Path 821. In addition, the Register and Control Module 820 is coupled to a Second Control Data Path 822 providing a user interface to gain access to, communicate with, respond to, and control various functions of the Digital Image Processing System 800. The Memory Data Path Controller 830 communicates with the Input Module 810 and an Output Module 840 via the First Memory Data Path 831. The Memory Data Path Controller 830 communicates exclusively with the Memory 850 via the Second Memory Data Path 832. Furthermore, the Memory Data Path Controller 830 is coupled to the Register and Control Module 820 via the First Control Data Path 821. The Output Module 840 retrieves video data information from the Memory 850 using the Memory Data Path Controller 830 and via the First and Second Memory Data Path, 831 and 832 respectively. Furthermore, the Output Module 840 processes the retrieved video data information, and outputs a processed version of the digital image onto the Output Display Data Path 846. The Output Module 840 is capable of driving high definition electronic display systems comprising multiple regions, where each region displays a portion of the overall digital image to be displayed. The Output Module 840 comprises output display modules ODM_1, ODM_2, ODM_3, ODM_4, through ODM_k, where "k" corresponds to the total number of regions and is equivalent to "m" rows multiplied by "n" columns, relative to how the electronic display is divided into "m" rows and "n" columns, e.g. as shown in FIG. 7B. Detailed description of various parts, components, modules and the operation of the Digital Image Processing System 800 will be provided in the following paragraphs.

The Memory Data Path Controller 830 handles as many memory access requests as needed for all the output display modules ODM_1 through ODM_k, which are part of the Output Module 840, so that the video data information of the Digital Image 900 is processed as desired. The access efficiency to and from Memory 850 has a large impact on the scalability of the Digital Image Processing System 800, and the overall video data information processing throughput. Various modes or types of memory access are used and the Memory Data Path Controller 830 provides the ability to handle different types of back-to-back memory access requests. The design and performance of the Second Memory Data Path 832 and the First Memory Data Path 831 contribute as well to the overall performance and efficiency desired. The component, modules and functional description of the Digital Image Processing System 800, as shown in FIG. 8A, is meant as an exemplary guide of how video data information of a digital image is captured from a Digital Input Data Path 811, processed, and outputted to multiple regions of an electronic display system using the Output Display Data Path 846. Various alternate embodiments are discussed in various levels of details in the following paragraphs as to further show the flexibility of the Digital Image Processing System 800 architecture and should not be considered as a limitation of the embodiments. It is important to note that the Digital Image Processing System 800 comprises many other blocks, subsystems, control signals, Clock modules, signal interface circuitry, PLL etc. . . . , which are not shown in FIG. 8A in order to maintain clear drawings.

Figure 8B:
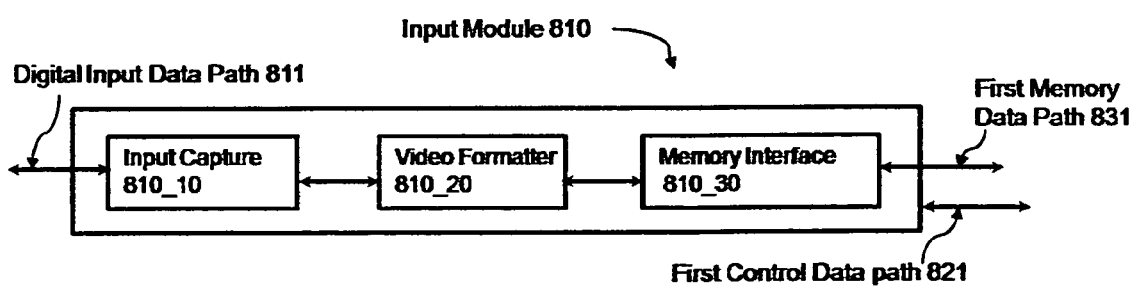
FIG. 8B is a block diagram illustrating an exemplary input module for processing a digital image in accordance with one embodiment.

The Input Module 810 comprises three main components, an Input Capture 810_10 coupled to the Digital Input Data Path 811 and a Video Formatter 810_20, and a Memory Interface 810_30 coupled to the First Memory Data Path 831 and the Video Formatter 810_20, as shown in the block diagram of FIG. 8B. The Input Capture 810_10 comprises logic circuitry to receive video data information, of an input digital image, via the Digital Input Data Path 811, in accordance with a video format standard. Depending on the design requirement, the Digital Image Processing System 800 may accommodate many different video formats. An exemplary video format of the video data information of the input digital image is shown below:
1. RGB 4:4:4, 24 bits per pixel
2. YUV 4:4:4, 24 bits per pixel
3. YUV 4:2:2, 16 bits per sample, YU, YV, YU etc.
4. YUV 4:2:2, 8 bits per sample, U, Y, V, Y, U etc.

In addition, the video format standard specifies display control information such as Vertical and Horizontal synchronization, Vsync and Hsync, information that corresponds to and provides information regarding how the pixels of the input digital image are arranged in accordance with the resolution and the video format standard of the input digital image. A pixel data enable signal, which may be triggered from the Vsync signal, may be added to indicate the presence of valid lines (or rows) of pixels to be captured or displayed. Alternatively, a pixel data enable signal, which may be triggered from the Hsync signal, may be used to indicate the presence of valid pixels, within a line (or rows) of pixels, to be captured or displayed. Thus, the ability to control the blanking, or the display, of a portion of the input digital image is enhanced by using appropriate data enable signals. Furthermore, the Digital Input Data Path 811 comprises at least one channel to transfer video data information signals to be received by the Input Capture 810_10 from a digital image source. The channel may comprise one or multiple conductors to carry the video data information signal in accordance with various desired signaling schemes, e.g. Low Voltage Differential Signaling or LVDS. In certain application, some digital image sources may require multiple channels to carry the video data information of the digital image; this is especially true whenever the digital image resolution is large enough such that the available channel bandwidth is not large enough to enable the transfer of the required video data information. In a preferred embodiment, the Digital Input Data Path 811 comprises four input channels, where each channel comprises five differential pairs of conductor and can operate at a variable frequency rate in accordance with the video format standard of the input video data information stream, e.g. 24-bit RGB 4:4:4 operating at a frequency of 74.25 MHz. In accordance with another embodiment, the output of multiple digital image sources may be coupled to the Digital Input Data Path 811, where at least one channel may be used to transfer their video data information to one or multiple instances of the Input Capture 810_10 module, as will be described and discussed later on in this disclosure.

The Input Module 810 further comprises logic circuitry to receive or generate a first clock that is associated with the video data information. The Input Capture 810_10, Video Formatter 810_20 and Memory Interface 810_30 may use this first clock for their operation. Multiples clocks may be generated from, or in addition to, the first clock as may be required. For example, the first clock may be inputted to a Phase Locked-Loop (PLL) or other types of circuitry to maintain and distribute clocks to other components of the Digital Image Processing System 800. An output video display clock may also be derived from or linked to the first clock, thus providing the ability for the output display to be locked to the input video data information stream. As it has been mentioned earlier, various blocks or components may not be shown or discussed since their details is not necessary for a person of ordinary skills in the art to understand and practice the invention. Furthermore, the Digital Image Processing System 800 may comprise a central processing unit CPU and its associated components, e.g. software, firmware and hardware, where some of the Digital Image Processing System 800 operations may be executed, managed, defined, substituted for one or more modules, configured or programmed to produce the desired system functions.

In accordance with one embodiment, the Video Formatter 810_20 receives a first digital image that is captured by the Input Capture 810_10 using a first video format, e.g. RGB 4:4:4, having twenty-four bits for every pixel of the digital image. The Video Formatter 810_20 generates at least a second and third digital image, based on a second video format e.g. YUV 4:2:2, using the first digital image received. The second digital image comprises the luminance video data information (Y) of the digital image, while the third digital image comprises the chrominance video data information (UV) of the first digital image. The Memory Interface 810_30 generates at least one first memory write command to transfer the video data information of the second digital image to the Memory Data Path Controller 830 via the First Memory Data Path 831. The total number of memory write command required to transfer the video data information of the second digital image depends on the architecture of Digital Image Processing System 800. Various techniques may be used where one or multiple memory write commands may be used to effect the complete transfer of the video data information from the Input Module 810 to the Memory 850. An exemplary transfer of video data information to the Memory 850 is described in the following paragraphs.

The Memory Data Path Controller 830 receives the first memory write command via the First Memory Data Path 831 and generates at least one first memory device write command to effect a transfer of the video data information of the second digital image to the Memory 850 via the Second Memory Data Path 832. The first memory write command comprises a first base index that is used by the Memory Data Path Controller 830 to generate a first base address that indicates a starting address of a first region within the Memory 850, where the video data information of the second digital image is to be stored. The Memory Data Path Controller 830 embeds the first base address within the first memory device write command. Furthermore, the Memory 850 comprises control circuitry to receive the first memory device write command, and further comprises receive circuitry to receive the second video data information via the Second Memory Data Path 832. The Memory 850 writes the second video data information into the first region of the Memory 850 starting from the memory location as indicated by the first base address. Additional data information, which may be embedded in the memory device write or read commands, may be used to further specify an offset address for the starting memory location or how many memory locations are to be used for storing the video data information, as will be described the paragraphs below.

The Memory Interface 810_30 generates at least one second memory write command to transfer the video data information of the third digital image to the Memory Data Path Controller 830 via the First Memory Data Path 831. The Memory Data Path Controller 830 receives the second memory write command via the First Memory Data Path 831 and generates at least one second memory device write command to effect a transfer of the video data information of the third digital image to the Memory 850 via the Second Memory Data Path 832. The second memory write command comprises a second base index that is used by the Memory Data Path Controller 830 to generate a second base address, that indicates a starting address of a second region within the Memory 850, where the video data information of the third digital image is to be stored. The Memory Data Path Controller 830 embeds the second base address within the second memory device write command. Furthermore, the Memory 850 comprises control circuitry to receive the second memory device write command, and further comprises receive circuitry to receive the third video data information via the Second Memory Data Path 832. The Memory 850 writes the third video data information into the second region of the Memory 850 starting from the memory location as indicated by the second base address.

Figure 8C:
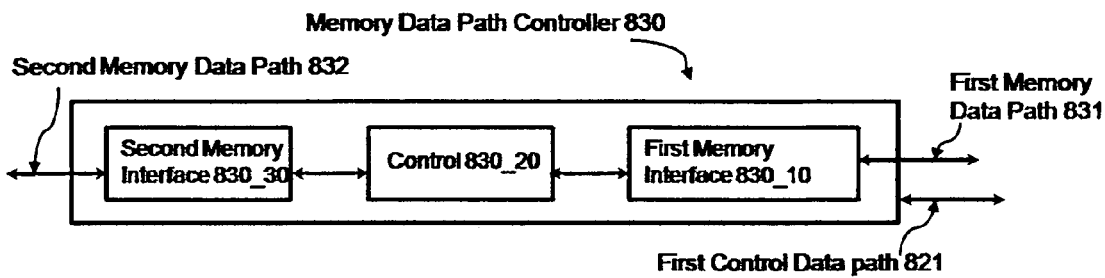
FIG. 8C is a block diagram illustrating an exemplary memory data path controller for processing a digital image in accordance with one embodiment.

Now referring to FIG. 8C, the Memory Data Path Controller 830 comprises a First Memory Interface 830_10 to receive the second video data information from the First Memory Data Path 831, in response to at least one first memory write command. The Memory Data Path Controller 830 further comprises Control 830_20 logic circuitry to manage, aggregate and/or control the video data information flow and generate the necessary information to initiate a memory device write transaction using the information embedded in the memory write command. The Control 830_20 manages and provides the appropriate buffering for at least a portion of the second video data information being received while waiting to complete the memory device write transaction. The Second Memory Interface 830_30 generates at least one first memory device write command, using the information extracted or generated in response to the memory write command, and starts to send the received second video data information to the Memory 850 via the Second Memory Data Path 832. The second video data information is stored in the first region of Memory 850 using the embedded first base address of the starting memory location, as described above. The third video data information is transferred in a similar fashion from the Input Module 810 to the second region of the Memory 850, in response to at least one second memory write command and at least one second memory device write command. Furthermore, the Memory Data Path Controller 830 provides management and control of data information flow to and from the Memory 850 via the Second Memory Data Path 832 in response to other modules requests for memory access. For example, the Memory Data Path Controller 830 provides management and control of data information flow to and from the Input Module 810 and Output Module 840, via the First Memory Data Path 831, such that the Digital Image Processing System 800 is able to handle multiple, back-to-back, or simultaneous memory access requests to and from Memory 850. Furthermore, the Memory Data Path Controller 830 has the mechanisms to handle synchronous and asynchronous conditions, and has the capability to interface and control data information flow to and from various components of the Digital Image Processing System 800 as may be necessary, where each component may be using different clock domains.

The Register and Control Module 820 provides the necessary access and operational settings to various programmable components, e.g. registers, within the Digital Image Processing System 800 via the First Control Data Path 821. In addition, the Second Control Data Path 822 provides the necessary interface, e.g. I²C, for an external device to access and set various programmable registers of various components and modules of the Digital Image Processing System 800 via the First Control Data Path 821. The Register and Control Module 820 performs all bus protocols to read and write internal registers, with both round-robin arbitration and a full acknowledge handshake to enable cross-clock-domain operation. Furthermore, the Digital Image Processing System 800 may comprise a Read Only Memory (ROM) that contains the default configuration that the Register and Control Module 820 uses to program various modules on power-up. Hence, relieving an external device from using the Second Control Data Path 822 to program the Digital Image Processing System 800 registers to a default power-up state. The Register and Control Module 820 can service multiple clients within the Digital Image Processing System 800 via the First Control Data Path 821 and at least one external client via the Second Control Data Path 822. In the following paragraphs, an exemplary write and read transactions through the Register and Control Module 820 are briefly described.

A source module set a request for a write command for a specific register of a specific module. The address of the specific register and the address of the specific module are embedded within the write command. The source module can be any one of the Digital Image Processing System 800 internal modules, where the write command is sent via the First Control Data Path 821, or an external module, where the write command is sent via the Second Control Data Path 822. The destination module can be any one of the Digital Image Processing System 800 internal modules. The Register and Control Module 820 detects the write command and in turn places the write address for that request on a register address bus portion of the First Control Data Path 821, and places the write data on a register write data bus portion of the First Control Data Path 821. The Register and Control Module 820 then activates the decoded write strobe for the destination module. Clock synchronization may be implemented to insure the destination module will receive proper write strobe, e.g. dual-rank synchronization of the write strobe. In response to the write strobe, the destination module samples the data, registers address, and writes the data to the appropriate internal register location within the destination module as indicated by the register address. At that time, the destination module may send an acknowledge signal to the Register and Control Module 820. The destination module may hold the acknowledge signal true until it detects the release of the write strobe from the Register and Control Module 820. The Register and Control Module 820 may further dual-rank synchronizes the returning acknowledge signal before using it to decide to release the write strobe. Once the write strobe is released, the Register and Control Module 820 is able to perform another read or write transaction. In an alternate embodiment, the write strobe may be used to designate a write cycle to multiple registers at the same time. The write command specifies a broadcast type of command indicating a range of registers to be written at the same time with the same data. In yet another embodiment, the write strobe may be used to designate a write cycle to multiple registers that are located in different modules at the same time. The write command specifies a broadcast type of command indicating the address of one or multiple registers to be written. All the destination modules that receives the broadcast type write command, initiate a write cycle to their register as identified by the register address within the command cycle. This can produce an efficient and fast way to reconfigure Digital Image Processing System 800, e.g. when image size changes or when a change in video format standard is detected or required. An exemplary register read request is described in the next paragraph.

A source module set a request for a read command of a specific register within a specific module. The address of the specific register and the address of the specific module are embedded within the read command. The source module can be any one of the Digital Image Processing System 800 internal modules, where the read command is sent via the First Control Data Path 821, or an external module, where the read command is sent via the Second Control Data Path 822. The destination module can be any one of the Digital Image Processing System 800 internal modules. The Register and Control Module 820 detects the read command and in turn places the read address for that request on the register address bus portion of the First Control Data Path 821. The Register and Control Module 820 then activates the decoded read strobe for the destination module. Read strobe synchronization is achieved in a similar fashion to the write strobe synchronization, as described above, e.g. dual-rank synchronization of the read strobe. The destination module places the read data on a read data bus portion of the First Control Data Path 821. At that time, the destination module may asserts an acknowledge signal and send it to the Register and Control Module 820. The destination module will hold the acknowledge signal true until it detects the read strobe from the Register and Control Module 820 going false. The Register and Control Module 820 may dual-rank synchronizes the returning acknowledge signal before making the decision to release the read strobe. Once the read strobe is released, the Register and Control Module 820 is able to perform another read or write transaction. It is important to note that the First and Second Control Data Path 821 and 822 may use various types of handshake control. A dedicated portion of the First and Second Data Path 821 and 822 may be used exclusively for any of the address, data, and control signals or may be used in a multiplexed fashion depending on the desired design and system performance criteria. An alternate embodiment of Register and Control Module 820 includes a dedicated point-to-point read data bus and a dedicated party-line write data bus that are implemented between the Register and Control Module 820 and the Digital Image Processing System 800 modules via the First and Second Control Data Path 821 and 822. The following paragraphs describe the operation of the Output Module 840.

An exemplary electronic display panel may comprise many regions and each of which is independently driven. Therefore as many output display modules (ODM) as display regions are required, where each ODM retrieves, processes, and outputs onto the Output Display Data Path 846 the processed video data information for its designated display region. In accordance with one embodiment, the architecture of the Digital Image Processing System 800 is developed with the ability to drive a large display panel that comprises sixteen display regions. In order to provide such a flexible system architecture to be used with various types of electronic display panels, a unique and programmable design features are implemented within each ODM. One of the ODM design features is that each ODM comprises identical programmable circuitry, where each ODM can be programmed, e.g. enumerated using sequential numbers 0, 1, 2 . . . , such that only one of the ODMs will behave as a Master ODM and all of the others will behave like Slave ODMs. One of the functions of the Master ODM is to control and insure that the starting point of the Vertical and Horizontal sync signals is the same for all of the ODMs. In addition, the master ODM further controls and intervenes in the multiplexing of the data being read from specific registers within each of the Slave ODMs through the First Control Data Path 821. Any of the ODMs comprises the circuitry to operate as a Master ODM if it is programmed as such. Therefore, the ability to scale the Digital Image Processing System 800 to drive large number of display regions with as many numbers of ODMs is greatly enhanced by the simple functional ability to enumerate each ODM and program its functionality. Some additional advantages are gained when scaling the Digital Image Processing System 800 such as: (i) a reduction of the amount of time required to test the Output Module 840 and to verify the functionality of each ODM, and (ii) correct routing of each ODM within the overall Digital Image Processing System 800.

The Output Module 840, as shown in FIG. 8A, comprises multiple independent output display modules, namely ODM_1 841, ODM_2 842, ODM_3 843, ODM_4 844, and ODM_k 845. Each of the ODMs is capable of accessing and independently retrieving, from Memory 850, video data information of a digital image having a known starting memory location and a first width and height. The digital image may constitute a portion, or the entirety, of the input digital image as captured by the Input Module 810. Each of the ODMs outputs onto the Output Display Data Path 846 a processed digital image that corresponds to the retrieved digital image from Memory 850. For example, a Quad HD electronic display panel, Monitor 695 as shown in FIG. 6A, comprises four identical display regions each with a predefined resolution and a second width and height. In one embodiment, any of the display regions may be specified using a different resolution and a different width and height for each region. Therefore, each output display module, e.g. ODM_1, can be programmed, independently from other ODMs, to process the retrieved digital image and to display it exclusively in accordance with the requirement of the display region that the output display module is assigned to drive, e.g. resolution, width and height, video format, or mixing other digital image input. Normally, the display region width and height have larger dimensions as defined by the second width and height, than the retrieved digital image from Memory 850 as defined by the first width and height. Usually, the horizontal scaling ratio of the second width divided by the first width is equal to the vertical scaling ratio of the second height divided by the first height such that the aspect ratio of the digital image is kept constant.

A horizontal or vertical scaling ratio of one indicates that the output resolution in the specified dimension, i.e. horizontal or vertical, is the same as the input resolution and no scaling takes place. However, each of the ODM_1 841, ODM_2 842, ODM_3 843, ODM_4 844, and ODM_k 845 comprises programmable circuitry capable of processing and scaling the retrieved digital image using an arbitrary horizontal scaling ratio and an arbitrary vertical scaling ratio, that do not necessarily need to be equal. This is especially beneficial in processing digital images using various video format standards that may specify different vertical and horizontal resolutions. Thus, different vertical and horizontal scaling ratios are used in order to properly process and display the digital image using the specified display region resolution. This is illustrated in the following example. A first digital image with a resolution of 720×480 is to be displayed using the display region, Monitor 660 as shown in FIG. 6A, having a resolution of 1440×960. Thus, both the horizontal and vertical scaling ratios equal to two, and the processing of the digital image includes same scaling in the horizontal and vertical directions. Similarly, if a second image having a resolution of 360×480 and it is to be displayed using the full display region, Monitor 660, then it becomes apparent that the horizontal scaling ratio is equal to four (1440 divided by 360), and the vertical scaling ratio is equal to two (960 divided by 480). Therefore, the processing of the second digital image includes different scaling in the horizontal and vertical directions and the processed second digital image is displayed using the full display region resolution of 1440×960. Furthermore, the output display modules can be programmed to process and scale digital images using non-integer vertical and horizontal scaling ratios, e.g. a horizontal scaling ratio of 2.5 may be used while a vertical scaling ration of 1.5 may be used.

Various types of electronic display monitors with multiple defined regions may be coupled to the Output Display Data Path 846 to receive and to display the processed video data information of the digital images processed by each of the output display modules. Furthermore, an electronic display monitor may comprise an arbitrary number of display regions as may be specified by M rows and N columns e.g. see FIGS. 7A, 7B and FIG. 9A, where the total number of regions can be represented by M rows times N columns. Hence, the Output Module 840 would comprise ODM_1 through ODM_k output display modules, where k=M×N. The ODM_k represents the $k^{th}$ output display module that outputs, onto the Output Display Data Path 846, a $k^{th}$ processed digital image to be displayed via the $k^{th}$ region of the electronic display panel. The Output Display Data Path 846 may comprise a single dedicated channel for each of the display regions of the electronic display panel. Alternatively, a common channel may be used where processed video data information is tagged with the destination address of any one of the regions of the electronic display monitor. A Quad HD display panel is an exemplary electronic display panel with M=2 and N=2 and is used in the following paragraphs to describe in further details the operation of the Output Module 840, see FIG. 6A and FIG. 8A.

In accordance with one embodiment, the Output Display Data Path 846 comprises four independent channels. Each channel is used to couple one of the output display modules, namely ODM_1 841, ODM_2 842, ODM_3 843, and ODM_4 844, to one of the regions of the electronic display panel Monitor 695, namely Monitor 660, Monitor 670, Monitor 680, and Monitor 690. Each of the ODM_1 841, ODM_2 842, ODM_3 843, and ODM_4 844 comprises identical circuitry and independently retrieves and processes a designated portion of the Image 610, namely the Split 620, Split 630, Split 640, and Split 650 respectively, as described above and in FIG. 6A. The output display module ODM_1 841 processes and outputs, onto its dedicated channel of the Output Display Data Path 846, the video data information of the processed portion of the Split Image 620. The Monitor 660 receives and displays the video data information of the processed portion of the Split Image 620 via the Output Display Data Path 846. Similarly, each of the ODM_2 842, ODM_3 843, and ODM_4 844 retrieves and processes the Split 630, Split 640, and Split 650 respectively. Furthermore, each of the ODM_2 842, ODM_3 843, and ODM_4 844 then outputs, onto its dedicated channel of the Output Display Data Path 846, the video data information of the processed Split Image 630, Split 640, and Split 650, respectively. The Monitor 670, Monitor 680, and Monitor 690 receive and display the video data information of the processed Split Image 630, Split 640, and Split 650 respectively. The overall image displayed on Monitor 695 corresponds to the original Image 610.

Figure 8D:
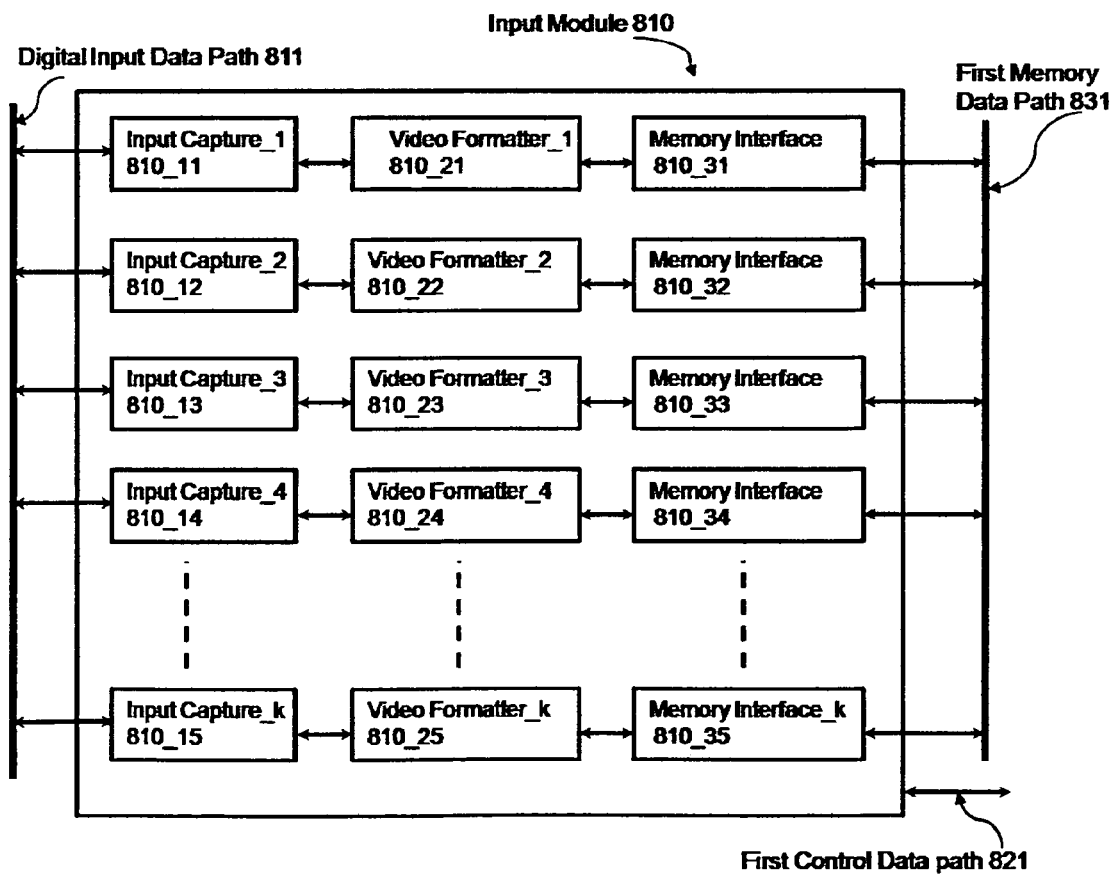
FIG. 8D is a block diagram illustrating another exemplary input module for processing a digital image in accordance with one embodiment.

The Input Module 810, in accordance with one embodiment, is shown in FIG. 8D. The architecture of Input Module 810 comprises "k" instances of the Input Module 810 as shown in FIG. 8B. Input capture modules, namely Input Capture_1 830_11, Input Capture_2 830_12, Input Capture_3 830_13, Input Capture_4 830_14, and Input Capture_k 830_15 (to be referred to as ICMs) are used to capture video data information of transferred digital images via the Digital Input Data Path 811. A single or multiple digital images sources may be used to output their respective digital images onto the Digital Input Data Path 811, which may comprise a dedicated channel for each source or a common channel for all sources. Whatever technique is used it must be able to sustain the amount of video data information to be transferred as may be desired or specified by the Digital Image Processing System 800. The architecture of the Input Module 810 shown in FIG. 8D provides the ability to (i) increase the input capture bandwidth, (ii) receive multiple digital images from multiple sources via the Digital Input Data Path 811, (iii) split a captured digital image into multiple regions, and (iv) accommodate the simultaneous capturing and processing of digital images having different video format. The captured video data information is processed using Video Formatter_1 830_21, Video Formatter_2 830_22, Video Formatter_3 830_23, Video Formatter_4 830_24, and Video Formatter_k 830_25. Each of the video formatter modules comprises circuitry to receive video data information from their correspondent ICM, i.e. the Input Capture_1 830_11, Input Capture_2 830_12, Input Capture_3 830_13, Input Capture_4 830_14, and Input Capture_k 830_15 respectively. Each of the video formatter modules functions in a similar fashion to the Video Formatter 810_20 shown in FIG. 8B and described above. The continuous increase in demands for higher resolution digital images provide the needs to have a flexible architecture for the Digital Image Processing System 800 to meet such demands, and any new additional requirements as it may become necessary, e.g. a different or a newly developed video format standards. In accordance with one embodiment, each of the ICMs is used to capture a predetermined portion of an input digital image, where each portion is then processed and stored in Memory 850 using the corresponding memory interface module. The memory interface modules, Memory Interface_1 830_31, Memory Interface_2 830_32, Memory Interface_3 830_33, Memory Interface_4 830_34, and Memory Interface_k 830_35, function in a similar fashion to the Memory Interface 810_30 module shown in FIG. 8B and described above. The following paragraphs provide a description of the operation of the Memory Data Path Controller 830.

The Memory Data Path Controller 830, the First Memory Data Path 831, and the Second Memory Data Path 832 design requirement is to efficiently transfer large amounts of data between the various modules of Digital Image Processing System 800, e.g. between the Input Module 810 and the Output Module 840, and the Memory 850. Control and video data information are pipelined together and thus pipeline stages can be added to achieve timing closure especially when the Digital Image Processing System 800 is being manufactured as a System-on-Chip or SoC. In this case, large amount of data must be transferred relatively long distances throughout the SoC. Arbitrary numbers of pipeline stages between the Memory Data Path Controller 830 and Digital Image Processing System 800 modules can be added without affecting the performance. The Memory Data Path Controller 830 is designed to accommodate and respond to different modes of operation for each of the internal modules of Digital Image Processing System 800, and thus enabling efficient and high performance access to and from the Memory 850 using both the First and Second Memory Data Path 831 and 832 respectively. Each module can store or retrieve data from the Memory 850 in the most efficient format for its data processing or type usage, thus further enabling the ability to scale the Digital Image Processing System 800 to meet the demands for a higher input bandwidth, e.g. higher resolution or number of input sources, and larger number of output display regions. For example, a digital image representing a two-dimensional graphics may be digitized and use a linear memory addressing for transferring its video data information in and out of Memory 850, while compressed digital images, e.g. MPEG, may utilize a specific block memory addressing. The Memory Data Path Controller 830 is designed and capable of operating with at least five exemplary different modes (i) progressive scan macro block xy mode, (ii) interlaced scan macro block xy mode, (iii) progressive scan linear xy mode, (iv) interlaced scan linear xy mode, and (v) sequential access mode. Furthermore, the architecture of the Memory Data Path Controller 830 includes a specialized memory organization design that allocates regions of memory locations within the Memory 850 for the exclusive use with certain types of video data information.

Each of the internal modules of Digital Image Processing System 800 generates and outputs, onto the First Memory Data Path 831, memory write or read commands that comprise an operation mode, a base index, and a digital image's location and size information. The location of the digital image within Memory 850 may be determined using a starting memory location that corresponds to the location of a first pixel or origin of the digital image, e.g. top-leftmost pixel. Using the first memory location of a memory region as an origin, then an offset number of memory locations from the first memory location may be used as well to indicate the starting memory location of a desired digital image. The digital image's size information is identified with width, height, or the total number of memory locations used within Memory 850. The Memory Data Path Controller 830 operates and responds to different modes that utilize different location and size information as it may be necessary for the efficient transfer of the video data information from and to Memory 850, as is described later see FIGS. 10A and 10B. Consequently, the Memory Data Path Controller 830 initiates memory device write or read transactions in response to memory write or read commands using the operation mode, base index, and the digital image's location and size information embedded in the memory write or read command. The Memory Data Path Controller 830 generates memory device write or read commands and completes the Memory 850 device write or read transactions by sending or receiving video data information, from Memory 850 via the Second Memory Data Path 832. The Memory Data Path Controller 830 appropriately receives or forwards the video data information to the module that issued the memory write or read command via the First Memory Data Path 831. The Digital Image Processing System 800 internal modules can make successive back-to-back memory write or read requests that include completely different mode of operation, base index, and image size and location. The Memory Data Path Controller 830 can handle these memory device write or read transactions of entirely different types by appropriately arbitrating between the various modules of the Digital Image Processing System 800 using the First Memory Data Path 831, and the Memory 850 via the Second Memory Data Path 832. The memory sub-system Memory 850 is described further in the following paragraphs.

The Memory 850 device may be a single memory device or a memory system comprising multiple memory devices or modules, e.g. Memory 851 and Memory 852 as may be desired or necessary by the Digital Image Processing System 800. The Memory 850 is organized into multiple regions, where each region is specified using a starting memory location base address and a predefined number of memory locations. In one preferred embodiment, the Memory 850 is organized into one hundred twenty eight memory regions. In general, the Input Module 810 writes the input digital image video data information into one or more memory regions within Memory 850. The input Module 810 is also capable of splitting the input digital image into smaller regions each of which is stored into a separate memory region within Memory 850. The Output Module 840 reads and processes the video data information as specified using location and size information of a desired digital image from one or more regions within Memory 850. For example, in accordance with a YUV video format standard, the ODM_1 841 module reads the Y-component and UV-component of the video data information from a first and second memory region, respectively. The overall storage capacity of Memory 850 is based on the application and overall processing requirement of video data information of the Digital Image Processing System 800. The storage capacity of each region of Memory 850 is dependent on the resolution, and the type of video data information for a given video format standard being used. Furthermore, various types of memory, e.g. DRAM, SRAM, DDR, etc. . . . , may be used to manufacture Memory 850 as an integrated component within the Digital Image Processing System 800 or as a standalone memory system. In general, the Memory 850 must meet the overall performance and timing requirement of the Input Module 810 and the Output Module 840. The ability to use a particular organization or design of a memory system is influenced by the required overall performance of Memory 850, and the engineering requirement to manage the capacity and location of each of the memory regions within Memory 850. In accordance with one embodiment, each memory region's capacity and location is programmable and can be redefined for a given application's memory usage requirements. The programming of the appropriate registers with a new memory region's size and location within Memory 850, i.e. number of memory words and starting base address, provides a flexible architecture for a scalable and manageable Memory 850 system. The Memory Data Path Controller 830 stores the base address for each memory region in a look up table, where each base address is looked up using the base index embedded within the memory write or read command. Thus, using a base index eliminates the need to reprogram the various modules of Digital Image Processing System 800 with a new set of base addresses, whenever a new organization or reallocation of the memory regions of Memory 850 has taken place. Different storage and lookup means may be used for the base addresses of memory regions of Memory 850 e.g. file registers, programmable registers, Random Access Memory (RAM), or Content Addressable Memory (CAM).

Figure 9A:
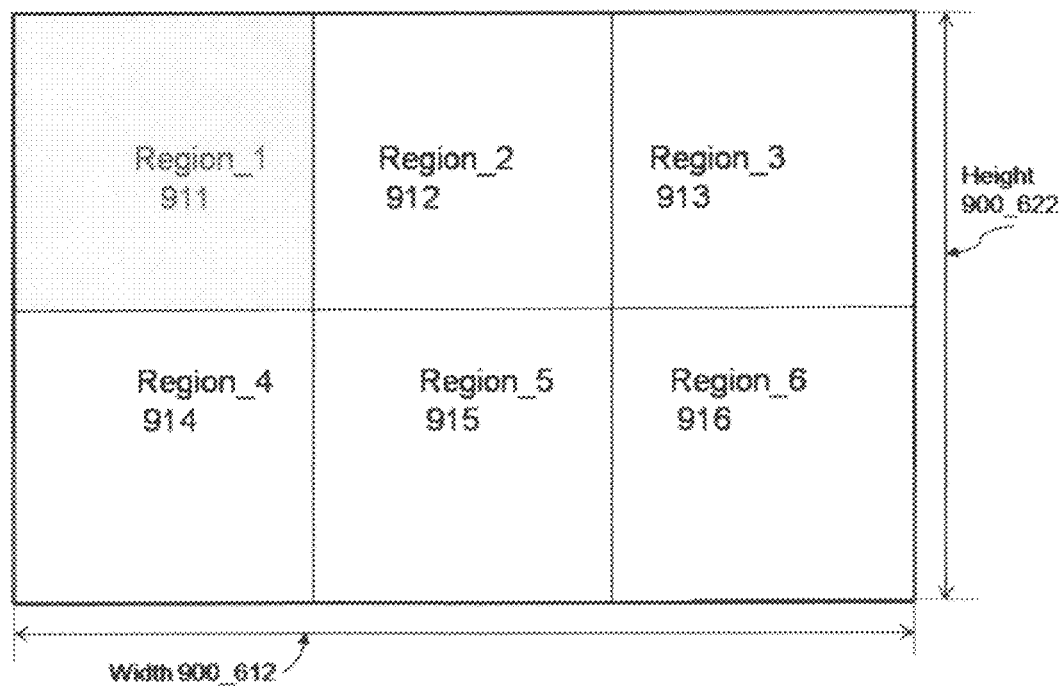
FIG. 9A shows an exemplary digital image comprising six regions, each of which is processed individually in accordance with one embodiment.
Figure 9B:
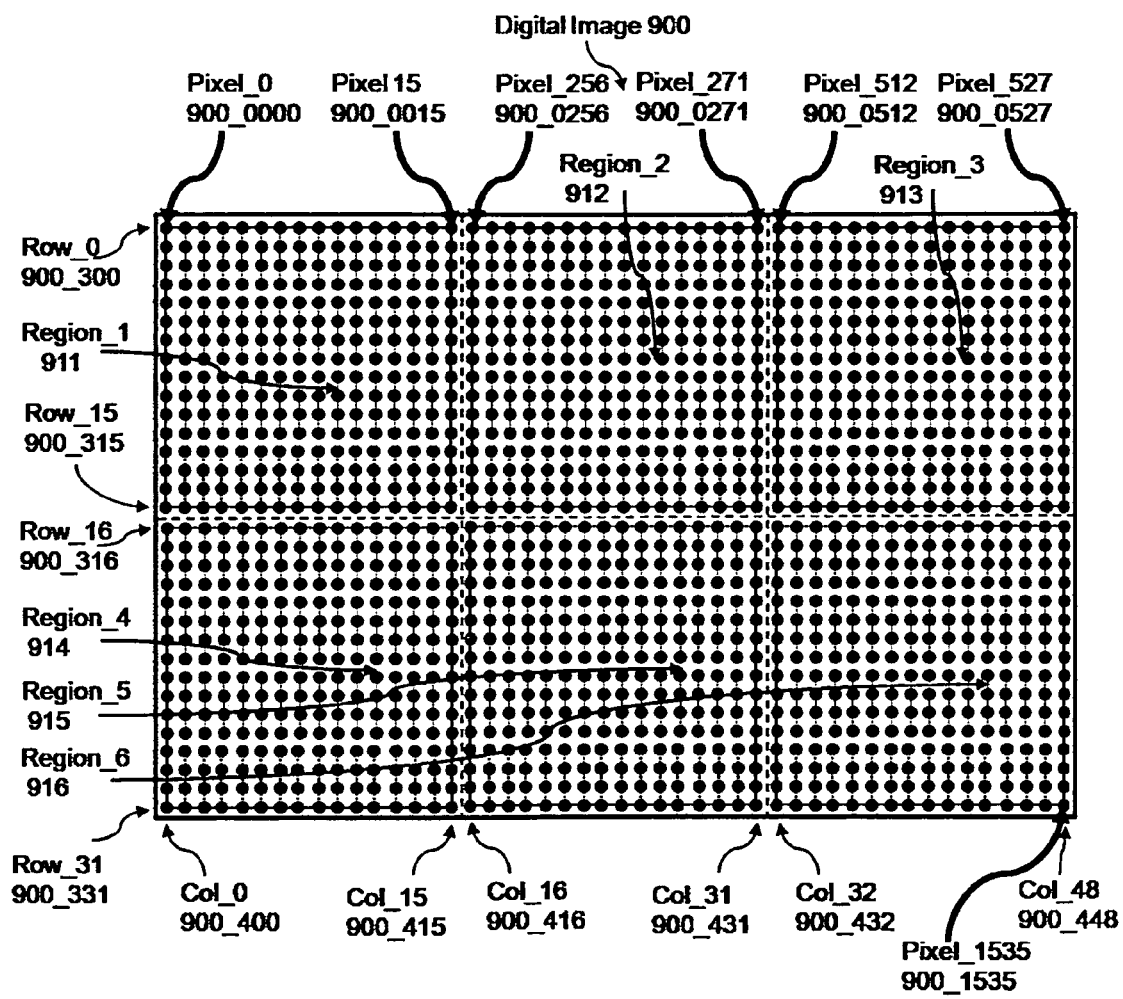
FIG. 9B shows an exemplary digital image comprising thirty-two lines and each line comprises forty-eight pixels, in accordance with one embodiment.

An exemplary Digital Image 900, with a resolution of 48×32, is split into six regions Region_1 911, Region_2 912, Region_3 913, Region_4 914, Region_5 915, and Region_6 916 as shown in FIG. 9A. The Digital Image 900 comprises thirty-two lines, where each line extends in the horizontal direction and comprises 48 pixels. The words "line" or "row" may be used interchangeably to indicate an array of pixels organized in the horizontal direction, video data information that corresponds to an array of pixels organized in the horizontal direction, or may indicate a horizontal array of memory locations comprising video data information that corresponds to a horizontal array of pixels. Similarly, the words "column" or "Col" are used to describe an array of pixels, video data information, or memory locations but in the vertical direction. Multiple video format standards may be used for the video data information that corresponds to each pixel, e.g. 24 bit RGB or YUV 4:2:2, 16 bits, see above. The exemplary Digital Image 900 comprises 32 lines and each line comprises 48 pixels, as shown in FIG. 9B, where the first line (or line 0) is shown as Row_0 900_300, and the thirty-second line is shown as Row_31 900_331. Similarly, the first columns of pixels is shown as Col_0 900_400, and the forty-eighth column of pixels is shown as Col_48 900_448. Furthermore, a first starting pixel Pixel_0 900_0000 is shown at the top-leftmost corner of the Digital Image 900, and is located at the intersection of the vertical position Row_0 900_300 and the horizontal position Col_0 900_400. Similarly the last pixel of the Digital Image 900 is Pixel_1535 900_1535 and is shown at the bottom-rightmost corner of the Digital Image 900, and is located at the intersection of the vertical position Row_31 900_331 and the horizontal position Col_48 900_448. In this example, each of the six regions of Digital Image 900 is defined to have identical dimensions of width and height that corresponds to sixteen pixels per side. For example, Region_1 911 and Region_2 912 each has a first top-leftmost pixel that is identified in reference the Digital Image 900 as Pixel_0 900_0000 and Pixel_16 900_0016. Furthermore, the first top-leftmost pixel of Region_1 911 is identified within Region_1 911 as Pixel_0 911_000. Similarly, the first top-leftmost pixel of Region_2 912 is identified within Region_2 912 as Pixel_0 912_000. As each region of Digital Image 900 is independently read or written, it becomes important to have labels for the elements of each region in reference to itself as well as the Digital Image 900, see FIG. 9C through FIG. 9P.

Figure 9C:
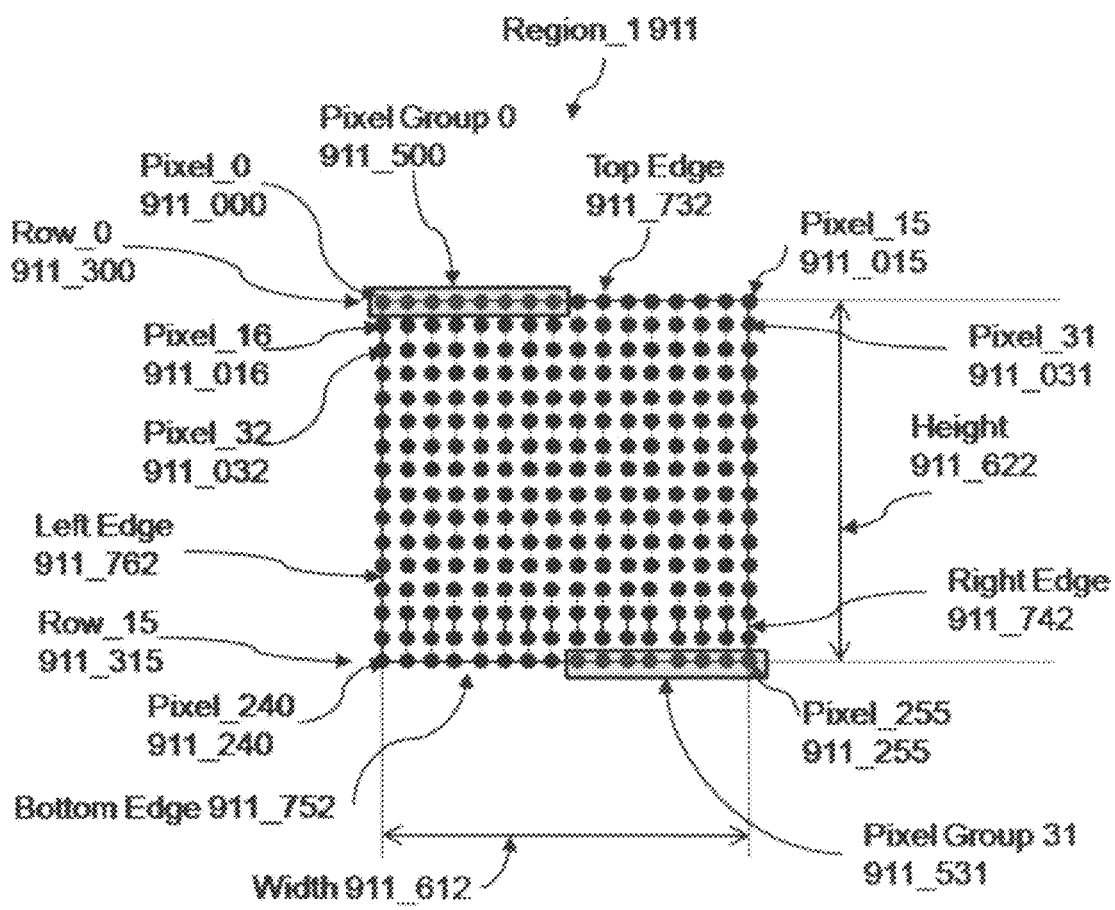
FIG. 9C shows an expanded view of the pixels of Region_1, in accordance with one embodiment.
Figure 9D:
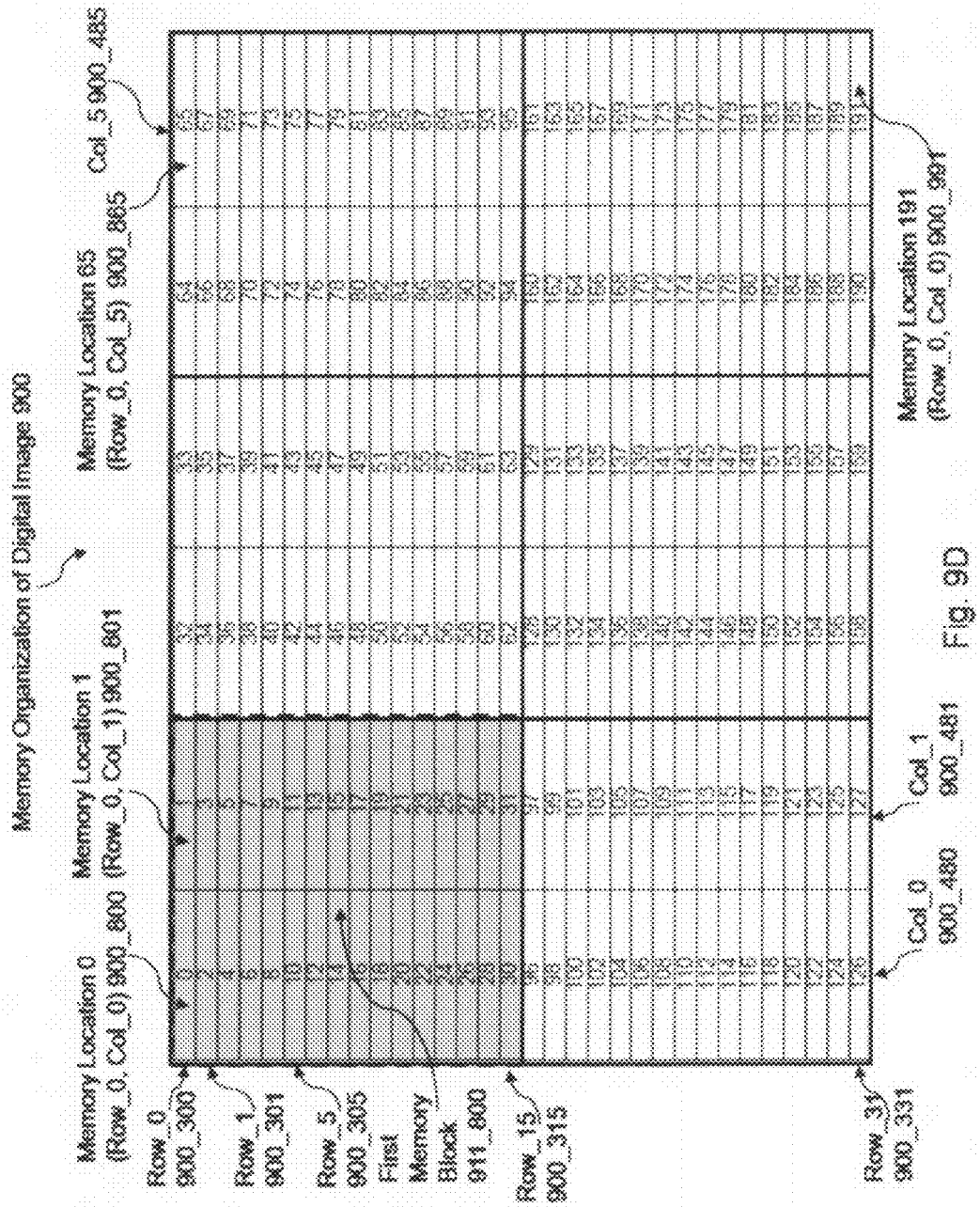
FIG. 9D shows an exemplary memory organization of an exemplary digital image comprising thirty-two lines and each line comprises forty-eight pixels, in accordance with one embodiment.

Digital Image 900 has a resolution that corresponds to a total number of 1536 pixels and total number of memory allocation of 36,864 bits (1536 times 24) for a 24 bit RGB or 24,576 bits (1536 times 16) for YUV 4:2:2 video format. In the following examples, certain assumptions are provided as an exemplary mean to describe some of the operation of Digital Image Processing System 800. The video format standard of YUV 4:2:2, 16 bits per pixel is used to store the processed video data information of the captured Digital Image 900. Hence, video data information for one pixel use 8-bits to store the Y-component and another 8-bits for the UV-component. An exemplary 64-bit-word is allocated to each memory location within a first and second region of Memory 850. Hence, the Digital Image 900 would require 384 memory locations to store all of the video data information in accordance with YUV 4:2:2 16 bits video format, organized as 192 memory locations for each of the Y-component and UV-component of the captured Digital Image 900 within the first and second region of Memory 850 respectively. An exemplary first base address of $(00001024)_{10}$ is used to indicate the actual physical address of the first starting memory location, Memory Location 0 (Row_0, Col_0) 900_800 as shown in FIG. 9D, of the first region within Memory 850 where the Y-component of the video data information is to be stored. Similarly, an exemplary second base address of $(00004096)_{10}$ is used to indicate the actual physical address of the first starting memory location of the second region within Memory 850 where the UV-component of the video data information is to be stored. Input Module 810 captures and processes the video data information of Digital Image 900 into a first quadrangle digital image comprising the Y-component and a second quadrangle digital image comprising the UV-component. An expanded view of the Region_1 911 is shown in FIG. 9C. An exemplary memory organization of Digital Image 900 is shown in FIG. 9D, where repeated references to FIGS. 9A through 9P will be used in the following paragraphs. The first eight pixels of the Region_1 911, starting with Pixel_0 911_000 and ending with Pixel_7 911_007, form a first starting Pixel Group 0 911_500 where the Y-component of the video data information is stored into Memory Location 0 900_800, as shown in FIG. 8C and FIG. 8D.

In accordance with one embodiment, the Input Module 810 initiates at least one memory transaction request to transfer and store the Y-component of the video data information of Pixel_0 900_0000 through Pixel_1535 900_1535 in the first memory region within Memory 850. Similarly, Input Module 810 initiates at least one memory transaction to transfer the UV-Component of the video data information of all the pixels of Region_1 911, Region_2 912, Region_3 913, Region_4 914, Region_5 915, and Region_6 916 to be stored in the second memory region within Memory 850. In this example, it is possible for the Y-component of video data information for eight pixels to be stored using a single 64-bit word or one memory location, as described above and shown in FIG. 9C and FIG. 8D. Furthermore, a First Memory Block 911_800, as illustrated by the region enclosed within dashed lines in FIG. 9D, represents the Y-component of the video data information of all the pixels within Region_1 911, i.e. Pixel_0 911_000 through Pixel_255 911_255 as shown in FIG. 9C.

The memory organization of the First Memory Block 911_800 is shown in FIG. 9D. The overall Y-Component of the video data information of Region_1 911 of Digital Image 900 is stored sequentially from left to right using sixteen rows Row_0 900_300 through Row_15 900_315, and two columns, Col_0 900_480 and Col_1 900_481. The first region of Memory 850 comprises a first starting Memory Location 0 (Row_0, Col_0) 900_800, located at the intersection of a first vertical position corresponding to Row_0 900_300, and a first horizontal position corresponding to Col_0 900_480. As has been described earlier, the first starting Memory Location 0 900_800 comprises the Y-component of the video data information of the first starting Pixel Group 0 911_500 comprising the first eight pixels of the first line Row_0 911_300 of Region_1 911 of Digital Image 900. Similarly, Memory Location 1 (Row_0, Col_1) 900_801 comprises the Y-component of the video data information of the next and last eight pixels (from left to right) of the first line Row_0 911_300 of Region_1 911. The second line of Region_1 911 comprises the first 16 pixel of the second line Row_1 900_301 of Digital Image 900, while the second line of Region_3 913 comprises the last 16 pixel of the second line Row_1 900_301 of Digital Image 900, and so on as shown in FIG. 9D.

Another exemplary memory location is located at the intersection of Row_0 900_300 and Col_5 900_485, i.e. Memory Location 65 (Row_0, Col_5) 900_865, comprising the Y-component of the video data information of the last eight pixels of the first line Row_0 900_300 of the Digital Image 900 as shown in FIG. 9D. In this case, these last eight pixels are also the last eight pixels of the first line of Region_3 913 of the Digital Image 900.

The First Memory Block 911_800 comprises thirty-two memory locations, zero through thirty-one, as shown in FIG. 9D. The first starting Memory Location 0 (Row_0, Col_0) 900_800 is accessible using the first base address that corresponds to the starting memory location of the first region within Memory 850, i.e. $(00001024)_{10}$. Similarly, any other memory location within any one of the Region_1 911, Region_2 912, Region_3 913, Region_4 914, Region_5 915, and Region_6 916 may be accessed using a corresponding row and column number that correspond to the intersection of a vertical and horizontal position within Digital Image 900. For example, the first starting memory location of Region_3 913 is Memory Location 64 and is located at a physical address that is to be found at an offset address of $(00000064)_{10}$ from the base address $(00001024)_{10}$ of the first region of Memory 850. Hence, the physical address of the first starting memory location of Region_3 913 is located at an address equal to the sum of the base address and the offset address, i.e. $(00001088)_{10}$. Subsequently, a physical address of $(00001089)_{10}$ would corresponds to Memory Location 65 (Row_0, Col_5) 900_865, as shown in FIG. 9D. It should be noted that different granularity of memory access is accomplished using longer or shorter words, e.g. 128-bit words for accessing sixteen pixels at a time or 16-bit words for accessing two pixels at a time. The access granularity of Memory 850 influences the performance of the Digital Image Processing System 800. For a given application, various access granularity of Memory 850 can be used to accommodate a certain performance specification. Each of the video data information of Region_2 912, Region_3 913, Region_4 914, Region_5 915, and Region_6 916 is organized and stored into the first memory region as shown in FIG. 9D.

In accordance with another embodiment, independent memory regions of Memory 850 are used to store each of the video data information of Region_1 911, Region_2 912, Region_3 913, Region_4 914, Region_5 915, and Region_6 916 independently. Similarly, each memory region may be accessed independently from other memory regions, and the retrieved video data information is processed, manipulated, and displayed, using a display region, in accordance with a video effect, resolution, scaling or video format that may be different from what is desired or required by another display region. Various memory organization methods and techniques may be used for how the regions within the Memory 850 are allocated. Accordingly, Memory 850 organization may change with the capacity or type of the physical memory being used. Furthermore, how fast the video data information is to be processed, stored, or retrieved would have an implication on the optimum organization of Memory 850. For example, the video data information of Region_1 911 may be stored sequentially in a linear fashion using Row_0 900_300 through Row_5 900_305, such that the first starting Memory Location 0 900_800 is still located at the intersection of Row_0 900_300 and Col_0 900_480. However, the memory location 31 is now located at the intersection of Row 5 900_305 and Col_1 900_481. In the following paragraphs, exemplary video data information transfers into, and out of Memory 850 is described; please refer to FIG. 8A, FIG. 8B, FIG. 9A, through FIG. 9D.

The Input Module 810 comprises a first and second programmable registers to store a first and second value that corresponds to the Digital Image 900 Width 900_612 and Height 900_622, respectively. The Input Module 810 comprises Input Capture 810_10 to receive and extract the Digital Image 900 video data information via the digital input data path, in accordance with the Digital Image 900 video format, e.g. 24 bit RGB. The Input Capture 810_10 may also be programmed to receive and extract only a predefined region's video data information, e.g. Region_1 911 of the Digital Image 900. Region_1 911 is defined using a starting first pixel location Pixel_0 911_000, its Width 911_612 and Height 911_622 within Digital Image 900. The Input Module 810 comprises Video Formatter 810_20 that processes the captured video data information and generates, in accordance with a second video format e.g. YUV 4:2:2 16 bits, the video data information that corresponds to the Y-component and UV-component of Digital Image 900.

The Input Module 810 further comprises Memory Interface 810_30 comprising a third and fourth programmable registers to store a first and second base index values, e.g. $(001)_{10}$ and $(002)_{10}$. The first and second base index values are used as pointers to the first and second base addresses, e.g. $(00001024)_{10}$ and $(00004096)_{10}$ of the first and second regions of Memory 850, as described above. This provides the flexibility to reorganize Memory 850 as needed. For example, a particular desired performance of the Digital Image Processing System 800 is satisfied by redefining or reprogramming the base addresses of memory regions, without affecting other memory access requests parameters. The Memory Interface 810_30 generates and outputs onto the First Memory Data Path 831 at least one first memory write command to transfer the Y-component of the video data information of Digital Image 900 starting at Memory Location 0 900_800 of the first region of Memory 850. In this example, the Memory Location 0 is used to store the Y-component of the video data information of the first starting pixel, Pixel_0 900_0000 which is the top-leftmost pixel of the Digital Image 900. A description of memory access request to Memory 850 provides more details about the generation of a memory write or read command or a memory device write or read command.

The first memory write command comprises the first Base Index 1020 value $(001)_{10}$, and a memory Offset Address 1070 value of $(000)_{10}$, see FIG. 10A and FIG. 10B. The Offset Address 1070 is used to indicate that the Memory Location 0 900_800 is to be stored at the memory location as indicated by the first base address $(00001024)_{10}$ since the offset address is zero in this case. Since all of the Y-component of video data information of Region_1 911, i.e. Pixel_0 911_000 through Pixel_255 911_255, are grouped in eight pixels per memory location, then the total number of 64-bit words required is thirty-two. Thus, the first memory write command further comprises a total number of memory locations, #Words 1080, value of $(032)_{10}$. The #Words 1080 is used to indicate how many words or memory locations are to be transferred from the Input Module 810, in response to the first memory write command, to the Memory Data Path Controller 830 via the First Memory Data Path 831.

In another embodiment, the first memory write command comprises vertical and horizontal memory position of the first starting memory location of Region_1 911, i.e. Ystart 1030 that corresponds to Row_0 900_300 and Xstart 1040 that corresponds to Col_0 900_480, the intersection of Xstart 1040 and Ystart 1030 corresponds to Memory Location 0 900_800. The first memory write command further comprises the width, Xcount 1050, and height, Ycount 1060, of Region_1 911 in terms of memory words. In this example, the Width 911_612 of Region_1 911 is 16 pixels and corresponds to two 64-bit memory words. The Height 911_622 of Region_1 911 is 16 lines and thus corresponds to sixteen rows of 64-bit memory words, Row_0 911_300 through Row 15 911_315, see FIG. 9C.

In one embodiment, the Memory Interface 810_30 of the Input Module 810 issues multiple memory write commands, as described above, to effect the transfer of all of the Y-component of the video data information of Region_1 911 to the Memory Data Path Controller 830 via the First Memory Data Path 831. Similarly, Memory Interface 810_30 transfers the UV-component of the video data information of Region_1 911 of Digital Image 900 to the second region of Memory 850. The Memory Interface 810_30 generates and outputs onto the First Memory Data Path 831 one, or multiple, second memory write command in accordance with the description of above paragraphs.

The Memory Data Path Controller 830 comprises a First Memory Interface 830_10 that receives the first memory write command and the Y-component of the video data information via the First Memory Data Path 831. The Memory Data Path Controller 830 further comprises logic circuitry to extract from the first memory write command the first Base Index 1020 value $(001)_{10}$, the memory Offset Address 1070 value of $(000)_{10}$, and the total number of memory locations, #Words 1080, value of $(032)_{10}$. In one embodiment, the Memory Data Path Controller 830 further comprises logic circuitry to extract from the first memory write command the vertical and horizontal position of the first starting memory location of Region_1 911, and the width and height information. In this example, width value Xcount $1050=(002)_{10}$, the height value Ycount $1060=(016)_{10}$, Ystart $1030=(000)_{10}$ and Xstart $1040=(001)_{10}$, see above.

The Memory Data Path Controller 830 generates the first base address of the first memory region within Memory 850 based on the extracted first base index, Base Index 1020. The Second Memory Interface 830_30 generates the appropriate physical memory address by using the first base address and the memory offset address, Offset Address 1070. The Second Memory Interface 830_30 further generates at least one, or multiple, first memory device write command to complete the transfer of the Y-component of the video data information of Region_1 911 to the first region of Memory 850 via the Second Memory Data Path 832. In this example, the first memory device write command includes the memory address $(00001024)_{10}$ as the first starting memory location address, where the Y-component of the Memory Location 0 900_800 is to be stored. The content to be stored in the first memory region of Memory 850 in response to the first memory device write command, starting at physical memory address of $(00001024)_{10}$, corresponds to the Y-component of the video data information of Region_1 911. This includes Memory Location 0 (Row_0, Col_0) 911_800 that corresponds to Pixel Group 0 911_500 through the Memory Location 31 that corresponds to Pixel Group 31 911_531, see Fig. C.

In one embodiment, the Second Memory Interface 830_30 generates at least one, or multiple, first memory device write command to complete the transfer of the Y-component of the video data information of Digital Image 900 to the first region of Memory 850 via the Second Memory Data Path 832. The first memory device write command provides all the necessary control and/or handshake information for Memory 850 to properly decode the first memory device write command and store the Y-component of the video data information of Digital Image 900 in response to the first memory device write command. The stored content in the first memory region of Memory 850, starting at physical memory address of $(00001024)_{10}$, corresponds to the Y-component of the video data information of Digital Image 900, Memory Location 0 (Row_0, Col_0) 911_800 through the Memory Location 191 (Row_31, Col_5) 911_191. The Memory Data Path Controller 830 further comprises Control 830_20 module to control and manage the transfer of the video data information flow received via the First Memory Data Path 831 and outputted to Memory 850 via the Second Memory Data Path 832. The transfer of the UV-component is described in the following paragraphs.

Similarly, the First Memory Interface 830_10 receives the second memory write command and the UV-component of the video data information, to be transferred in response to the second memory write command, via the First Memory Data Path 831. The logic circuitry extracts at least the second base index information, the starting Memory Location 0, and the total number of memory locations from the second memory write command. In accordance with the same process as described above, the Memory Data Path Controller 830 generates the second base address based on the second base index. Furthermore, The Second Memory Interface 830_30 generates at least one, or multiple, second memory device write command to complete the transfer of the UV-component of the video data information of Digital Image 900 to the second region of Memory 850 via the Second Memory Data Path 832 in response to the second memory write command. The Control 830_20 module controls and manages the transfer of the UV-component of the video data information flow received via the First Memory Data Path 831 and outputted to Memory 850 via the Second Memory Data Path 832. The output display modules retrieve the video data information from Memory 850 for further processing as is described in the following paragraphs.

Figure 8E:
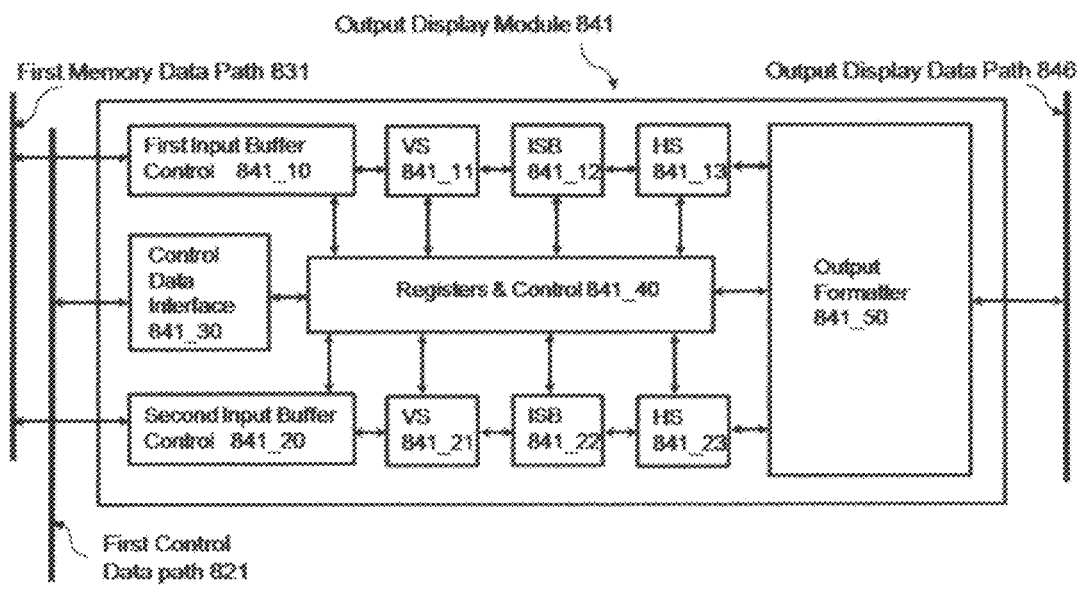
FIG. 8E is a block diagram illustrating an exemplary output display module for processing a digital image in accordance with one embodiment.

In one embodiment, the output display module ODM_1 841 is assigned to process the Y-component and the UV-component of the video data information from Region_1 911. The other output display modules that are part of the Output Module 840, e.g. ODM_2 842, is programmed to process the Y-component and the UV-component of the video data information from Region_2 912, and so on for the other ODMs. Each ODM processes one region of the Digital Image 900 and output the results to a dedicated display region of an electronic display panel. The combined picture resulting from all the adjoined display regions, comprising all the processed regions of the Digital Image 900, results in a continuous and seamless display of Digital Image 900 as if it was processed by one output display module. A block diagram of an exemplary output display module is shown in FIG. 8E. Two-independent data paths are coupled to the First Memory Data Path 831. Each of the data paths produces independent access requests to Memory 850, as described below. The output display module ODM_1 841 further comprises a Control and Data Interface 841_30 module that is coupled to the First Control Data Path 821 and to a Registers & Control 841_40 module. The Control and Data Interface 841_30 enables access to ODM_1 841 internal registers and programmability control for ODM_1 841 functions. The Registers & Control 841_40 module comprises the necessary logic circuitry to store data and control information, and provide proper interface to the internal modules of ODM_1 841.

The first data path of output display module ODM_1 841 comprises a First Input Buffer Control 841_10. The Y-component of the video data information of Region_1 911 is retrieved from Memory 850 using the first data path. Furthermore, the first data path comprises a vertical scaler module VS 841_11 to process and/or scale in the vertical direction the Y-component of the video data information from Region_1 911. An inter-scaler buffer ISB 841_12 provides the necessary buffering and management control of the streamed output of the vertical scaler VS 841_11 and into a horizontal scaler HS 841_13, which processes or scales in the horizontal direction the already vertically scaled Y-component of the video data information from Region_1 911. Since the vertical processing or scaling occurs separately from the horizontal processing or scaling, then the output display module is capable to scale independently the retrieved video data information in either the vertical or the horizontal direction. Similarly, the output display module ODM_1 841 second data path comprises a Second Input Buffer Control 841_20 that is assigned to retrieve the UV-component of the video data information of Region_1 911 from Memory 850. The vertical scaler VS 841_21 processes or scales the UV-component of the video data information and output the vertically processed video data information to inter-scaler buffer ISB 841_22. The horizontal scaler HS 841_23 process or scale the already vertically processed UV-component of the video data information and output the horizontally processed video data information to an Output Formatter 841_50.

The horizontal scalers HS 841_13 and HS 841_23 stream their processed video data information to the Output Formatter 841_50 that further process and recombine the already vertically and horizontally processed or scaled Y-component and the UV-component of the video data information from Region_1 911. The Output Formatter 841_50 streams its output onto the Output Display Data Path 846 via a dedicated channel to a designated display region. The Output Formatter 841_50 processes the video data information of Region_1 911 in accordance with a desired output video format standard as specified by the designated display region, e.g. RGB 4:4:4 24 bits per pixel. The output video format standard can be different from the YUV 4:2:2 16-bits used for storing and processing the video data information of Region_1 911 as has been described above. The output display module ODM_1 841 functions are programmable to independently process or scales the video data information in (i) the vertical direction, (ii) the horizontal direction, and (iii) a designated output video format standard. This provides for a proper display of the final processed video data information of Region_1 911 in accordance with the intended display region of the electronic display panel.

An exemplary Memory Access Request 1000 structure to access the video data information stored in Memory 850, as shown in FIG. 10A and FIG. 10 B, describes alternate means for using necessary digital image size and location information to generate memory write or read commands. In this example, the video data information of Region_1 911 comprises thirty-two memory locations and is stored within the first region of Memory 850, as shown in FIG. 9B, FIG. 9C, and FIG. 9D. The First Input Buffer Control 841_10 produces a memory read command comprising a Base Index 1020 to read the video data information out of Memory 850. The Base Index 1020 corresponds to the first starting memory location of the first region of Memory 850, and in this example equals $(001)_{10}$. The first memory read command further comprises a vertical origin Ystart 1030 value that corresponds to Row_0 900_300, and a horizontal origin Xstart 1040 value that corresponds to Col_0 900_400. The origin of Region_1 911 is the top-left corner of the Digital Image 900, as specified in this example by the starting Memory Location 0 (Row_0, Col_0) 911_800. Xstart and Ystart values correspond to the vertical and horizontal location of a memory word comprising a first starting pixel Pixel_0 900_0000. Furthermore, Xcount 1060 is the width in memory words (or memory locations) of the Region_1 911 and in this example is specified as two 64-bit Words used for all sixteen pixels of one line of Region_1 911. Ycount 1050 is the height in memory rows or lines of the Region_1 911 and in this example is specified as sixteen lines. The first memory read command may further comprises other control bits and data, Control 1010, as may be necessary to describe the type of video data information to be processed, how data information is organized in Memory 850, or signals as required by the Memory Data Path Controller 830 for proper execution of the memory access request. In accordance with the structure of FIG. 10A and this example, the first memory read command would comprise: [Control bits], $[(001)_{10}]$, $[(000)_{10}]$, $[(000)_{10}]$, $[(016)_{10}]$, $[(002)_{10}]$. Another exemplary first memory read command using an Offset Address 1070 of zero, since Memory Location 0 is actually stored at zero offset from the first starting memory location of the first region of Memory 850. Furthermore, Regions_1 911 comprises a total number of memory locations or 64-bits words, #Words 1080, of 32, thus in accordance with the structure of FIG. 10B, the first memory read command would comprise: [Control bits], $[(001)_{10}]$, $[(000)_{10}]$, $[(032)_{10}]$. Whichever structure is used for the memory read command the Memory Data Path Controller 830 decodes and responds accordingly. In this example, the Memory Data Path Controller 830 generates the bases address for the intended memory region by using the Base Index 1020 value of $(001)_{10}$ as a pointer in a lookup table to retrieve the corresponding base address, i.e. $(00001024)_{10}$. Furthermore, a memory device read command is generated using this base address and other information about location and size of the intended memory locations to be read, in accordance with the necessary constraints requirement to access Memory 850. The Second Memory Interface 830_30 generates the location information for the address of the starting memory location to be read out of Memory 850 as $(00001024)_{10}$ by using (i) the base address, in this example $(00001024)_{10}$, and (ii) the offset address of the desired memory location, in this example $(00000000)_{10}$. Alternatively, the location information for the address of the starting memory location to be read out of Memory 850 is generated by performing proper operation using (i) the base address, (ii) the vertical memory location pointer Ystart 1030, and (iii) the horizontal memory location pointer Xstart 1040. In addition, The Second Memory Interface 830_30 generates the size information using #Words 1080 for total number of memory locations to be read, e.g. $(00000032)_{10}$ Alternatively, it generates the size information using the intended memory region size given by the vertical number of rows Ycount 1050 and the horizontal number of columns Xcount 1060. Hence, in this example, the memory device read command is generated to indicate that the first memory location to be read is at address $(00001024)_{10}$, and the last memory location to be read is at address $(00001055)_{10}$.

Figure 9E:
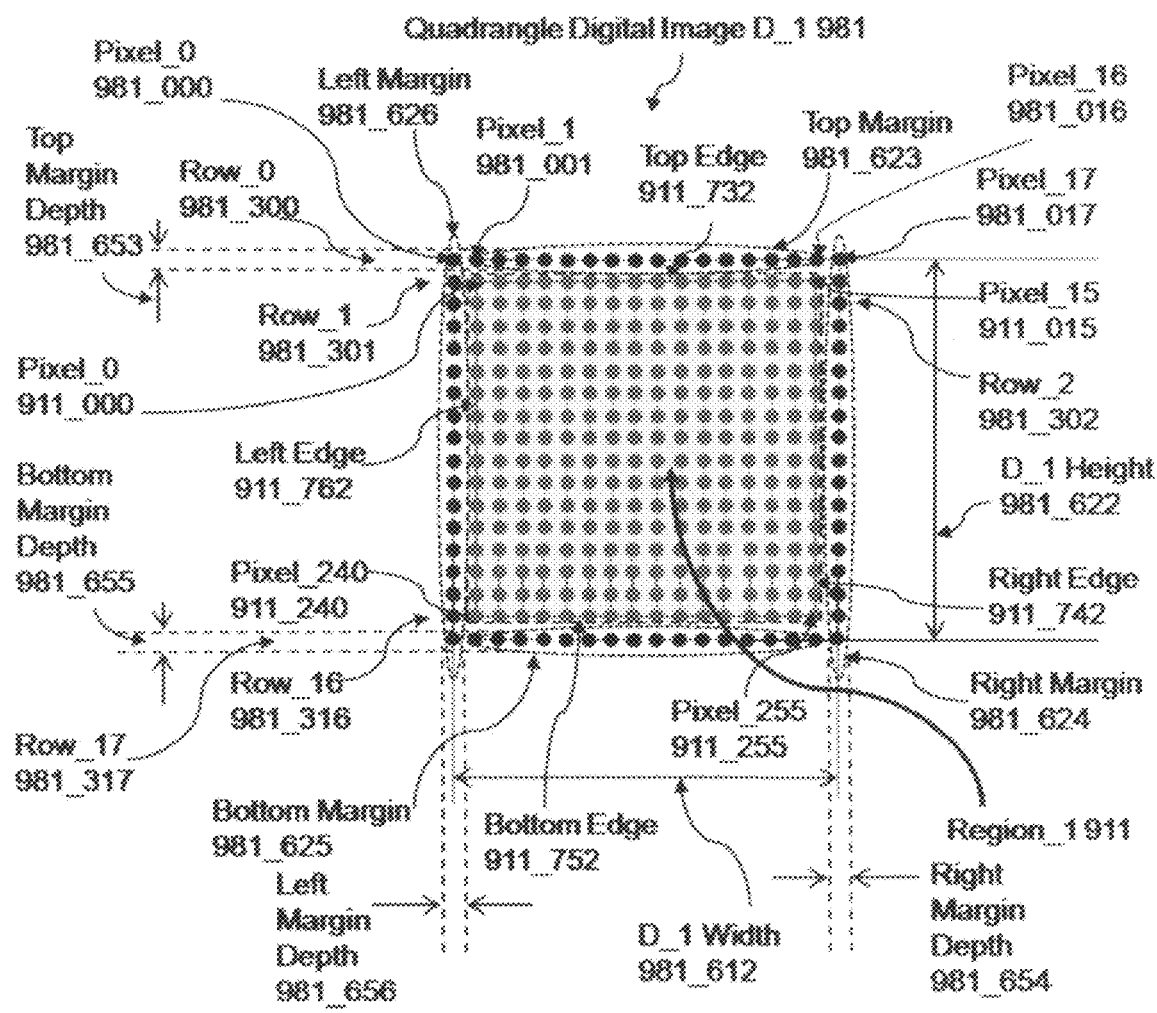
FIG. 9E shows an exemplary quadrangle digital image comprising Region_1, top, bottom, left, and right margin pixels, in accordance with one embodiment.

The following paragraphs describes the processing of a quadrangle digital image D_1 981 by adding margin pixels to the Region_1 911 as shown in FIG. 9E. The generation of the margin pixels is accomplished using various means or the combination of various methods as has been described above, please refer to embodiments as described above. In accordance with one embodiment, a Top Margin 981_623 having a Top Margin Depth 981_653 of one pixel is generated by replicating the video data information of the corresponding pixels of a Top Edge 911_732. Similarly, a Bottom Margin 981_625 having a Bottom Margin Depth 981_655 of one pixel is generated by replicating the video data information of the corresponding pixels of a Bottom Edge 911_752. A Left Margin 981_626 having a Left Margin Depth 981_656 of one pixel is generated by replicating the video data information of the corresponding pixels of (i) the first pixel of the Top Margin 981_623, (ii) the pixels of a Left Edge 911_762, and (iii) the first pixel of the Bottom Margin 981_625. Similarly, a Right Margin 981_624 having a Right Margin Depth 981_654 of one pixel is generated by replicating the video data information of the corresponding pixels of (i) the last pixel of the Top Margin 981_623, (ii) the pixels of a Right Edge 911_742, and (iii) the last pixel of the Bottom Margin 981_625. The chosen vertical and horizontal scaling processes, to provide the desired quality of the processed output image, influence the depth size of each of the Top Margin Depth 981_653, Bottom Margin Depth 981_655, Left Margin Depth 981_656, and Right Margin Depth 981_654. In accordance with one embodiment, a depth of eight pixels is used. The quadrangle digital image D_1 981 has a width, D_1 Width 981_612, and a height, D_1 Height 981_622, in accordance with the following relationships:

$$D\_1\ \text{Width}\ 981\_612 = \text{Left Margin}\ 981\_626 + \text{Width}\ 911\_612 + \text{Right Margin}\ 981\_624 \quad \text{Eq. 5}$$

$$D\_1\ \text{Height}\ 981\_622 = \text{Top Margin}\ 981\_623 + \text{Height}\ 911\_622 + \text{Bottom Margin}\ 981\_625 \quad \text{Eq. 6}$$

In accordance with one embodiment, The video data information content of each of the pixels within the Top Margin 981_623, forming a new first line of D_1 981, are generated using a copy of the video data information of a corresponding pixel that is directly below it and is at the Top Edge 911_732. For example, the first pixel of the Top Margin 981_623 comprises the video data information of Pixel_0 911_000, and the last pixel of the Top Margin 981_623 comprises the video data information of Pixel_015 911_015.

Similarly, the video data information content of each of the pixels within the Bottom Margin 981_625, forming a new last line of D_1 981, are generated using a copy of the video data information of a corresponding pixel that is directly above it and is at the Bottom Edge 911_752. For example, the first pixel of the Bottom Margin 981_625 comprises the video data information of Pixel_240 911_240, and the last pixel of the Bottom Margin 981_625 comprises the video data information of Pixel_255 911_255.

In accordance with one embodiment, the video data information content of each of the pixels within the Left Margin 981_626, forming a new first column of pixels for D_1 981, is generated using a copy of the video data information of a corresponding pixel that is directly to the right of it. For example, the top pixel of the Left Margin 981_626 comprises the video data information of the first pixel of the Top Margin 981_623. The bottom pixel of the Left Margin 981_626 comprises the video data information of the first pixel of the Bottom Margin 981_625. The other pixels of the Left Margin 981_626 comprise the video data information of the pixels of the Left Edge 911_762.

Similarly, the video data information content of each of the pixels within the Right Margin 981_624, forming a new last column of pixels for D_1 981, is generated using a copy of the video data information of a corresponding pixel that is directly to the left of it. For example, the top pixel of the Right Margin 981_624 comprises the video data information of the last pixel of the Top Margin 981_623. The bottom pixel of the Right Margin 981_624 comprises the video data information of the last pixel of the Bottom Margin 981_625. The other pixels of Right Margin 981_624 comprise the video data information of the pixels of the Right Edge 911_742.

In the following paragraphs, the first data path of an output display module, e.g. ODM_1 841, is used to describe an exemplary vertical and horizontal processing of the video data information for Region_1 911 as shown in FIG. 9C. In this example, the video data information corresponds to the Y-Component of the digital image that corresponds to Region_1 911 is processed using the first data path of ODM_1 841, while the second data path processes in a similar fashion an independently retrieved video data information. In the following example, a margin depth of one pixel is assumed for each of the Top Margin Depth 981_653, Bottom Margin Depth 981_655, Left Margin Depth 981_656, and Right Margin Depth 981_654, as shown in FIG. 9E. Each of the Top Margin Depth 981_653, Bottom Margin Depth 981_655, Left Margin Depth 981_656, and Right Margin Depth 981_654 can be specified independently from each other. The margin depth can vary in order to meet a given design and specification requirement of the output display module. Furthermore, each of the horizontal and vertical scaling ratios is assumed equal to one, which means that the desired output image resolution is the same as the retrieved input image's resolution in both the vertical and horizontal directions.

In accordance with one embodiment, the generation of the video data information of the pixels of the Top Margin 981_623 is done on the fly. When the first line Row_0 911_300, as shown in FIG. 9C, is read out of memory and into the First Input Buffer Control 841_10 as Row_1 981_301, as shown in FIG. 9E. The video data information content of the pixels of Row_0 911_300 is copied or replicated to generate Row_0 981_300, as shown in FIG. 9E, namely the Top Margin 981_623 of the quadrangle digital image D_1 981.

Similarly, the generation of the video data information of the Bottom Margin 981_625 is done on the fly when the last line of Region_1 911, namely Row_15 911_315 see FIG. 9C, is read out of memory and into the First Input Buffer Control 841_10 as Row_16 981_316, see FIG. 9E. A simple process to copy the video data information of the pixels of Row_15 911_315 may be used to generate the Bottom Margin 981_625 that corresponds to the eighteenth line of D_1 981, namely Row_17 981_317.

Other processes or methods may be used as well to effect the generation of the pixels of the Top Margin 981_623 and Bottom Margin 981_625 from pixels within Region_1 911 or neighboring regions, e.g. Region_2 912. Variety of methods as described above may be employed to generate the pixels of the Top Margin 981_623 and Bottom Margin 981_625. Furthermore, various types of data filtering or data interpolation can be used to process the video data information of the designated digital image and generate on the fly the video data information for the margin pixels. For example, video data information of a specific color can be used to generate the video data information of the pixels of the Top Margin 981_623 and Bottom Margin 981_625.

In this example, D_1 Height 981_622 comprises 18 lines and can be computed using Eq. 6. For example, the sum of (i) the Top Margin 981_623 that comprises one line, (ii) Row_0 911_300 through Row_15 911_315 comprising 16 lines, and (iii) the Bottom Margin 981_625 that comprises one line. At this stage, after the processing in the vertical direction is completed, the width of vertically processed lines stored in the inter-scaler buffer ISB 841_12 corresponds to 16 pixels, and is the same as Width 911_612, as shown in FIG. 9C.

The vertical scaler, VS 841_11, operates using a group of two or more lines at a time to generate one vertically processed line that is outputted to the inter-scaler buffer, ISB 841_12, for temporary storage. The number of lines that are used to produce one vertically processed line depends on the type of scaling process methodology and the number of coefficients required to provide a desired accuracy for a given scaling process and/or a given scaling ratio for the intended quality level of the scaled output image. In this example, the video data information of the pixels of two vertically adjacent lines are used to generate the video data information for the vertically processed line. In accordance with one embodiment, eight vertically adjacent lines are used to generate one vertically processed line that is outputted to the inter-scaler buffer, ISB 841_12, for temporary storage. In accordance with one embodiment, four vertically adjacent lines are used to generate one vertically processed line that is outputted to the inter-scaler buffer, ISB 841_12, for temporary storage. If the vertical scaling ratio is equal to two, then the total number of the vertically processed lines outputted to the inter-scaler buffer ISB 841_12 is twice that of D_1 Height 981_622. In this example, the vertical scaler VS 841_11 would output thirty-six vertically processed lines, which is twice that of the D_1 Height 981_622 comprising eighteen lines, sixteen lines of which are from Region_1 911 and one line each from the Top Margin 981_623 and Bottom Margin 981_625.

An exemplary processing of two vertically adjacent lines to produce one new vertically processed line is described as follows; please refer to FIG. 9C and FIG. 9E. The vertical scaler VS 841_11 starts the processing of Pixel_1 981_001, of the Top Margin 981_623, identified as Row_0 981_300 in FIG. 9E, that is vertically adjacent to Pixel_0 911_000 of the row identified as Row_1 981_301. The video data information of both pixels are processed in accordance with a data filtering or combining process where the data processing comprises taking into consideration the number of input pixels being processed and the vertical scaling ratio to determine the resultant video data information that is used to produce a new video data information for a new pixel. This new pixel is the first vertically processed pixel of a first vertically processed line of the vertically processed output image. The first vertically processed pixel is outputted to the inter-scaler buffer, ISB 841_12 for temporary storage. The process continues and the next two vertically adjacent pixels are then processed in a similar fashion. A second vertically scaled pixel is then outputted to the inter-scaler buffer ISB 841_12 for temporary storage. The vertical scaling process continues until the last pixel of the Top Margin 981_623 is reached namely Pixel_16 981_016. In this example, Pixel_15 911_015 is adjacent and directly below Pixel_16 981_016 and both pixels are the last two vertically adjacent pixels to be processed, producing the last vertically processed pixel of the first vertically processed line of the vertically processed output image. Thus, the first vertically processed line is now complete and stored in the inter-scaler buffer ISB 841_12 temporary storage, which will be streamed to the horizontal scaler HS 841_13 upon the initiation of the horizontal scaling process for the first vertically scaled or processed line.

The vertical scaling process now repeats using the second line of D_1 981 that corresponds to Row_1 981_301, which is the same as Row_0 911_300, and the third line of D_1 981 that corresponds to Row_2 981_302. Thus, the second vertically processed line is generated and outputted to the inter-scaler buffer ISB 841_12 for temporary storage. The vertical scaling process continues until the eighteenth vertically processed line of the vertically scaled output image is generated and outputted to the inter-scaler buffer ISB 841_12 for temporary storage. As the vertical scaling process operation is being completed, then the video data information of the pixels of the topmost lines of the First Input Buffer Control 841_10 are no longer needed for the vertical scaling process operation of the current digital image. Therefore, the topmost lines, e.g. Row_0 981_300, Row_1 981_301, etc. . . . , may now be discarded, and in accordance with the design requirement one or more lines may be discarded at a time. A first-in-first-out FIFO buffer may be used within the First Input Buffer Control 841_10 to store the video data information. As the topmost line or lines are no longer needed, then the First Input Buffer Control 841_10 may initiate a memory read operation to retrieve a single new line or multiple lines of video data information to be read out of memory and into the First Input Buffer Control 841_10 overwriting the line or lines to be discarded. The First Input Buffer Control 841_10 maintains its FIFO full so that the vertical scaling process progress continuously as needed or required by the output display module ODM_1 841 and in accordance with the desired performance of the Digital Image Processing System 800. Furthermore, the topmost line or lines of the First Input Buffer Control 841_10 may be kept for a certain amount of time, long enough to perform a recall or a video effect operation as may be desired or necessary. Upon the initiation of the horizontal scaling process for the first vertically processed line, the horizontal scaler HS 841_13 retrieve the first vertically processed line from inter-scaler buffer ISB 841_12. The left and right margin pixels are generated for all of the vertically processed lines as will be described in the following paragraphs.

In accordance with one embodiment, the generation of the video data information of the pixels of the Left Margin 981_626 and the Right Margin 981_624 is done on the fly. For example, as the video data information of the pixels of the vertically processed line is being streamed into the horizontal scaler HS 841_13 from the inter-scaler buffer ISB 841_12 temporary storage. Other means for generating the Left Margin 981_626 and the Right Margin 981_624 pixels may be used as well, as described earlier in this disclosure. In this example, the left margin pixel and the right margin pixel are generated using a copy of the first pixel and the last pixel of each vertically processed line, respectively. For example, the first pixel and the last pixel of the first vertically processed line, which is stored in the inter-scaler buffer ISB 841_12 temporary storage, are replicated to generate the top pixel Pixel_0 981_000 of the Left Margin 981_626 and the top pixel Pixel_17 981_017 of the Right Margin 981_624, respectively. In accordance with one embodiment, upon the initiation of the horizontal scaling process, the new vertically processed line including the left and right margin pixels is streamed to the horizontal scaler HS 841_13.

The horizontal scaling process is similar to the vertical scaling process as described above and utilize two or more horizontally adjacent pixel to generate one horizontally processed pixel. In this example, two horizontally adjacent pixels are used to generate one horizontally processed pixel. This horizontally processed pixel is streamed to the Output Formatter 841_50 for further processing. The horizontal processing continues until all of the horizontally processed pixels are generated in accordance with the desired horizontal scaling ratio. Similarly, the process continues for all the vertically processed lines, including the left and right margin pixels, and all the vertically and horizontally processed lines are streamed to the Output Formatter 841_50 in the same way as for the first vertically processed line. Since we are using a scaling ratio of one in this example, the vertically and horizontally processed D_1 981 comprises eighteen rows, Row_0 981_300 through Row_17 981_317 and each row having a width that is equal to eighteen pixels, Width 981_612 see FIG. 9E, in accordance with Eq. 5 and Eq. 6. For example, if the vertical scaling ration is equal to one and the horizontal scaling ratio is equal to two, then the D_1 Width 981_612 would equal to thirty-two pixels while the D_1 Height 981_622 would equal eighteen pixels (or rows). The vertically and horizontally processed pixels resulting from the appended margin pixels will be appropriately cropped by the Output Formatter 841_50 so that the desired vertically and horizontally processed pixels that correspond to the Region_1 911 are displayed, as will be described in the following paragraphs.

The second data path of the output display module ODM_1 841 independently retrieves, and processes video data information in the vertical or the horizontal directions. In this example, the UV-component of D_1 981 is independently retrieved using the Second Input Buffer Control 841_20. The vertical and horizontal processing is performed using a vertical scaler VS 841_21, an inter-scaler buffer ISB 841_22, and a horizontal scaler HS 841_23. In a similar fashion as described above for the first data path, the horizontal scaler HS 841_23 streams the vertically and horizontally processed video data information to the output formatter 841_50.

The Output Formatter 841_50 further processes and appropriately synchronizes and combines the vertically and horizontally processed Y-component and UV-component of D_1 981 to generate and output onto the Output Display Data Path 846 the desired output image in accordance with an output video format standard that is compatible with the destination display region. The Output Formatter 841_50 appropriately crops the combined vertically and horizontally processed pixels that are the result of the appended Top Margin 981_623, Bottom Margin 981_625, Left Margin 981_626, and Right Margin 981_624. The combined vertically and horizontally processed pixels, which are used in the generation of the desired output image that corresponds to Region_1 911, when displayed alongside the other vertically and horizontally processed pixels of neighboring regions will result in a contiguous and a full display a vertically and horizontally processed Digital Image 900. The Output Formatter 841_50 streams or outputs each synchronized and combined vertically and horizontally processed line onto the Output Display Data Path 846, the Output Formatter 841_50 uses a data enable signal to indicate to an electronic display device to discard or blank one or more pixels for each line. In some instances, an entire line may be blanked. Therefore, in this example with a scaling ratio of one, the desired processed output image to be displayed that corresponds to Region_1 911 comprises sixteen lines, where each line comprises sixteen pixels. The following paragraphs will describe a slightly different method to process or scale Region_1 911.

Figure 9F:
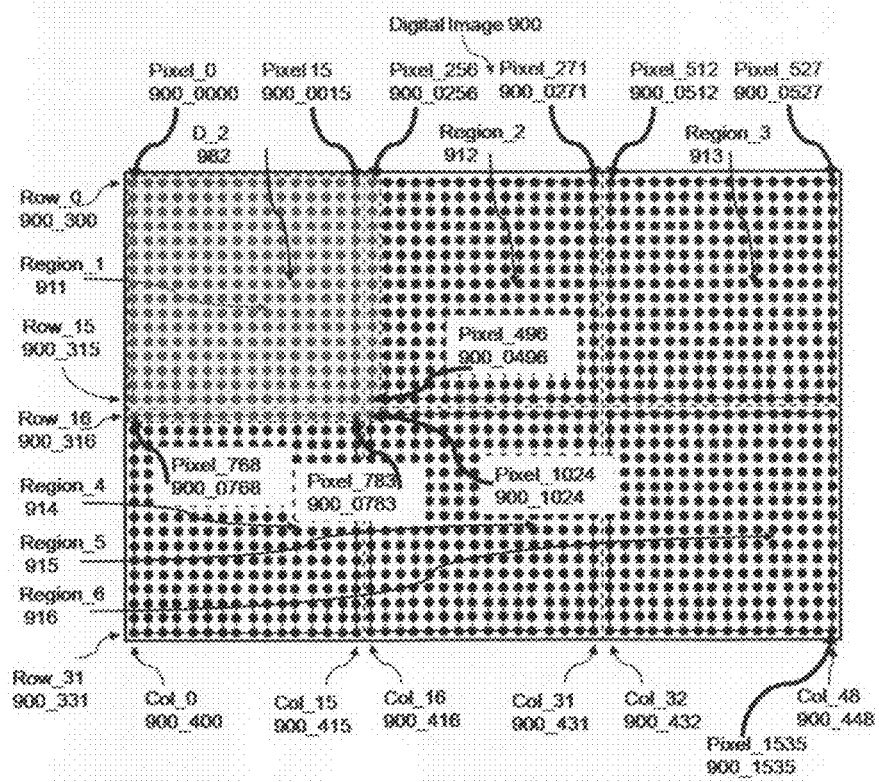
FIG. 9F shows an exemplary quadrangle digital image, within the digital image of FIG. 9B, comprising Region_1, and neighboring left and bottom pixels, in accordance with one embodiment.
Figure 9G:
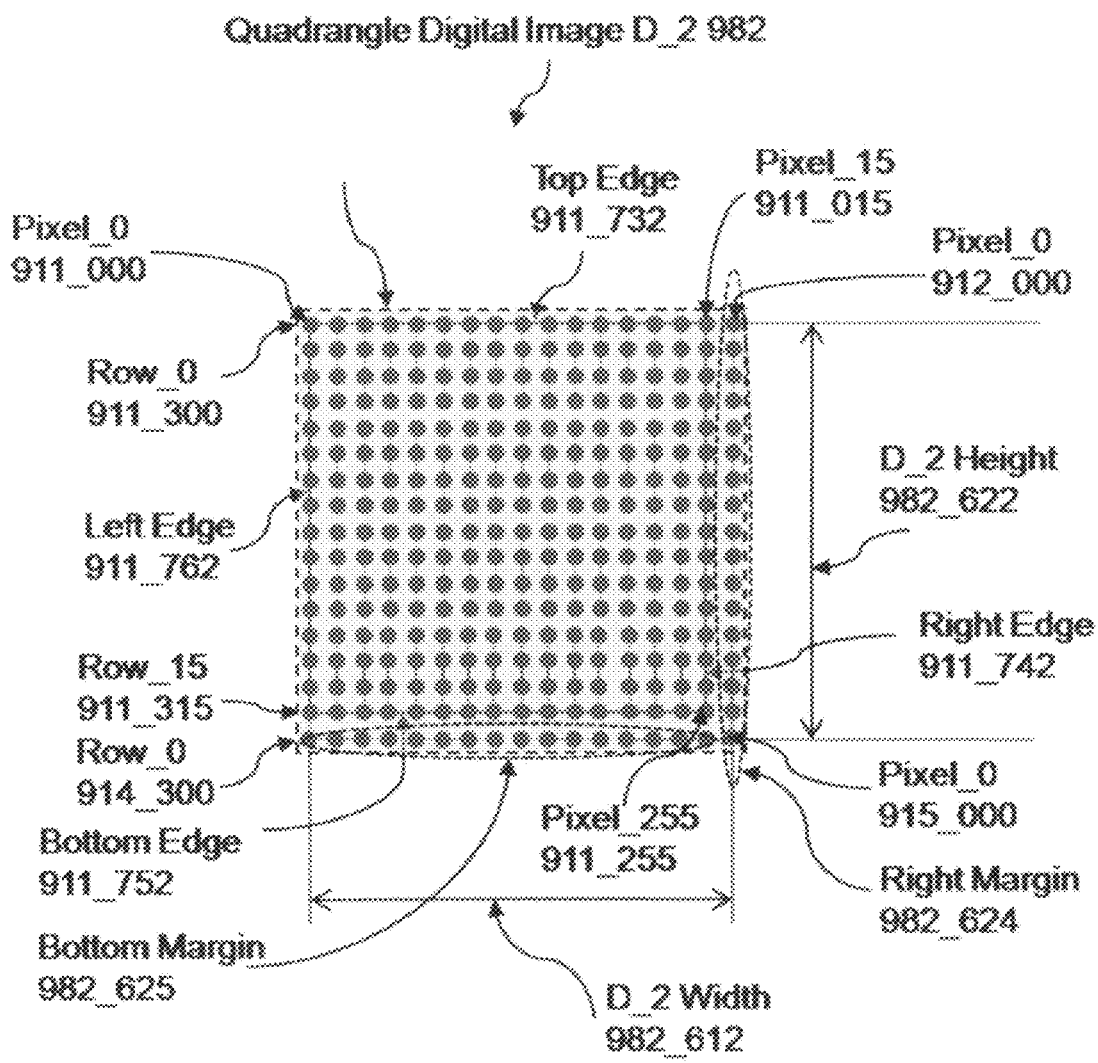
FIG. 9G shows an expanded view of the exemplary quadrangle digital image of FIG. 9F, in accordance with one embodiment.

In accordance with one embodiment, the vertical and horizontal processing of Region_1 911 of the Digital Image 900 is accomplished by defining a quadrangle digital image D_2 982 that includes all of the pixels of Region_1 911 and a right and bottom margin pixels from neighboring regions, as shown in FIG. 9F and FIG. 9G. In this example, it is assumed that a margin depth of one pixel is used. The right margin pixels comprise the leftmost edge pixels of Region_2 912 and the top-leftmost pixel of Region_5 915. The bottom margin pixels comprise the topmost edge pixels of Region_4 914. In this example, the Right Margin 982_624 is generated from the first column of pixels of Region_2 912, comprising Pixel_256 900_0256 through Pixel_496 900_0 496 in the vertical direction, and the first pixel of Region_5 915, comprising Pixel 1024 900_1024, see FIG. 9F. The Bottom Margin 982_625 is generated from the first row of pixels of Region_4 914, comprising Pixel_768 900_0768 through Pixel_783 900_0783 in the horizontal direction. Therefore, D_2 982 comprises seventeen rows, and each row comprises seventeen pixels, see FIG. 9G. The generation of top and left margin pixels for the vertical and horizontal processing of D_2 982 can be done in multiple ways and is illustrated in the following embodiments.

Figure 9H:
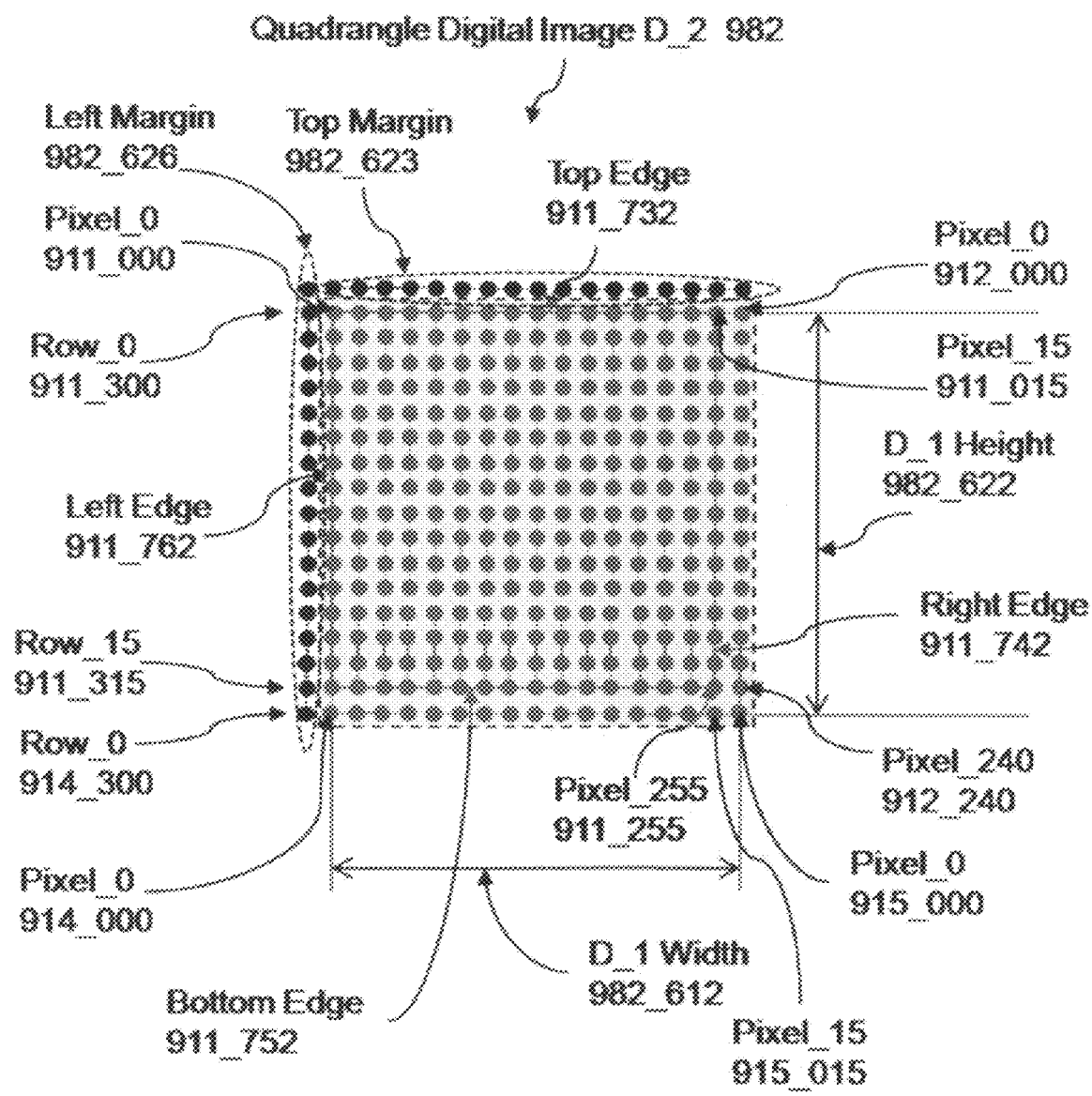
FIG. 9H shows an expanded view of the exemplary quadrangle digital image of FIG. 9G, and generated top margin and left margin pixels, in accordance with one embodiment.

Now referring to FIG. 9H and in accordance with one embodiment, the video data information content of the pixels of the Top Margin 982_623 and the Left Margin 982_626 is generated on the fly or in a similar manner as described in the embodiments above. Therefore, the quadrangle digital image D_2 982 comprises eighteen rows, and each row comprises eighteen pixels, see FIG. 9H. The quadrangle digital image D_2 982 comprises the Bottom Margin 982_625 and Right Margin 982_624. Thus, the vertical and horizontal processing of D_2 982 can be accomplished as has been described in the embodiments above. The Output Formatter 841_50 streams or outputs each vertically and horizontally processed line onto the Output Display Data Path 846, the Output Formatter 841_50 uses a data enable signal to indicate to an electronic display device to discard or blank one or more pixels for each line. In some instances, an entire line may be blanked. Therefore, in this example with a scaling ratio of one, the desired processed output image to be displayed that corresponds to Region_1 911 comprises 16 lines, where each line comprises 16 pixels. The following paragraphs will describe a slightly different method to process or scale Region_1 911.

Figure 9I:
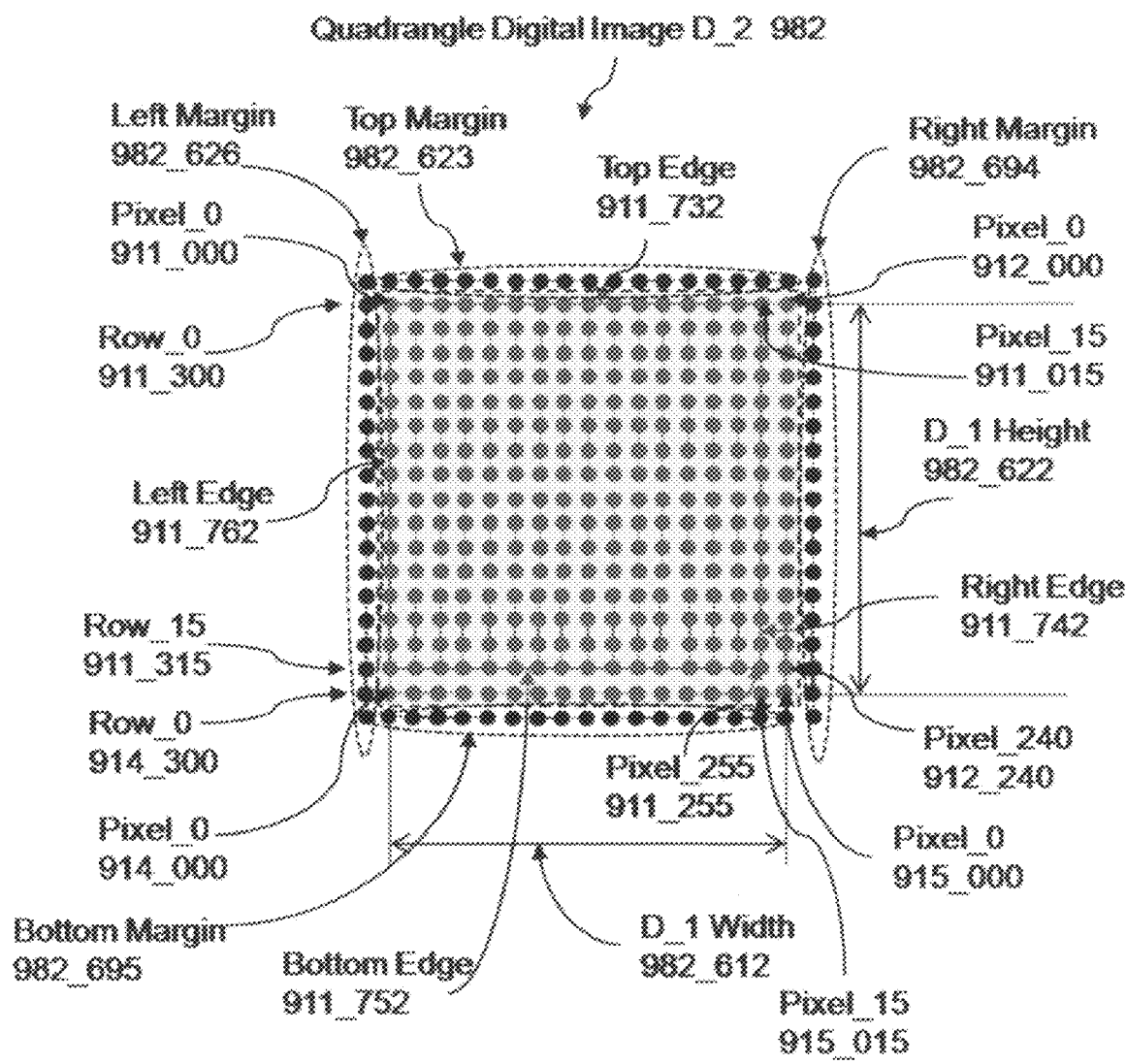
FIG. 9I shows an expanded view of the exemplary quadrangle digital image of FIG. 9H, and generated right margin and bottom margin pixels, in accordance with one embodiment.

Now referring to FIG. 9I and in accordance with one embodiment, the video data information content of the pixels of the Top Margin 982_623, the Bottom Margin 982_695, the Left Margin 982_626 and the Right Margin 982_694 are generated on the fly or in a similar manner as described in the embodiments above. Please note that the quadrangle digital image D_2 982 already comprises the Bottom Margin 982_625 and Right Margin 982_624. Therefore, the quadrangle digital image D_2 982 comprises nineteen rows, and each row comprises nineteen pixels, see FIG. 9I. One can think of the quadrangle digital image D_2 982 as a whole region to be processed, and the top, bottom, left and right margin are newly generated. Thus, the vertical and horizontal processing of D_2 982 can be accomplished as has been described in the embodiments above. The Output Formatter 841_50 streams or outputs each vertically and horizontally processed line onto the Output Display Data Path 846, the Output Formatter 841_50 uses a data enable signal to indicate to an electronic display device to discard or blank one or more pixels for each line. In some instances, an entire line may be blanked. In this example with a scaling ratio of one, the desired processed output image to be displayed, which corresponds to Region_1 911, comprises 16 lines and each line comprises 16 pixels. Accordingly, the Output Formatter 841_50 processes and crops the vertically and horizontally processed pixels of D_2 982 so that only the appropriate processed pixels that correspond to Region_1 911 are used in the display of the desired output image. The Output Formatter 841_50 processes and crops the first line and the last two lines, and the first column and the last two columns so that the output image comprises sixteen processed lines, and each processed line comprising sixteen pixels in direct proportion the resolution of Region_1 911 given a vertical and horizontal scaling ratio of one. In accordance with one embodiment, the Output Formatter 841_50 streams or outputs each vertically and horizontally processed line along with a data enable signal using the Output Display Data Path 846. The Output Formatter 841_50 asserts the data enable signal using appropriate timing to indicate to an electronic display module to discard or blank the first line, the last two lines, and the first pixel and the last two pixels of the remaining vertically and horizontally processed lines of D_2 982 output image.

Figure 9J:
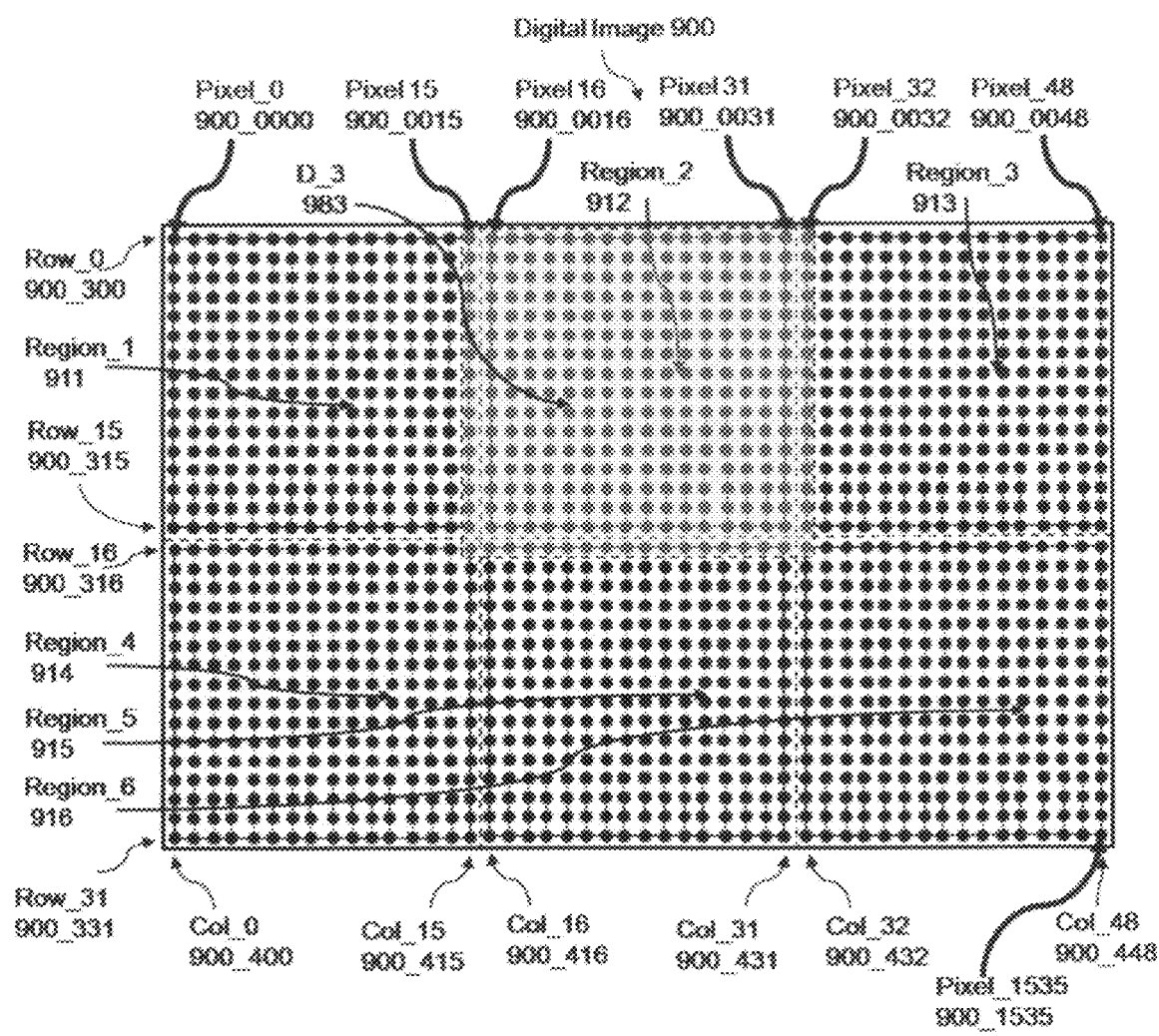
FIG. 9J shows an exemplary quadrangle digital image, within the digital image of FIG. 9B, comprising Region_2, and neighboring left, right, and bottom pixels, in accordance with one embodiment.

In accordance with one embodiment, it quadrangle digital image D_3 983 comprises the pixels of Region_2 912, and pixels from neighboring left, bottom, and right regions of Digital Image 900, as shown in FIG. 9J. These pixels are used to create the right margin, bottom margin, and left margin for Region_2 912. In this example, the margin depth is assumed equal to one pixel. The top margin pixels are generated and the quadrangle digital image D_3 983 is processed in a similar fashion as described above.

In accordance with one embodiment, the quadrangle digital image D_3 983 comprises the pixels of Region_2 912, and pixels from neighboring left, bottom, and right regions of Digital Image 900, as shown in FIG. 9J. In this example, the top, bottom, left, and right margin pixels are generated on the fly irrespective of whether the quadrangle digital image D_3 983 comprises margin pixels from neighboring regions or not. The quadrangle digital image D_3 983 is processed in a similar fashion as described above and similar to the illustration for Region_1 911 as shown in FIG. 9I. In the following paragraphs, memory access is described for various regions types of Digital Image 900 that are defined using various shapes and sizes.

Figure 9K:
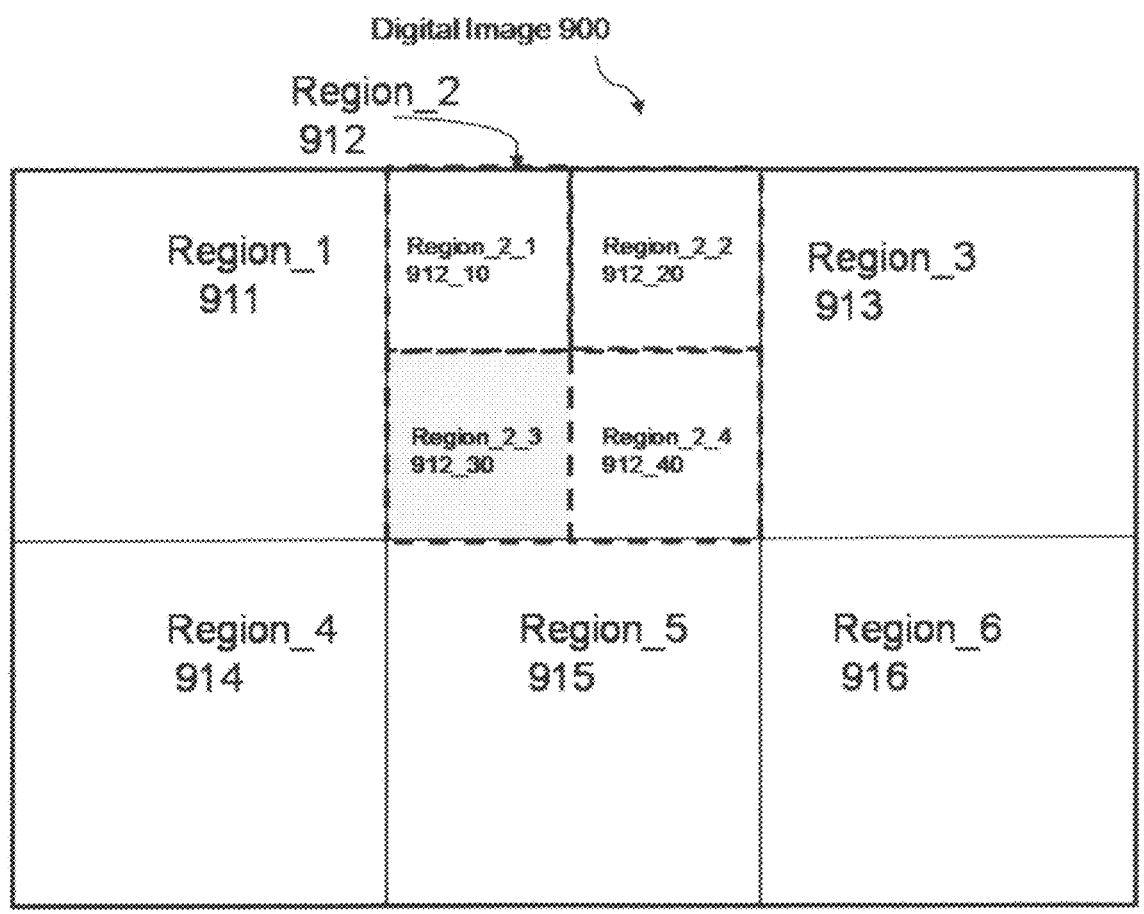
FIG. 9K shows an exemplary quadrangle digital image, within the digital image of FIG. 9A, in accordance with one embodiment.
Figure 9L:
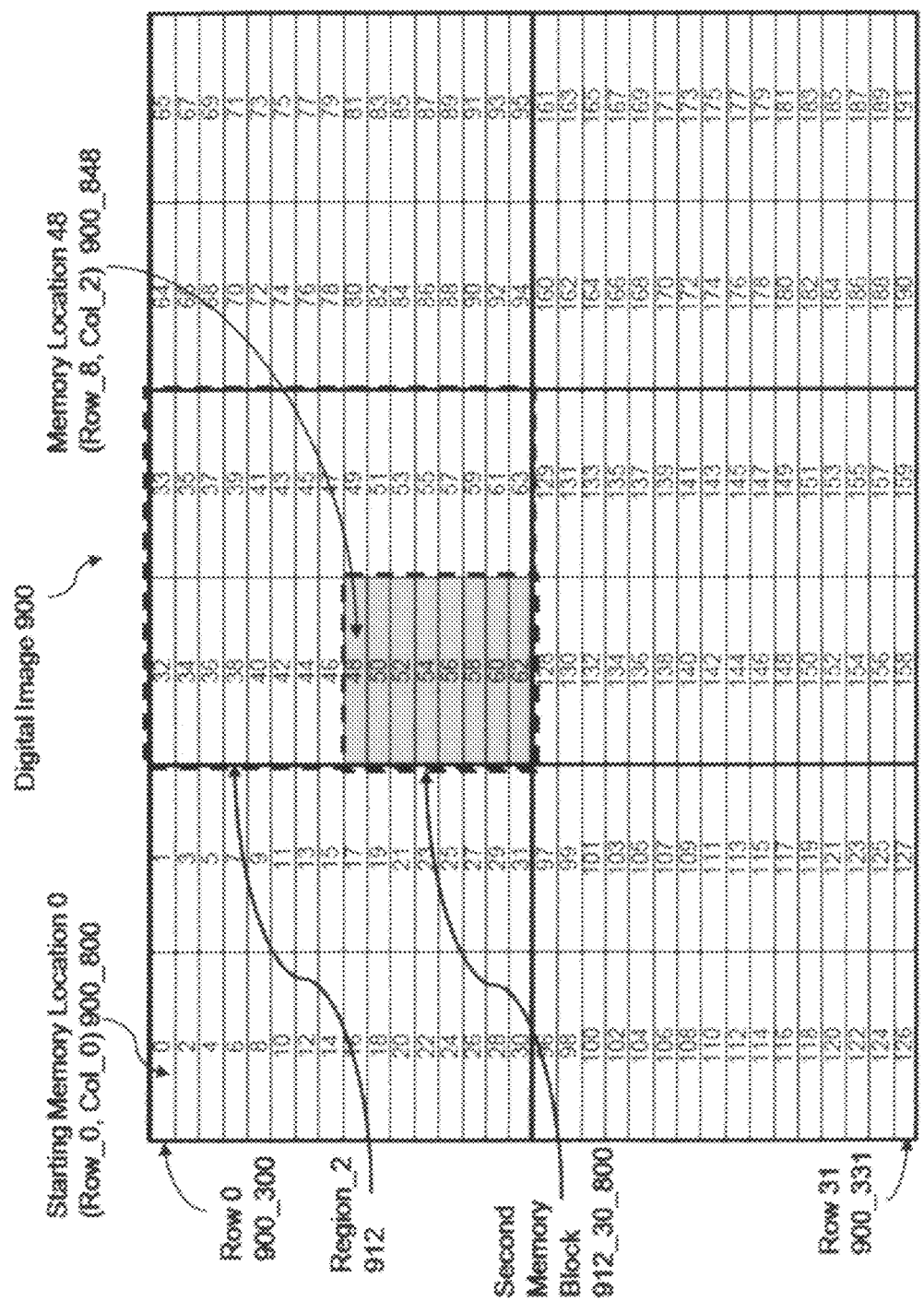
FIG. 9L shows memory organization of the exemplary quadrangle digital image of FIG. 9K, within the memory organization of the exemplary digital image of FIG. 9D, in accordance with one embodiment.

The Digital Image 900 is split into six regions and each region may be further split into four sub-regions as shown in FIG. 9K. In this example, Region_2 912 is split into four sub-regions, namely Region_2_1 912_10, Region_2_2 912_20, Region_2_3 912_30, and Region_2_4 912_40. In accordance with one embodiment, an exemplary memory access request is initiated to write or read the video data information content of Region_2_3 912_30 to or from a Second Memory Block 912_30_800, as shown in FIG. 9L. This exemplary memory access request is described using the command structure as shown in FIG. 10A. The memory locations that correspond to Region_2_3 912_30 are illustrated as a shaded region enclosed by dashed lines and labeled as Second Memory Block 912_30_800, as shown in FIG. 9L. In this example, the Y-component of video data information of Region_2 912 is stored within the first memory region starting at memory location 32 and ending at memory location 63, as shown in FIG. 9L.

In this example, a memory read command is initiated by output display module ODM_1 841 to retrieve the Second Memory Block 912_30_800 that comprises the Y-component of the video data information of the pixels of Region_2_3 912_30. The First Input Buffer Control 841_10 produces a memory read command comprising a Base Index 1020 to read the video data information out of Memory 850. The Base Index 1020 value corresponds to the first starting memory location of the first region of Memory 850, and in this example equals $(001)_{10}$. The Region_2_3 912_30 comprises eight memory locations, namely: 48, 50, 52, 54, 56, 58, 60, and 62. The vertical and horizontal origin of the Region_2_3 912_30, comprising the top-leftmost pixel of Region_2_3 91230, is identified using Ystart 1030 and Xstart 1040 values, respectively. In this example, the location information of the vertical and horizontal origin is given by Ystart $1030=(008)_{10}$ that corresponds to the ninth row (Row_8), and Xstart $1040=(002)_{10}$ that corresponds to the third column (Col_2), see Memory Location 48 (Row_8, Col_2) 900_848. Furthermore, the size information is given by Xcount $1060=(001)_{10}$ that corresponds to one memory location in width or the horizontal direction, and Ycount $1050=(008)_{10}$ that corresponds to eight memory locations in height or the vertical direction. Therefore, the exemplary memory read command, in accordance with the command structure of FIG. 10A, comprises the following: [Control bits], $[(001)_{10}]$, $[(008)_{10}]$, $[(002)_{10}]$, $[(008)_{10}]$, $[(001)_{10}]$. The Memory Data Path Controller 830 generates the bases address for the intended memory region by using the Base Index 1020 value of $(001)_{10}$ as a pointer in a lookup table to retrieve the corresponding base address, i.e. $(00001024)_{10}$. The Second Memory Interface 830_30 generates at least one memory device read command using the size and location information embedded within the memory read command, as has been described earlier.

Figure 9M:
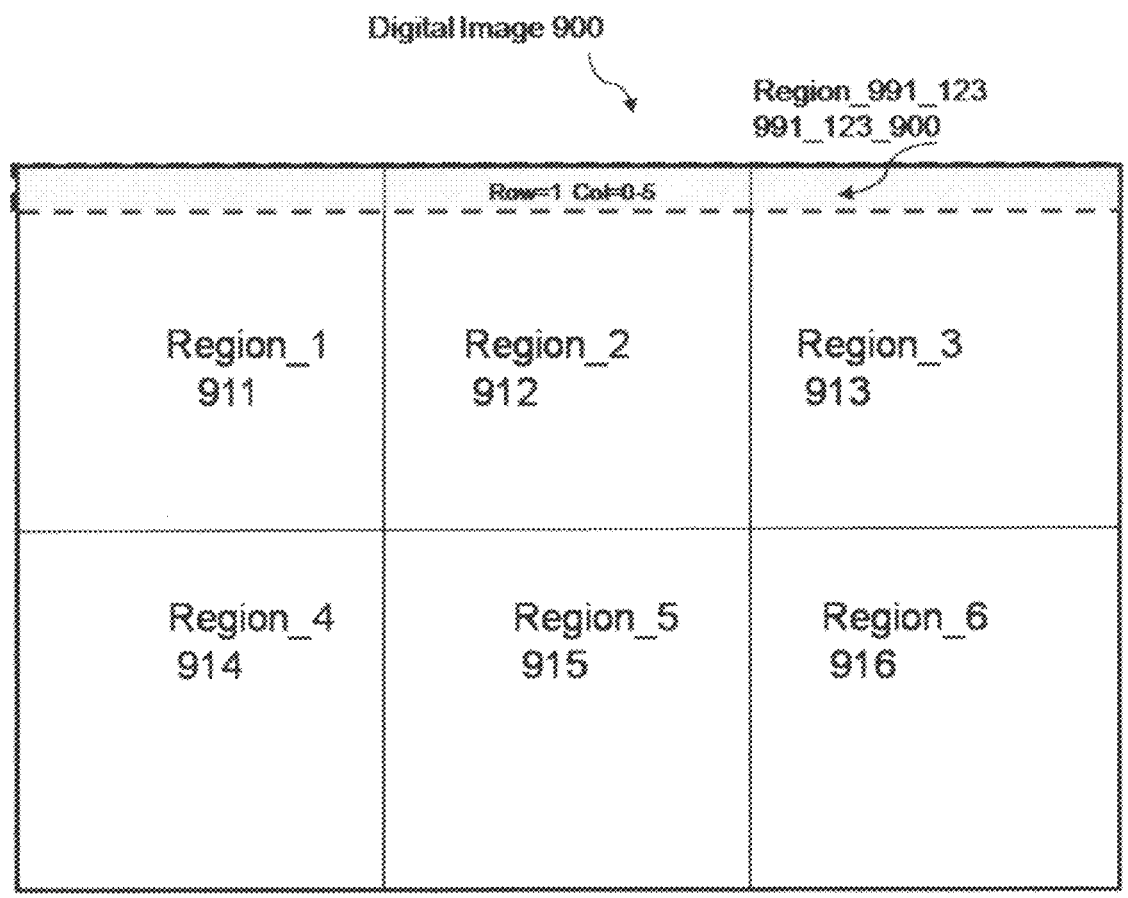
FIG. 9M shows an exemplary quadrangle digital image, within the digital image of FIG. 9A, in accordance with one embodiment.
Figure 9N:
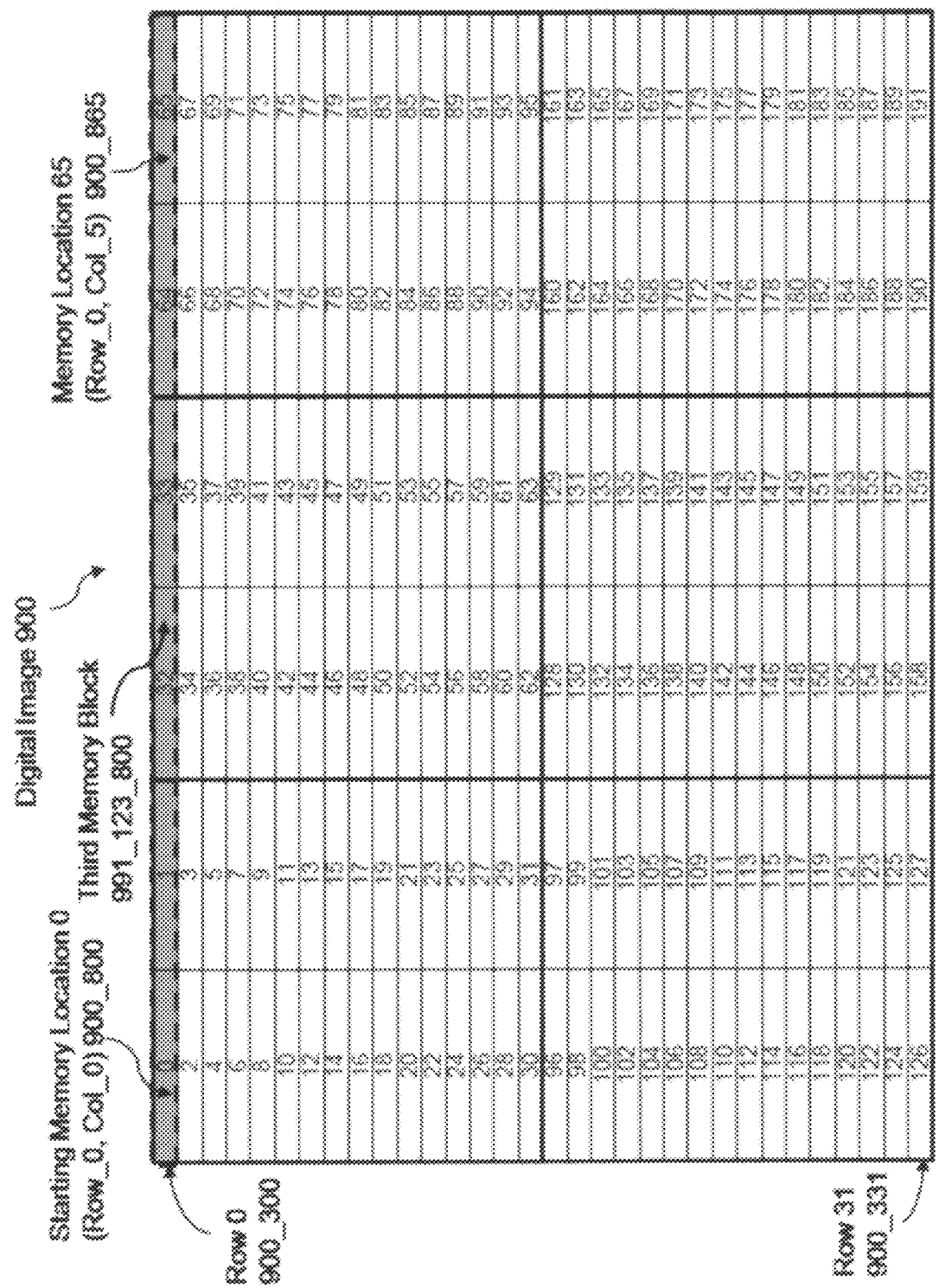
FIG. 9N shows memory organization of the exemplary quadrangle digital image of FIG. 9M, within the memory organization of the exemplary digital image of FIG. 9D, in accordance with one embodiment.

Now referring to FIG. 9M, the Digital Image 900 is split into six regions, namely Region_1 911, Region_2 912, Region_3 913, Region_4 914, Region_5 915, Region_6 916. Region_991_123 991_123_900 is a concatenation of the first row of each of the Region_1 911, Region_2 912, and Region_3 913. In accordance with one embodiment, an exemplary memory access request is initiated to write or read the video data information content of Region_991_123 991_123_900 to or from a Third Memory Block 991_123_800, as shown in FIG. 9N. This exemplary memory access request is described using the command structure as shown in FIG. 10A. The memory locations that correspond to Region_991_123 991_123_900 are illustrated as a shaded region enclosed by dashed lines and labeled as Third Memory Block 991_123_800. In this example, the Y-component of video data information of Region_991_123 991_123_900 is stored within the first memory region starting at memory location 0 and comprising memory location 0, 1, 32, 33, 64, and 65, as shown in FIG. 9N.

In this example, a memory read command is initiated by the output display module ODM_1 841 to retrieve the Third Memory Block 991_123_800, comprising the Y-component of the video data information of the pixels of Region_991_123 991_123_900. The First Input Buffer Control 841_10 produces a memory read command comprising a Base Index 1020 to read the video data information out of Memory 850. The Base Index 1020 value corresponds to the first starting memory location of the first region of Memory 850, and in this example equals $(001)_{10}$. The vertical and horizontal origin of the Region_991_123 991_123_900, comprising the top-leftmost pixel of Region_991_123, is identified using Ystart 1030 and Xstart 1040 values, respectively. In this example, the location information is given by Ystart $1030=(000)_{10}$ that corresponds to the first row (Row_0), and Xstart $1040=(000)_{10}$ that corresponds to the first column (Col_0). Furthermore, the size information is given by Xcount $1060=(006)_{10}$ that corresponds to six memory location in width or the horizontal direction, and Ycount $1050=(001)_{10}$ that corresponds to one memory location in height or the vertical direction, i.e. one line of the Digital Image 900. Therefore, the exemplary memory read command, in accordance with the structure of FIG. 10A, comprises the following: [Control bits], $[(001)_{10}]$, $[(000)_{10}]$, $[(000)_{10}]$, $[(001)_{10}]$, $[(006)_{10}]$. The Memory Data Path Controller 830 generates the bases address for the intended memory region by using the Base Index 1020 value of $(001)_{10}$ as a pointer in a lookup table to retrieve the corresponding base address, i.e. $(00001024)_{10}$. The Second Memory Interface 830_30 generates at least one memory device read command using the size and location information embedded within the memory read command, as has been described above.

Figure 9O:
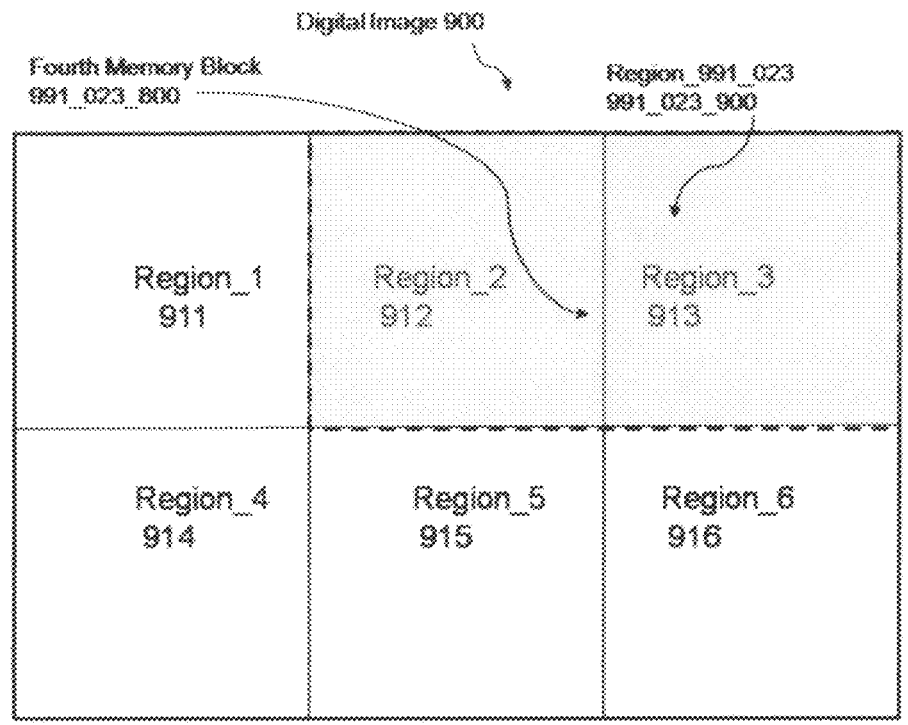
FIG. 9O shows an exemplary quadrangle digital image, within the digital image of FIG. 9A, in accordance with one embodiment.

Now referring to FIG. 9O, the Digital Image 900 is split into six regions, namely Region_1 911, Region_2 912, Region_3 913, Region_4 914, Region_5 915, and Region_6 916. Region_991_023 991_023_900 is a concatenation of Region_2 912, and Region_3 913. In accordance with one embodiment, an exemplary memory access request is initiated to write or read the video data information content of Region_991_023 991_023_900 to or from a Fourth Memory Block 991_023_800, as shown in FIG. 9O. This exemplary memory access request is similar to the memory access request described above and uses the command structure of FIG. 10A. The memory locations that correspond to Region_991_023 991_023_900 are illustrated as a shaded region enclosed by dashed lines and labeled as Fourth Memory Block 991_023_800. In this example, the Y-component of video data information of Region_991_023 991_023_900 is stored within the first memory region starting at memory location 32 and ends at memory location 95. The memory read command to retrieve the Fourth Memory Block 991_023_800 is generated as has been described in the above embodiments; see FIG. 9D as a reference for the memory size and location information, e.g. Ystart 1030, Xstart 1040, Ycount 1050, and Xcount 1060.

Figure 9P:
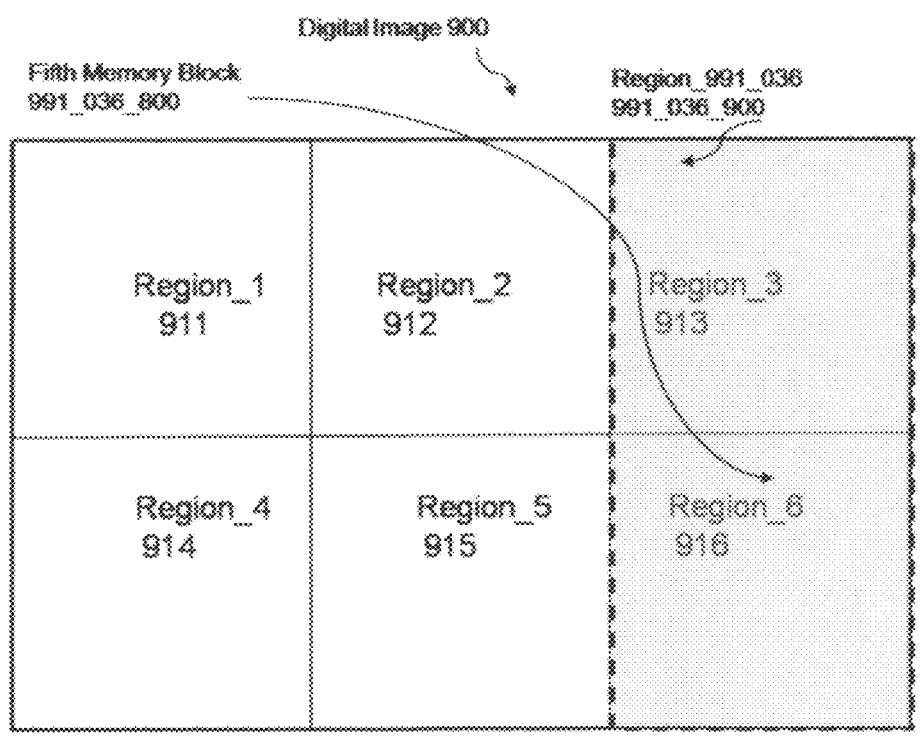
FIG. 9P shows an exemplary quadrangle digital image, within the digital image of FIG. 9A, in accordance with one embodiment.

Now referring to FIG. 9P, the Digital Image 900 is split into six regions, namely Region_1 911, Region_2 912, Region_3 913, Region_4 914, Region_5 915, and Region_6 916. Region_991_036 991_036_900 is a concatenation of Region_3 913 and Region_6 916. In accordance with one embodiment, an exemplary memory access request is initiated to write or read the video data information content of Region_991_036 991_036_900 to or from a Fifth Memory Block 991_036_800, as shown in FIG. 9P. This exemplary memory access request is similar to the memory access request described above and uses the command structure of FIG. 10A. The memory locations that correspond to Region_991_036 991_036_900 are illustrated as a shaded region enclosed by dashed lines and labeled as Fifth Memory Block 991_036_800. In this example, the Y-component of video data information of Region_991_036 991_036_900 is stored within the first memory region starting at memory location 64 through memory location 95 and memory location 160 through memory location 191. The memory read command to retrieve the Fifth Memory Block 991_036_800 is generated as has been described in the above embodiments;

see FIG. 9D as a reference for the memory size and location information, e.g. Ystart 1030, Xstart 1040, Ycount 1050, and Xcount 1060.

The exemplary embodiments as described in this disclosure are used interchangeably to develop a certain and unique Digital Image Processing System 800 that meets a widely varying input digital image processing requirements, including various techniques to process and split an input digital image. Furthermore, various embodiments provide the ability to customize the Digital Image Processing System 800 to meet an ever-changing electronic display panels' size and specification.

I claim:

1. A digital image processing apparatus to process video data information of a captured input digital image comprising:
   a first programmable register to store a first value that corresponds to the captured input digital image width;
   a second programmable register to store a second value that corresponds to the captured input digital image height;
   a third programmable register to store a third value that corresponds to a first size information of a first quadrangle digital image;
   a fourth programmable register to store a fourth value that corresponds to a first location information of the first quadrangle digital image within the captured input digital image, wherein the first quadrangle digital image comprises a first portion of the captured input digital image;
   a fifth programmable register to store a fifth value that corresponds to a second size information of a second quadrangle digital image;
   a sixth programmable register to store a sixth value that corresponds to a second location information of the second quadrangle digital image within the captured input digital image, wherein the second quadrangle digital image comprises a second portion of the captured input digital image;
   a first logic circuitry that is coupled to the first, second, third, fourth, fifth, and sixth programmable registers, and is configured to:
     (i) receive, in accordance with a first video format, the first value, and the second value, the video data information of the captured input digital image,
     (ii) extract a first video data information that corresponds to the first quadrangle digital image, in accordance with the third and fourth value,
     (iii) extract a second video data information that corresponds to the second quadrangle digital image, in accordance with the fifth and sixth values, and
     (iv) store the first and second video data information using a first memory device;
   a second logic circuitry that is coupled to the first memory device, the third programmable register, and the fourth programmable register, and is configured to:
     (i) retrieve from the first memory device the first video data information, using at least one of the third value and the fourth value,
     (ii) generate video data information for at least one of a first top margin and a first bottom margin,
     (iii) process, in the vertical direction, the retrieved video data information and the video data information corresponding to at least one of the first top margin and the first bottom margin, and
     (iv) store the resultant vertically processed video data information using a first buffer;
   a third logic circuitry that is coupled to the first buffer and a fourth logic circuitry, and is configured to:
     (i) retrieve from the first buffer the resultant vertically processed video data information,
     (ii) generate video data information for at least one of a first left margin and a first right margin,
     (iii) process, in the horizontal direction, the resultant vertically processed video data information and the video data information corresponding to at least one of the first left margin and the first right margin, and
     (iv) stream the resultant vertically and horizontally processed video data information to the fourth logic circuitry; and
   the fourth logic circuitry, which is coupled to a first output port, and is configured to:
     (i) receive the resultant vertically and horizontally processed video data information,
     (ii) process the resultant vertically and horizontally processed video data information in accordance with the first video format, and
     (ii) output a first vertically and horizontally processed video data information stream to the first output port.

2. The digital image processing apparatus of claim 1, wherein the fourth logic circuitry is coupled to the third programmable register and is configured to crop the first vertically and horizontally processed video data information stream using the first size information.

3. The digital image processing apparatus of claim 1, wherein the first size information comprise a first width and a first height of the first quadrangle digital image, and the second size information comprise a second width and a second height of the second quadrangle digital image.

4. The digital image processing apparatus of claim 3, wherein the first location information comprise a first vertical origin and a first horizontal origin of the first quadrangle digital image, and the second location information comprise a second vertical origin and a second horizontal origin of the second quadrangle digital image.

5. The digital image processing apparatus of claim 3, further comprising:
   a seventh programmable register to store a seventh value that corresponds to a third height of a first output digital image; and
   the second logic circuitry is coupled to the seventh programmable register, and is configured to process in the vertical direction, in accordance with the first height and the third height, the retrieved video data information and the video data information corresponding to at least one of the first top margin and the first bottom margin.

6. The digital image processing apparatus of claim 5, wherein the second logic circuitry processing in the vertical direction comprises scaling in the vertical direction, based on the first height and the third height.

7. The digital image processing apparatus of claim 5, further comprising:
   an eighth programmable register to store an eighth value that corresponds to a third width of the first output digital image; and
   the third logic circuitry is coupled to the eighth programmable register, and is configured to process in the horizontal direction, in accordance with the first width and the third width, the resultant vertically processed video data information and the video data information corresponding to at least one of the first left margin and the first right margin.

8. The digital image processing apparatus of claim 7, wherein the third logic circuitry processing in the horizontal direction comprises scaling in the horizontal direction, based on the first width and the third width.

9. The digital image processing apparatus of claim 7, wherein the fourth logic circuitry is coupled to the seventh and eighth programmable registers, and is configured to crop, based on the seventh and eighth values, the first vertically and horizontally processed video data information stream.

10. The digital image processing apparatus of claim 7, wherein the fourth logic circuitry is coupled to the seventh and eighth programmable registers, and is configured to generate, based on the seventh and eighth values, a first data enable signal to effect the blanking of a portion of the first vertically and horizontally processed video data information stream.

11. The digital image processing apparatus of claim 7, wherein the fourth logic circuitry is coupled to the seventh and eighth programmable registers, and is configured to:
   (i) monitor the first vertically and horizontally processed video data information stream,
   (ii) generate, synchronously with the first vertically and horizontally processed video data information stream, a first data enable signal to effect the blanking of a portion of the first vertically and horizontally processed video data information stream based on the seventh and eighth values, and
   (iii) output the first data enable signal to the first output port.

12. The digital image processing apparatus of claim 1, wherein at least one of the first top margin, the first bottom margin, the first left margin and the first right margin comprises video data information that corresponds to a portion of the captured input digital image.

13. The digital image processing apparatus of claim 1, wherein the second logic circuitry is configured to generate on the fly the video data information for at least one of the first top margin and the first bottom margin.

14. The digital image processing apparatus of claim 13, wherein the second logic circuitry is configured to generate the first top margin on the fly using video data information of at least one pixel that is located on a first top edge of the first quadrangle digital image.

15. The digital image processing apparatus of claim 13, wherein the second logic circuitry is configured to generate the first bottom margin on the fly using video data information of at least one pixel that is located on a first bottom edge of the first quadrangle digital image.

16. The digital image processing apparatus of claim 1, wherein the third logic circuitry is configured to generate on the fly at least one of the first left margin and the first right margin.

17. The digital image processing apparatus of claim 16, wherein the third logic circuitry is configured to generate the first left margin on the fly using video data information of at least one pixel that is located on a first left edge of the first quadrangle digital image.

18. The digital image processing apparatus of claim 16, wherein the third logic circuitry is configured to generate the first right margin on the fly using video data information of at least one pixel that is located on a first right edge of the first quadrangle digital image.

19. The digital image processing apparatus of claim 1, wherein the first portion of the captured input digital image, which corresponds to the first quadrangle digital image, is distinct from the second portion of the captured input digital image, which corresponds to the second quadrangle digital image.

20. The digital image processing apparatus of claim 1, wherein the first portion of the captured input digital image, which corresponds to the first quadrangle digital image, has at least one pixel in common with the second portion of the captured input digital image, which corresponds to the second quadrangle digital image.

21. The digital image processing apparatus of claim 1, further comprising:
   a fifth logic circuitry that is coupled to the first memory device, and is configured to:
      (i) retrieve the second video data information from the first memory device,
      (ii) generate video data information for at least one of a second top margin and a second bottom margin,
      (iii) process in the vertical direction, the retrieved video data information and the video data information corresponding to at least one of the second top margin and the second bottom margin, and
      (iv) store the resultant vertically processed video data information using a second buffer;
   a sixth logic circuitry that is coupled to the second buffer and a seventh logic circuitry, and is configured to:
      (i) retrieve from the second buffer the resultant vertically processed video data information,
      (ii) generate video data information for at least one of a second left margin and a second right margin,
      (iii) process in the horizontal direction, the resultant vertically processed video data information and the video data information corresponding to at least one of the second left margin and the second right margin, and
      (iv) stream the resultant vertically and horizontally processed video data information to the seventh logic circuitry; and
   the seventh logic circuitry is coupled to a second output port, and is configured to:
      (i) receive the resultant vertically and horizontally processed video data information,
      (ii) process the resultant vertically and horizontally processed video data information in accordance with the first video format, and
      (iii) output a second vertically and horizontally processed video data information stream to the second output port.

22. A digital image processing apparatus to process video data information of a captured input digital image comprising:
   a first programmable register to store a first value that corresponds to the captured input digital image width;
   a second programmable register to store a second value that corresponds to the captured input digital image height;
   a third programmable register to store a third value that corresponds to a first size information of a first quadrangle digital image;
   a fourth programmable register to store a fourth value that corresponds to a first location information of the first quadrangle digital image within the captured input digital image, wherein the first quadrangle digital image comprises a first portion of the captured input digital image;
   a fifth programmable register to store a fifth value that corresponds to a second size information of a second quadrangle digital image;

a sixth programmable register to store a sixth value that corresponds to a second location information of the second quadrangle digital image within the captured input digital image, wherein the second quadrangle digital image comprises a second portion of the captured input digital image;

a first logic circuitry that is coupled to the first, second, third, fourth, fifth, and sixth programmable registers, and is configured to:
  (i) receive the video data information of the captured input digital image in accordance with a first video format, the first value, and the second value,
  (ii) extract a first video data information, which corresponds to the first quadrangle digital image, in accordance with a second video format, the third and fourth value,
(iii) extract a second video data information, which corresponds to the second quadrangle digital image, in accordance with the second video format, the fifth value, and the sixth value, and
  (iv) store the first and second video data information using a first memory device;

a second logic circuitry that is coupled to the first memory device and is configured to:
  (i) retrieve from the first memory device:
    (a) the first video data information, and
    (b) at least one of a third, fourth, fifth, and sixth video data information, wherein the third, fourth, fifth and sixth video data information correspond to at least one pixel that is adjacent to a first top edge, a first bottom edge, a first left edge, and a first right edge of the first quadrangle digital image, respectively,
  (ii) generate video data information for at least one of a first top margin and a first bottom margin,
  (iii) process in the vertical direction, the retrieved video data information and the video data information corresponding to at least one of the first top margin and the first bottom margin, and
  (iv) store the resultant vertically processed video data information using a first buffer;

a third logic circuitry that is coupled to the first buffer and a fourth logic circuitry, and is configured to:
  (i) retrieve from the first buffer the resultant vertically processed video data information,
  (ii) generate video data information for at least one of a first left margin and a first right margin,
  (iii) process in the horizontal direction, the resultant vertically processed video data information and the video data information corresponding to at least one of the first left margin and the first right margin, and
  (iv) stream the resultant vertically and horizontally processed video data information to the fourth logic circuitry; and the fourth logic circuitry is coupled to a first output port, and is configured to:
  (i) receive the resultant vertically and horizontally processed video data information,
  (ii) process the resultant vertically and horizontally processed video data information in accordance with the first video format, and
  (iii) output a first vertically and horizontally processed video data information stream to the first output port.

23. The digital image processing apparatus of claim 22, further comprising:
a fifth logic circuitry that is coupled to the first memory device, and is configured to:
  (i) retrieve from the first memory device:
    (a) the second video data information, and
    (b) at least one of a seventh, eighth, ninth, and tenth video data information, wherein the seventh, eighth, ninth, and tenth video data information correspond to at least one pixel that is adjacent to a second top edge, a second bottom edge, a second left edge, and a second right edge of the second quadrangle digital image, respectively,
  (ii) generate video data information for at least one of a second top margin and a second bottom margin,
  (iii) process in the vertical direction, the retrieved video data information and the video data information corresponding to at least one of the second top margin and the second bottom margin, and
  (iv) store the resultant vertically processed video data information using a second buffer;

a sixth logic circuitry that is coupled to a seventh logic circuitry and the second buffer, and is configured to:
  (i) retrieve from the second buffer the resultant vertically processed video data information,
  (ii) generate video data information for at least one of a second left margin and a second right margin,
  (iii) process in the horizontal direction, the resultant vertically processed video data information and the video data information corresponding to at least one of the second left margin and the second right margin, and
  (iv) stream the resultant vertically and horizontally processed video data information to the seventh logic circuitry; and the seventh logic circuitry is coupled to a second output port, and is configured to:
  (i) receive the resultant vertically and horizontally processed video data information,
  (ii) process the resultant vertically and horizontally processed video data information in accordance with the first video format, and
  (ii) output a second vertically and horizontally processed video data information stream to the second output port.

24. A digital image processing apparatus to process video data information of a captured input digital image comprising:
a first programmable register to store a first value that corresponds to the captured input digital image width;
a second programmable register to store a second value that corresponds to the captured input digital image height;
a third programmable register to store a third value that corresponds to a size information of a quadrangle digital image;
a fourth programmable register to store a fourth value that corresponds to a location information of the quadrangle digital image within the captured input digital image, wherein the quadrangle digital image comprises at least a portion of the captured input digital image;
a first logic circuitry that is coupled to the first, second, third, and fourth programmable registers and is configured to:
  (i) receive the video data information of the captured input digital image in accordance with a first video format, the first value, and the second value,
  (ii) extract a first video data information that corresponds to the captured input digital image, in accordance with a second video format, the first value, and the second value, and (iii) store the first video data information using a memory device;

a second logic circuitry that is coupled to the memory device and a buffer, and is configured to:
   (i) retrieve a second video data information from the memory device in accordance with the third and fourth values,
   (ii) generate video data information for at least one of a top margin and a bottom margin,
   (iii) process in the vertical direction, the retrieved video data information and the video data information corresponding to at least one of the top margin and the bottom margin, and
   (iv) store the resultant vertically processed video data information using the buffer;

a third logic circuitry that is coupled to the buffer and a fourth logic circuitry, and is configured to:
   (i) retrieve from the buffer the resultant vertically processed video data information,
   (ii) generate video data information for at least one of a first left margin and a first right margin,
   (iii) process in the horizontal direction, the resultant vertically processed video data information and the video data information corresponding to at least one of the first left margin and the first right margin, and
   (iv) stream the resultant vertically and horizontally processed video data information to the fourth logic circuitry; and the fourth logic circuitry that is configured to:
   (i) receive the resultant vertically and horizontally processed video data information stream in accordance with the second video format, and
   (ii) convert the resultant vertically and horizontally processed video data information stream in accordance with the first video format.

25. The digital image processing apparatus of claim 24, further comprising:
   a fifth programmable register to store a fifth value that corresponds to width of an output digital image;
   a sixth programmable register to store a sixth value that corresponds to height of the output digital image; and
   the fourth logic circuitry is coupled to a first output port, the fifth and sixth programmable registers, and is configured to:
      (i) crop the converted vertically and horizontally processed video data information stream in accordance with the fifth value and the sixth value, and
      (ii) output the cropped converted vertically and horizontally processed video data information stream to the first output port.

* * * * *